(12) United States Patent
Kanemoto et al.

(10) Patent No.: US 9,379,363 B2
(45) Date of Patent: Jun. 28, 2016

(54) CYLINDRICAL BATTERY

(75) Inventors: Manabu Kanemoto, Kyoto (JP);
Mitsuhiro Kodama, Kyoto (JP);
Tadashi Kakeya, Kyoto (JP)

(73) Assignee: GS Yuasa International, Ltd., Kyoto (JP)

( * ) Notice: Subject to any disclaimer, the term of this patent is extended or adjusted under 35 U.S.C. 154(b) by 93 days.

(21) Appl. No.: 14/233,260

(22) PCT Filed: Jul. 20, 2012

(86) PCT No.: PCT/JP2012/068521
§ 371 (c)(1),
(2), (4) Date: Jan. 16, 2014

(87) PCT Pub. No.: WO2013/012084
PCT Pub. Date: Jan. 24, 2013

(65) Prior Publication Data
US 2014/0147732 A1    May 29, 2014

(30) Foreign Application Priority Data

Jul. 20, 2011  (JP) .................................. 2011-158801
Aug. 8, 2011  (JP) .................................. 2011-172697
Aug. 8, 2011  (JP) .................................. 2011-172702
Aug. 9, 2011  (JP) .................................. 2011-173587
Aug. 9, 2011  (JP) .................................. 2011-173588

(51) Int. Cl.
*H01M 2/02*   (2006.01)
*H01M 2/14*   (2006.01)
*H01M 2/18*   (2006.01)
(Continued)

(52) U.S. Cl.
CPC ................ *H01M 2/02* (2013.01); *H01M 2/022* (2013.01); *H01M 2/0237* (2013.01); *H01M 2/14* (2013.01); *H01M 2/18* (2013.01); *H01M 10/0468* (2013.01); *H01M 10/0422* (2013.01); *H01M 10/28* (2013.01)

(58) Field of Classification Search
CPC ..................... H01M 10/0422; H01M 10/0468
See application file for complete search history.

(56) References Cited

U.S. PATENT DOCUMENTS 2,941,022 A * 6/1960 Mandel ........................... 429/59
2,988,587 A * 6/1961 Haring .......................... 429/119
(Continued)

FOREIGN PATENT DOCUMENTS

| EP | 0700109 | 3/1996 |
|----|---------|--------|
| JP | 59-91675 | 5/1984 |

(Continued)

OTHER PUBLICATIONS

International Search Report dated Sep. 18, 2012 filed in PCT/JP2012/068521.

(Continued)

*Primary Examiner* — Gregg Cantelmo
(74) *Attorney, Agent, or Firm* — Rankin, Hill & Clark LLP

(57) ABSTRACT

A cylindrical battery, including: a battery case having a cylindrical shape; an electrode group disposed in the battery case, the electrode group comprising a positive electrode, a negative electrode, and a separator, the electrode group having a pair of flat outer side surfaces opposed to each other; and a spacer disposed between an inner peripheral surface of the battery case and each of the flat outer side surfaces of the electrode group.

18 Claims, 54 Drawing Sheets

(51) Int. Cl.
*H01M 10/04* (2006.01)
*H01M 10/28* (2006.01)

(56) References Cited

U.S. PATENT DOCUMENTS

| | | | |
|---|---|---|---|
| 3,110,634 A * | 11/1963 | Bradshaw | 429/99 |
| 3,856,575 A * | 12/1974 | Hughes | 429/164 |
| 3,895,959 A * | 7/1975 | Dehmelt | 429/152 |
| 4,048,397 A * | 9/1977 | Rothbauer | 429/131 |
| 4,664,992 A * | 5/1987 | Edwards et al. | 429/144 |
| 6,117,583 A | 9/2000 | Nilsson et al. | |
| 6,372,387 B1 | 4/2002 | Kawakami et al. | |
| 6,653,023 B1 | 11/2003 | Inoue et al. | |
| 7,195,840 B2 * | 3/2007 | Kaun | 429/94 |
| 7,618,742 B2 | 11/2009 | Kaplin et al. | |
| 2004/0247995 A1 * | 12/2004 | Devitt | 429/66 |
| 2008/0057390 A1 | 3/2008 | Kondo et al. | |
| 2009/0239152 A1 | 9/2009 | Katoh | |
| 2010/0099023 A1 | 4/2010 | Kuroda et al. | |

FOREIGN PATENT DOCUMENTS

| | | |
|---|---|---|
| JP | 61-202876 | 12/1986 |
| JP | 62-66172 | 4/1987 |
| JP | 2-201867 | 8/1990 |
| JP | 5-283107 | 10/1993 |
| JP | 8-293298 | 11/1996 |
| JP | 11-45734 | 2/1999 |
| JP | 11-185767 | 7/1999 |
| JP | 2000-30688 | 1/2000 |
| JP | 2000-77078 | 3/2000 |
| JP | 2000-090903 | 3/2000 |
| JP | 2000-106165 | 4/2000 |
| JP | 2000-340251 | 12/2000 |
| JP | 2001-85046 | 3/2001 |
| JP | 3287367 | 3/2002 |
| JP | 2002-134096 | 5/2002 |
| JP | 2002-280071 | 9/2002 |
| JP | 2002-298921 | 10/2002 |
| JP | 2003-86166 | 3/2003 |
| JP | 2003-151616 | 5/2003 |
| JP | 2007-48761 | 2/2007 |
| JP | 2008-084851 | 4/2008 |
| JP | 2008-108547 | 5/2008 |
| JP | 2008-529239 | 7/2008 |
| JP | 2009-224296 | 10/2009 |
| WO | 2012/133233 | 10/2012 |
| WO | 2013/012085 | 1/2013 |

OTHER PUBLICATIONS

Extended European Search Report dated Mar. 16, 2015 issued in the corresponding European patent application No. 12815591.8.

* cited by examiner

Fig. 10
(SPACER SHOWN IN FIG. 8)
(PLAN VIEW)
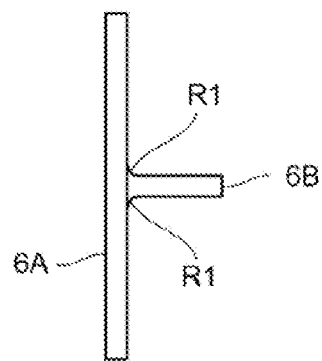
(SPACER SHOWN IN FIG. 9)
(PLAN VIEW)
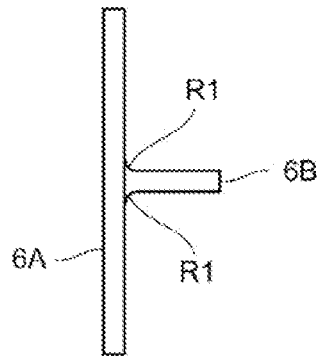
(SIDE VIEW)
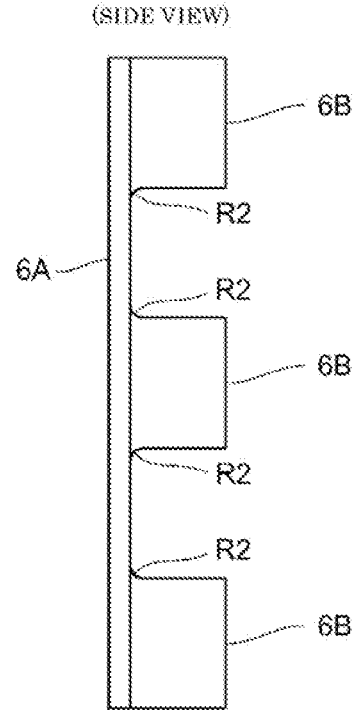

Fig. 11
(SIDE VIEW OF SPACERS BEFORE BEING BENT)
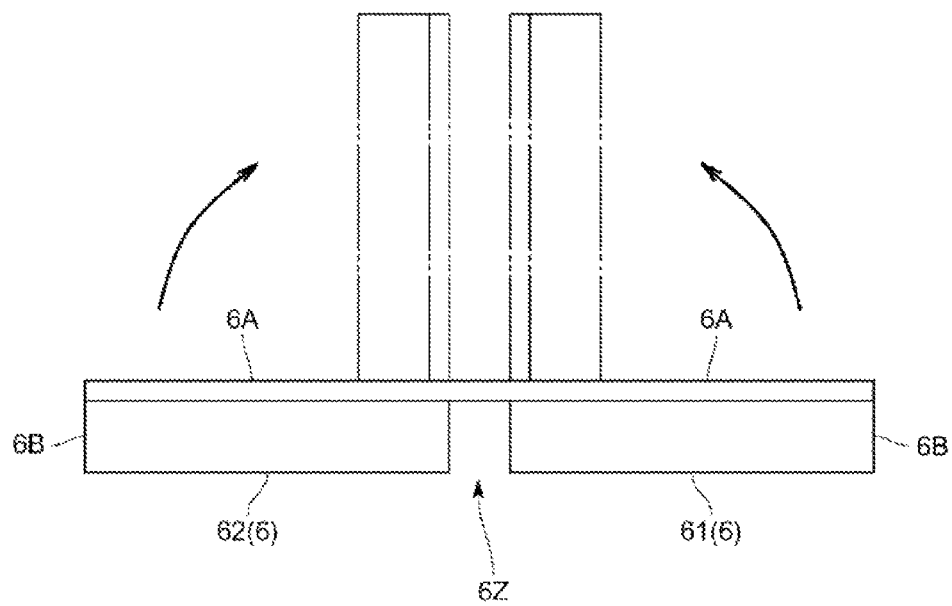
(PLAN VIEW OF SPACERS BEFORE BEING BENT)
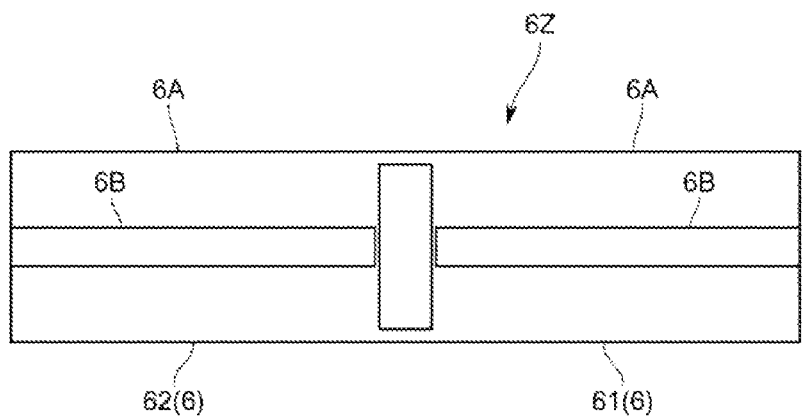

LAYERED
DIRECTION L

Fig. 17
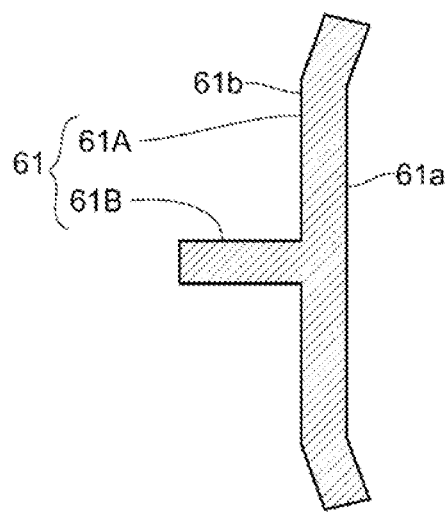
(A)
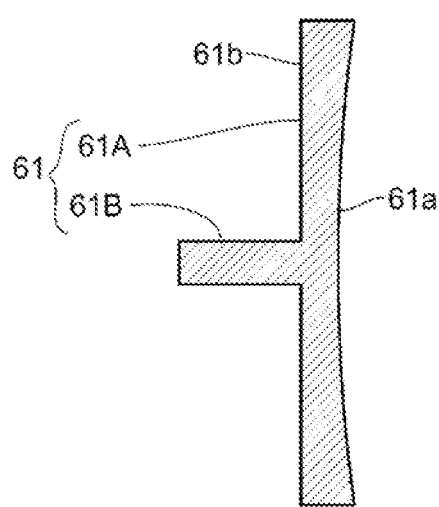
(B)

LAYERED
DIRECTION L

Fig. 19
(A)
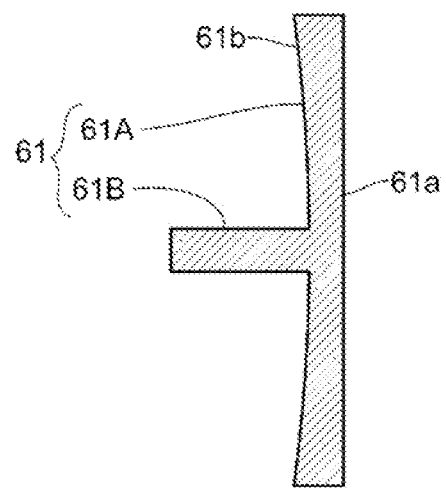
(B)
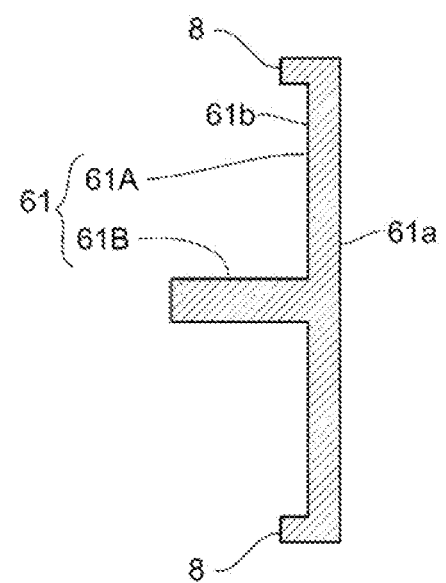

LAYERED
DIRECTION L

Fig. 43
(A)
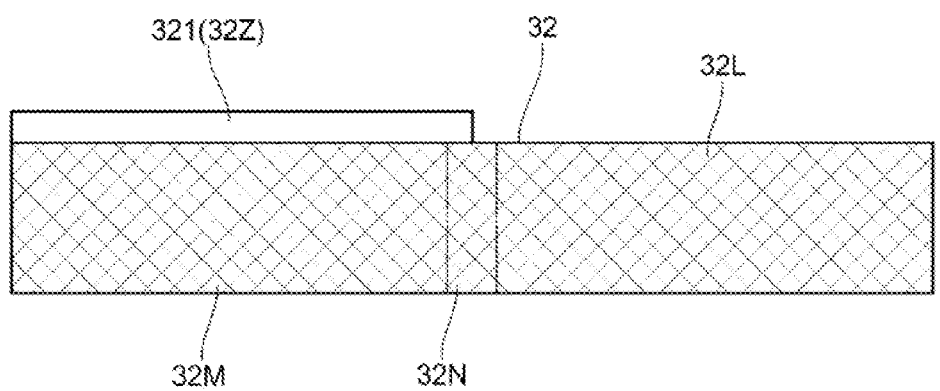
(B)
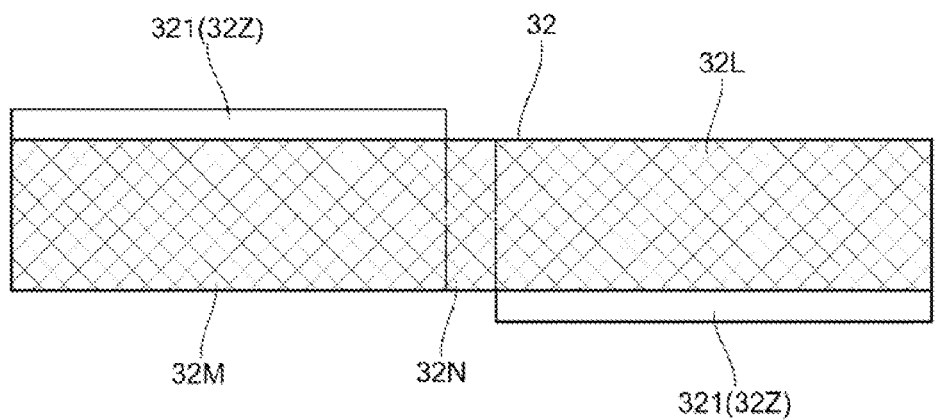

LAYERED
DIRECTION L

LAYERED
DIRECTION L

POSITION OF UPSTANDING
CURRENT COLLECTING
TERMINAL 311

CYLINDRICAL BATTERY

TECHNICAL FIELD

The present invention relates to a cylindrical battery.

BACKGROUND ART

As disclosed in Patent Document 1, there is a conventional cylindrical battery that includes a battery case having a cylindrical shape, and an electrode group having a columnar shape and accommodated in the battery case. In the electrode group, belt-shaped positive and negative electrode plates are spirally wound with a belt-shaped separator being interposed therebetween.

In the battery in which the positive electrode plate, the negative electrode plate, and the separator in the belt shapes are spirally wound, the positive electrode plate and the negative electrode plate may be displaced in the winding step. In this case, there arise such problems that the cylindrical battery fails to achieve desired battery capacity, or internal short-circuit occurs.

PRIOR ART DOCUMENT

Patent Document

Patent Document 1: JP-A-11-185767

SUMMARY OF THE INVENTION

Problems to be Solved by the Invention

The present invention has been made to solve the problems mentioned above, and an object thereof is to provide a cylindrical battery that requires neither the step of winding an electrode group nor consideration of winding displacement in the electrode group, and suppresses separation of active materials in electrode plates of the cylindrical battery to prevent deterioration in charge-discharge performance.

Means for Solving the Problems

A cylindrical battery according to the present invention includes: a battery case having a cylindrical shape; an electrode group disposed in the battery case, including a positive electrode, a negative electrode, and a separator, and having a pair of flat outer side surfaces opposed to each other; and a spacer for fixing the electrode group. The spacer is disposed between an inner peripheral surface of the battery case and each of the flat outer side surfaces of the electrode group.

In this configuration, the battery case accommodates the electrode group including the positive electrode, the negative electrode, and the separator and having the pair of flat outer side surfaces opposed to each other. It is thus possible to provide the battery that does not cause winding displacement in the electrode group and various problems related to the winding displacement. The battery case having the cylindrical shape enhances strength against increase in internal pressure. The electrode group having a substantially rectangular parallelepiped shape or the like and including the pair of flat outer side surfaces opposed to each other is disposed in the cylindrical battery case. This configuration increases the space in the battery case and prevents increase in internal pressure of the battery, and increases the amount of the electrolyte solution in the cylindrical battery.

When the cylindrical battery case accommodates the electrode group including the pair of flat outer side surfaces opposed to each other, the electrode group may move relatively to the battery case and the active materials in the plates may be separated to cause deterioration in charge-discharge performance. The spacers, which are located between the inner peripheral surface of the battery case and the flat outer side surfaces of the electrode group, prevent movement of the electrode group relative to the battery case and suppress separation of the active materials in the plates to prevent deterioration in charge-discharge performance.

Preferably, the cylindrical battery described above is a secondary battery, and the positive electrode or the negative electrode includes a current collecting substrate and an active material. The current collecting substrate thus provided suppresses deterioration in current collection performance even when the plates are increased or decreased in volume due to charge-discharge reaction.

The spacers preferably press the electrode group. When the electrode group is pressed, the positive electrode and the negative electrode can be pressed and the charge-discharge performance can be thus improved.

More specifically, preferably, the electrode group is formed by layering a positive electrode plate and a negative electrode plate with the separator being interposed therebetween, the battery case accommodates the electrode group such that a layered direction of the electrode group is perpendicular to a center axis direction of the battery case, and the spacer comprises at least two spacers sandwiching the electrode group in the layered direction. When the electrode group is sandwiched in the layered direction, the positive electrode plate and the negative electrode plate can be pressed effectively and the charge-discharge performance can be thus improved.

In order to prevent deterioration in charge-discharge efficiency in the entire electrode group by pressing the entire electrode group, the spacers are preferably in substantially entire contact with an outermost surface of the electrode group in the layered direction.

In order that the spacers evenly press the electrode group, preferably, the spacers have at least four edges extending along the center axis direction and the at least four edges are in contact with the battery case, or the spacers have at least six edges extending along the center axis direction and the at least six edges are in contact with the battery case.

In order to secure the contact between the spacers and the battery case and reliably press the electrode group toward the battery case, preferably, the spacer has a contact portion with the inner peripheral surface of the battery case, and the contact portion has a curved surface substantially along the curved inner peripheral surface of the battery case.

In order that the electrode group can be welded to the battery case after the electrode group is positioned and fixed with respect to the battery case using the spacers, the spacer is preferably formed with a welding space used for welding the electrode group to the battery case. More specifically, preferably, the spacer has a space communicated from a top to a bottom, and a welding rod used for welding the electrode group to the battery case is inserted into the space. The welded portion between the electrode group and the case faces the space.

Preferably, the spacers are located between the inner peripheral surface of the battery case and the paired outer side surfaces, respectively, and each of the spacers includes a flat electrode contact portion having a first surface serving as a contact surface with the electrode group and at least one case contact portion extending from a second surface of the electrode contact portion and being in contact with the inner peripheral surface of the battery case. In this configuration, the second surface of the electrode contact portion, the side surface of the case contact portion, and the inner surface of the battery case form a space communicated from the top to the bottom.

In this case, when the electrode contact portion is not in contact with the electrode group, the contact surface of the electrode contact portion is preferably curved or bent into a concave shape such that respective ends in a width direction of the contact surface are located forward on the first surface side with respect to a center in the width direction in a top view. In this configuration, the contact surface of the electrode contact portion is curved or bent into the concave shape such that the respective ends in the width direction of the contact surface are located closer to the first surface with respect to the center in the width direction in the top view. When the spacers press the electrode group, restoring force due to elastic deformation of the respective ends in the width direction is applied to the respective ends in the width direction of the electrode group. In this configuration, the respective ends in the width direction of the electrode group, which are unlikely to be powerfully pressed, can be reliably pressed, and the charge-discharge efficiency can be thus improved.

Preferably, each of the spacers is warped such that respective ends in a width direction of the electrode contact portion are located forward on the first surface side with respect to a center in the width direction, and the contact surface is curved or bent into a concave shape. In this configuration, in addition to the effects mentioned above, the second surface of the spacer is curved or bent so as to be along the inner peripheral surface of the battery case, so that the spacer can be easily inserted into the battery case. This configuration thus suppresses defective insertion of the spacer.

When the electrode group and the spacers are disposed in the battery case, respective ends in a width direction of the second surface of the electrode contact portion in each of the spacers are preferably in contact with the inner peripheral surface of the battery case. In this configuration, the respective ends in the width direction are made in contact with the inner peripheral surface of the battery case. It is thus possible to prevent reduction in press force of the respective ends in the width direction of the electrode contact portion toward the electrode group and increase the press force applied to the electrode group with use of reactive force from the battery case.

Preferably, before the spacers are disposed in the battery case, each of the spacers is warped such that respective ends in a width direction of the electrode contact portion are located closer to the second surface with respect to a center in the width direction, and when the electrode group and the spacers are disposed in the battery case, the respective ends in the width direction of the second surface of the electrode contact portion in each of the spacers are in contact with the inner peripheral surface of the battery case. In this configuration, even when the electrode group is thinned due to production variation or the like and the case contact portion cannot cause the electrode contact portion to sufficiently press the electrode group, the respective ends in the width direction of the second surface are in contact with the inner peripheral surface of the battery case and the electrode contact portion thus reliably presses the electrode group. This configuration improves the charge-discharge efficiency. In other words, the respective ends in the width direction of the second surface are in contact with the inner peripheral surface of the battery case and the center in the width direction of the first surface is thus pressed toward the electrode group. The center in the width direction of the first surface is capable of reliably pressing the electrode group.

Preferably, respective ends in a width direction of the second surface of the electrode contact portion are each formed with a pressing reinforcement structure that is in contact with the inner peripheral surface of the battery case to press corresponding one of the ends in the width direction of the contact surface toward the side surface of the electrode group. In this configuration, the respective ends in the width direction of the second surface of the electrode contact portion are each formed with the pressing reinforcement structure that is in contact with the inner peripheral surface of the battery case to press corresponding one of the ends in the width direction of the contact surface toward the side surface of the electrode group. Even when the electrode group is thinned due to production variation or the like and the case contact portion cannot cause the electrode contact portion to sufficiently press the electrode group, the pressing reinforcement structures at the respective ends in the width direction of the second surface are in contact with the inner peripheral surface of the battery case and the electrode contact portion thus reliably presses the electrode group. This configuration improves the charge-discharge efficiency.

The at least one case contact portion preferably includes at least two case contact portions that are provided on the second surface of the electrode contact portion and are parallel to each other along a center axis direction. More specifically, the two case contact portions are preferably provided symmetrically with respect to the center axis. In this configuration, the case contact portions in contact with the inner peripheral surface of the battery case cause the electrode contact portion to evenly press the electrode group. This configuration improves the charge-discharge efficiency. When the two case contact portions are formed apart from the center in the width direction, the space between the electrode contact portion and the battery case can be increased. In this configuration, the current collecting terminal can be easily welded to the battery case and the electrolyte solution can be easily filled.

The spacers preferably fix the electrode group at a position decentered from a center position of the battery case. In this configuration, when the cylindrical battery is laid sideways, the center of gravity having larger specific gravity in the electrode group is located vertically below the center position of the battery case. This configuration increases the contact area between the electrolyte solution and the electrode group. This configuration facilitates permeation of the electrolyte solution into the electrode group at the time of formation.

More specifically, when the battery is laid sideways, the electrode group has a center of gravity that is preferably located vertically below the center position of the battery case. When the battery is laid sideways, the center of gravity is lowered and the curved side surface of the cylinder is in contact with the flat surface perpendicular to the vertical direction.

When the spacers are paired and located to sandwich the electrode group, the electrode group can be reliably pressed toward the battery case. In this case, the paired spacers are preferably asymmetrical with respect to the electrode group when viewed in a center axis direction of the battery case. When the paired spacers are asymmetrical with each other, the electrode group can be fixed at a position decentered from the center position of the battery case.

The spacers preferably have unequal areas of sections perpendicular to the center axis direction. When the paired spacers have such unequal sectional areas, the electrode group can be also fixed at a position decentered from the center position of the battery case.

When one of the electrodes in the electrode group has a current collecting terminal welded to a bottom surface of the battery case, it is difficult to weld the current collecting terminal to the bottom surface of the battery case due to the paired spacers thus disposed. In this case, one of the paired spacers having the larger area of the section perpendicular to the center axis direction is preferably formed with a welding hole into which a welding rod used for welding the current collecting terminal to the battery case is inserted. In this configuration, when the spacer having the larger sectional area is formed with the welding hole, the welding hole can be increased in size and the welding work can be thus facilitated.

Preferably, each of the spacers includes a flat electrode contact portion having a first surface serving as a contact surface with the side surface of the electrode group and a case contact portion extending from a second surface of the electrode contact portion and being in contact with the inner peripheral surface of the battery case, and the case contact portions of the spacers are different in length from each other. In this configuration, the electrode group can be fixed at a position decentered from the center position of the battery case. The electrode contact portion and the case contact portion form a concave part therebetween serving as a welding space, which enables the current collecting terminal of the positive electrode or the negative electrode to be welded to the bottom surface of the battery case. The case contact portions of the spacers are different in length from each other. In this configuration, positioning of the current collecting terminal can be easily determined at a glance and productivity is thus enhanced.

Preferably, each of the positive electrode and the negative electrode includes a current collecting terminal, and the current collecting terminal extends from a top of the spacer opposite to a bottom surface of the battery case to the inner peripheral surface of the battery case. In this configuration, the current collecting terminal of the positive electrode or the negative electrode plate extends from the top of the spacer to the inner peripheral surface of the battery case. The current collecting terminal can be thus easily connected by welding or the like to the inner peripheral surface of the battery case and productivity of the battery can be enhanced. The current collecting terminal not connected to the inner peripheral surface of the battery case is connected to an opening sealing member sealing the upper opening of the battery case. Accordingly, the current collecting terminals of the positive electrode and the negative electrode are not connected to the bottom surface of the battery case. This configuration enhances the productivity of the cylindrical battery.

More specifically, the current collecting terminal of the positive electrode or the negative electrode is preferably welded to the inner peripheral surface of the battery case at the top of the spacer. This configuration eliminates difficulty in welding due to the spacers thus disposed and further enhances the effects of the present invention. Defective welding does not occur and the battery can be improved in performance.

The current collecting terminal of the positive electrode or the negative electrode preferably extends along a top surface of the spacer to the inner peripheral surface of the battery case. In this configuration, the current collecting terminal is located at the top surface of the spacer, and the current collecting terminal can be welded more easily.

The top surface of the spacer is preferably formed with a guide groove for guiding the current collecting terminal of the positive electrode or the negative electrode to the inner peripheral surface of the battery case. This configuration prevents displacement of the current collecting terminal during the welding work. The spacer has only to be formed in the top surface with the guide groove and is thus processed easily.

Preferably, the spacer is formed, at the an upper part, with a through hole that has a first end opened to the side surface of the electrode group and a second end opened to the inner peripheral surface of the battery case, and the current collecting terminal of the positive electrode or the negative electrode passes through the through hole to extend to the battery case. In this configuration, the current collecting terminal can be positioned by simply inserting the current collecting terminal through the through hole. The spacer has only to be formed at the top with the through hole and is thus processed easily. When the opening closer to the inner peripheral surface of the battery case in the spacer is in contact with the inner peripheral surface, the current collecting terminal inserted through the through hole is sandwiched between the spacer and the inner peripheral surface of the battery case. This configuration enables more reliable positioning of the current collecting terminal.

Preferably, the spacers are paired and provided between the inner peripheral surface of the battery case and the paired outer side surfaces, respectively, and the paired spacers have ends provided continuously to each other and are bent to sandwich the electrode group. When the paired spacers are provided integrally with each other, the electrode group can be fixed only by bending the spacers to sandwich the electrode group at the time of assembling the battery. This configuration suppresses layering displacement in the electrode group and facilitates the battery assembling work. The layering displacement in the electrode group can be suppressed, and the electrode group and the spacers can be thus inserted easily into the battery case. The integral spacers also lead to reduction in number of the components.

Preferably, each of the spacers includes a flat electrode contact portion having a first surface serving as a contact surface with the electrode group and a case contact portion extending from a second surface of the electrode contact portion and being in contact with the inner peripheral surface of the battery case, and the electrode contact portions have ends in a center axis direction of the battery case that are continuous. In this configuration, when the spacers bent to sandwich the electrode group are inserted into the battery case, the bent portion between the spacers is located at the end in the center axis direction of the battery case. It is thus possible to prevent contact with the inner peripheral surface of the battery case and disturbed insertion. When the spacers are long along the center axis direction of the battery case and the ends in the center axis direction of the battery case are provided continuously to each other, the spacers can be easily bent.

There is preferably a gap between the spacer and the inner peripheral surface of the battery case. The gap provided between the spacer and the inner peripheral surface of the battery case enables easy shift of the electrolyte solution into the electrode group. The battery case is formed at the top with a space, to increase the space for the shifting electrolyte solution and smooth the shift of the electrolyte solution. Meanwhile, the bottom surface of the battery case is in contact with the electrode group in many cases. The space for the shifting electrolyte solution is small at the bottom of the battery case and the electrolyte solution does not shift smoothly. It is thus preferred to provide the gap at the bottom of the battery case.

The spacer is preferably provided, at a top, with a projection facing a top surface of the electrode group. When the current collecting terminal is welded to the top surface of the positive electrode or the negative electrode in the electrode group, the current collecting terminal is in contact with the projection. This configuration prevents displacement of the current collecting terminal and damage and peeling off at the welded portion of the current collecting terminal.

The spacer is preferably provided, at a top, with a surrounding wall surrounding an upper corner of the electrode group. This configuration prevents contact between the battery case and an electrode having polarity different from that of the battery case. It is also possible to prevent contact between the current collecting terminal located at the top of the electrode group and the electrode having polarity different from that of the current collecting terminal. Moreover, it is possible to prevent displacement between the positive electrode and the negative electrode in the electrode group.

The electrode group preferably includes the positive electrode having a substantially quadrangular prism shape and the negative electrode that is flat and located to face each of at least four side peripheral surfaces of the positive electrode with the separator being interposed therebetween. In this configuration, the positive electrode having the substantially quadrangular prism shape increases capacity of the positive electrode with respect to the cylindrical battery case. The flat negative electrode is located at each of the at least four side peripheral surfaces of the positive electrode. This configuration achieves increase in capacity without causing deterioration in discharge performance. This configuration also reduces the area where the positive electrode and the negative electrode face each other, and thus reduces the amount of the separator used.

Preferably, the negative electrodes include two negative electrode plates each formed by bending into a substantially U shape, one of the negative electrode plates is located to face first paired side peripheral surfaces and a bottom surface of the positive electrode plate, and another one of the negative electrode plates is located to face second paired side peripheral surfaces and the bottom surface of the positive electrode plate. In this configuration, the two negative electrode plates can be bent into the substantially U shape and can be disposed to sandwich the positive electrode. The number of components is reduced and the battery assembling is facilitated in comparison to a case where the negative electrode is located at each of the four side peripheral surfaces of the positive electrode.

Preferably, each of the positive electrode and the negative electrode includes a current collecting terminal, and the current collecting terminal of the positive electrode or the negative electrode is not welded to but in contact with an inner surface of the battery case and is pressed by the spacer toward the inner surface. In this configuration, the current collecting terminal of one of the positive electrode plate and the negative electrode plate is not welded to but in contact with the inner surface of the battery case and is pressed toward the inner surface by the spacer. This configuration eliminates the work of welding the current collecting terminal to the battery case. The current collecting terminal and the battery case can be made in contact with each other by simply inserting the spacer into the battery case. This leads to reduction in number of the production steps. The spacer presses the current collecting terminal toward the battery case, so that good electrical connection between the current collecting terminal and the battery case can be kept and resistance between the current collecting terminal and the battery case can be reduced as much as possible.

Even when the spacers fix the electrode group, the electrode group may be displaced in the center axis direction of the battery case, in other words, in the longitudinal direction of the battery case. In order to keep the contact with the battery case and keep good electrical connection even in the case where the electrode group is displaced in the longitudinal direction of the battery case, the current collecting terminal is preferably in contact with the inner peripheral surface of the battery case.

Preferably, the battery further includes a solution retaining member disposed in the battery case to be in contact with the electrode group, for retaining an electrolyte solution, and the spacers press the electrode group and the solution retaining member toward the battery case. In this configuration, the solution retaining member retaining the electrolyte solution is made in contact with the electrode group. The electrolyte solution can be supplied from the solution retaining member to the electrode group to sufficiently keep the electrolyte solution included in the separator. This configuration suppresses increase in internal resistance of the electrode group. In this case, there is no need to thicken the separator in the electrode group, and the electrode group is not deteriorated in discharge performance. Furthermore, the spacers press the solution retaining member, so that the solution retaining member and the electrode group can be kept in contact with each other.

The solution retaining member is preferably sandwiched and pressed between the spacers and the electrode group. In this configuration, in order to fix the solution retaining member and easily and reliably achieve the contact between the solution retaining member and the electrode group, the solution retaining member is preferably sandwiched and pressed between the spacers and the electrode group.

Preferably, the spacers are located to sandwich the electrode group in a layered direction, the positive electrode or the negative electrode includes a first plate element having a current collecting terminal and at least one second plate element having no current collecting terminal, and the plate elements are contacted and layered. In this configuration, the positive electrode or the negative electrode is divided into the first plate element and the second plate element. It is thus possible to thin the first plate element including the current collecting terminal as much as possible and reduce the amount of the active material removed from the first plate element. Meanwhile, there is no need to remove the active material from the second plate element. Such division into the first plate element and the second plate element leads to reduction in loss of the active material and improvement in filling efficiency of the active material in the entire electrode. Furthermore, the current collecting terminal has only to be welded to the first plate element with no need for welding any additional current collecting terminal. This configuration thus enhances productivity. Moreover, the spacers sandwich the electrode group in the layered direction, and the electrode group is thus pressed. The first plate element and the second plate element can be sufficiently pressed to and in contact with each other, thereby achieving sufficient conductivity. The present invention is particularly effective in a case where the negative electrode and the positive electrode face each other in a small area and the electrode plate needs to be thickened.

Advantages of the Invention

The present invention thus configured achieves provision of a cylindrical battery that requires neither the step of winding an electrode group nor consideration of winding displacement in the electrode group, and suppression of separation of active materials in plates of the cylindrical battery to prevent deterioration in charge-discharge performance.

BRIEF DESCRIPTION OF THE DRAWINGS

FIG. 10 depicts views according to a modification example in which a spacer has coupling portions provided with R-shaped portions.

FIG. 11 depicts views of spacers according to a modification example.

FIGS. 17(A) and 17(B) depict transverse sectional views of spacers according to modification examples of the second embodiment.

FIGS. 19(A) and 19(B) depict transverse sectional views of spacers according to modification examples of the third embodiment.

FIGS. 43(A) and 43(B) depict developed plan views of negative electrode plates according to modification examples of the seventh embodiment.

MODES FOR CARRYING OUT THE INVENTION

First Embodiment

Described below with reference to the drawings is a cylindrical battery according to a first embodiment of the present invention.

Figure 1:
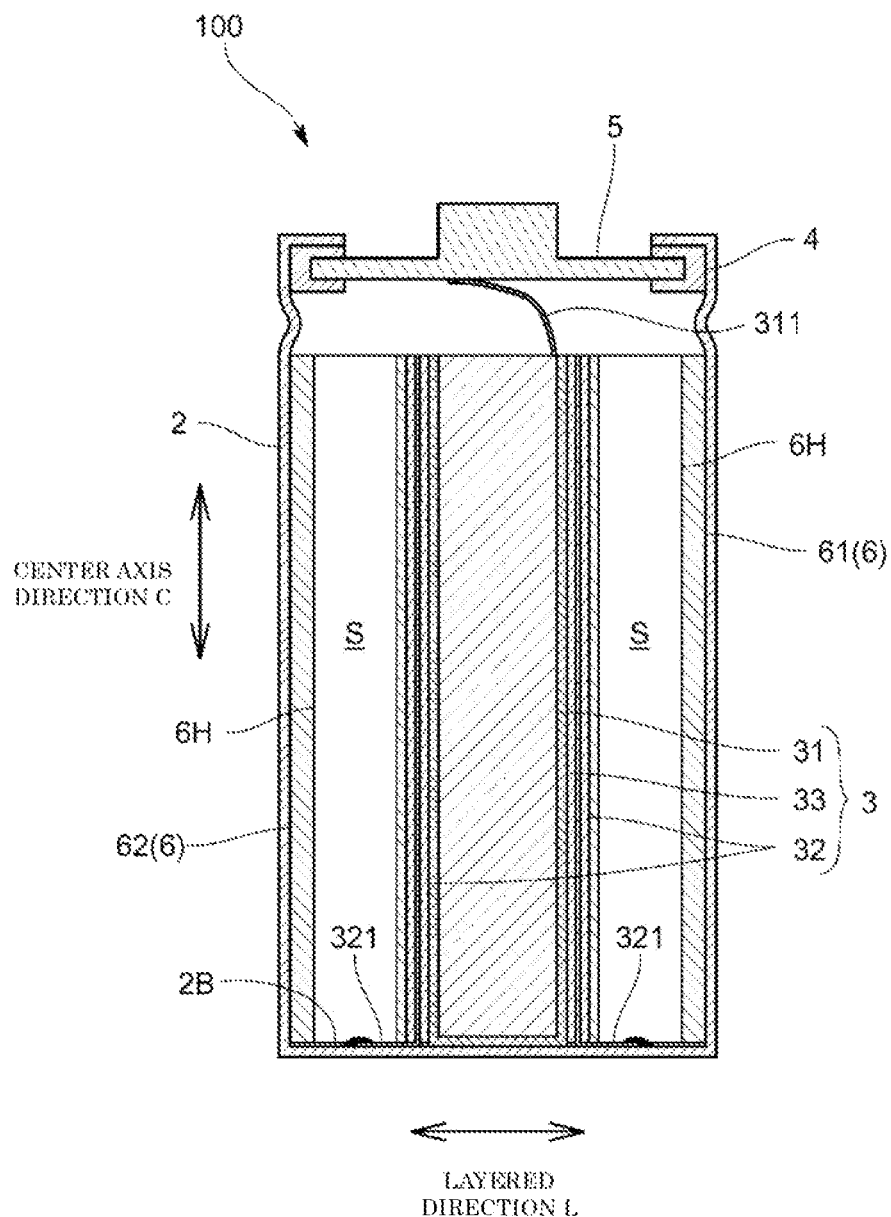
FIG. 1 depicts a longitudinal sectional view of a cylindrical battery according to a first embodiment.
Figure 2:
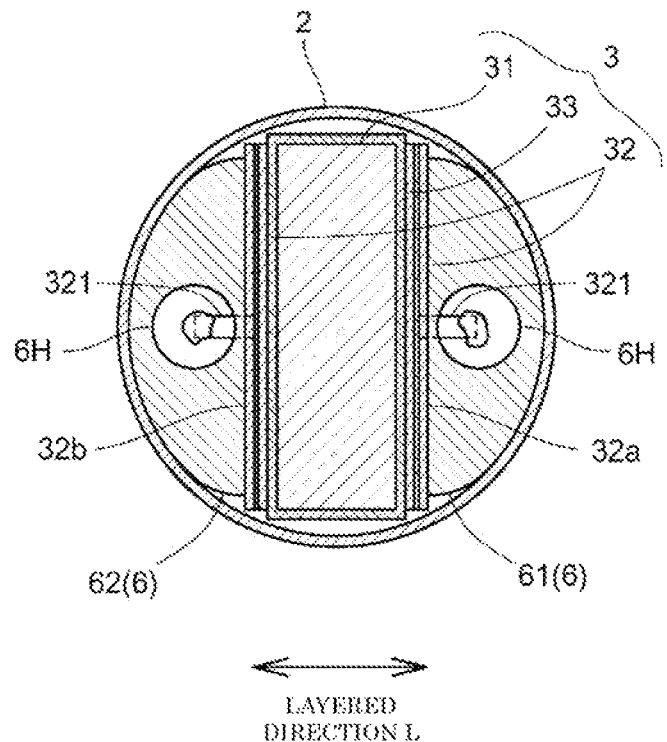
FIG. 2 depicts a transverse sectional view of the cylindrical battery according to the first embodiment.

The cylindrical battery 100 according to the first embodiment is an alkaline storage battery such as a nickel-cadmium storage battery or a nickel-metal hydride storage battery. More specifically, the cylindrical battery 100 is of a low capacity type such as a AA battery having a capacity of not more than 1.800 mAh or a AAA battery having a capacity of not more than 650 mAh, for example. As shown in FIGS. 1 and 2, the cylindrical battery 100 includes a metal battery case 2 having a bottomed cylindrical shape and an electrode group 3 that is located in the battery case 2, has a substantially rectangular parallelepiped shape, and includes a positive electrode plate 31, negative electrode plates 32, and a separator 33.

The battery case 2 is coated with nickel and has a bottomed cylindrical shape. As shown in FIG. 1, the battery case 2 has an upper opening that is sealed with a sealing member 5 with an insulating member 4 being interposed therebetween. The sealing member 5 has a rear surface to which a current collecting terminal 311 projecting from the upper end of the positive electrode plate 31 is connected by welding or the like directly or by way of a current collecting plate (not shown), so that the sealing member 5 functions as a positive terminal. As to be described later, in the present embodiment, the battery case 2 has a bottom surface 2B to which current collecting terminals 321 of the negative electrode plates 32 located at the outermost position in the electrode group 3 is welded.

The electrode group 3 has a pair of flat outer side surfaces opposed to each other. In the electrode group 3, the positive electrode plate 31 and the negative electrode plates 32 are layered with the separator 33, which is nonwoven fabric made of polyolefin or the like, being interposed therebetween. More specifically, the electrode group 3 according to the present embodiment has the substantially rectangular parallelepiped shape. The shape of the electrode group 3 is not limited to the substantially rectangular parallelepiped shape. As long as having the pair of flat outer side surfaces opposed to each other, the electrode group 3 can alternatively have stepped or circular arc side surfaces perpendicular to the pair of outer side surfaces. The separator 33 is impregnated therein with an electrolyte solution of potassium hydroxide or the like.

The positive electrode plate 31 includes a positive electrode board made of foamed nickel and a mixture of a nickel hydroxide active material and a cobalt compound serving as a conductive material. The mixture is filled in pores of the positive electrode board. The positive electrode plate 31 is filled with the mixture and is then pressure molded. The positive electrode board is partially provided with the current collecting terminal 311. The nickel hydroxide active material can be nickel hydroxide in the case of a nickel-cadmium storage battery and can be nickel hydroxide including calcium hydroxide added thereto in the case of a nickel-metal hydride storage battery.

The negative electrode plates 32 each include a negative current collector made of a flat punched steel plate coated with nickel and a negative active material applied on the negative current collector, for example. The negative active material can be a mixture of powdered cadmium oxide and powdered metal cadmium in the case of a nickel-cadmium battery and can be mainly powdered hydrogen storage alloy of the $AB_5$ type (the rare earth system), the $AB_2$ type (the Laves phase), or the like, in the case of a nickel-metal hydride battery.

Figure 3:
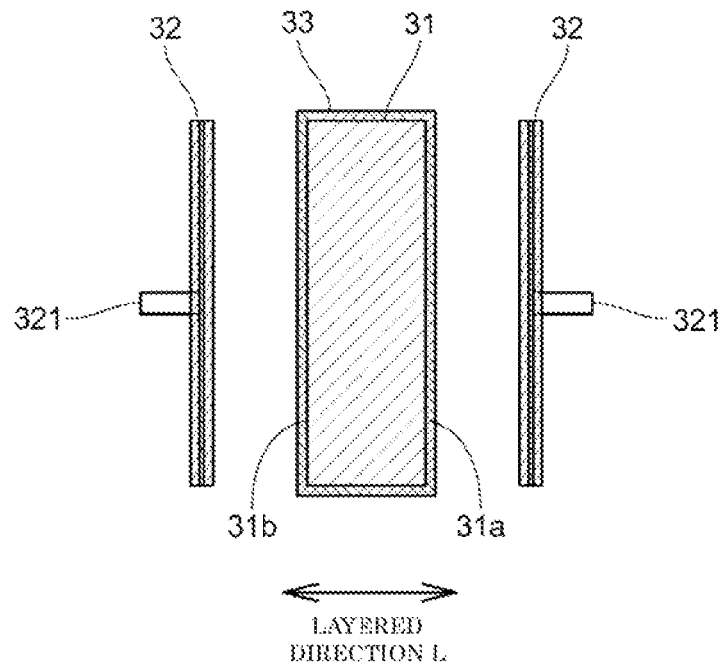
FIG. 3 depicts an exploded view of an electrode group according to the first embodiment.

As shown in FIG. 3, in the electrode group 3 according to the present embodiment, the single positive electrode plate 31 has two side surfaces 31a and 31b opposed to each other, and the positive electrode plate 31, the negative electrode plates 32, and the separator are layered such that the side surfaces 31a and 31b are sandwiched between the negative electrode plates 32 with the separator being interposed therebetween and the negative electrode plates 32 are respectively located at the outermost positions in a layered direction L.

As shown in FIGS. 1 and 2, the electrode group 3 according to the present embodiment is accommodated in the battery case 2 such that the layered direction L thereof is perpendicular to a center axis direction C of the battery case 2.

As shown in FIGS. 1 and 2, the cylindrical battery 100 according to the present embodiment includes spacers 6 for pressing the electrode group 3. The spacers 6 include paired spacers 61 and 62 that are interposed between an inner peripheral surface of the battery case 2 and the side surfaces of the electrode group 3 and fix the electrode group 3 in the battery case 2. The paired spacers 61 and 62 are disposed in spaces defined by the inner peripheral surface of the battery case 2 and the side surfaces of the electrode group 3, respectively, so as to sandwich the electrode group 3 in the layered direction L.

The paired spacers 61 and 62 are made of resin such as acrylic resin, polypropylene resin, or nylon resin, or are made of metal such as stainless steel, and have the same shapes.

The spacers 61 and 62 are preferred to have uniform sectional shapes in the center axis direction C and are in substantially entire contact with outer side surfaces 32a and 32b (see FIG. 2) of the negative electrode plates 32 in the layered direction L. The spacers 61 and 62 are in contact with the inner peripheral surface of the battery case 2 from the top to the bottom. The paired spacers 61 and 62 thus evenly press the electrode group 3. This improves charge-discharge efficiency. Alternatively, the spacers can be in partial contact with the plates, respectively.

Figure 4:
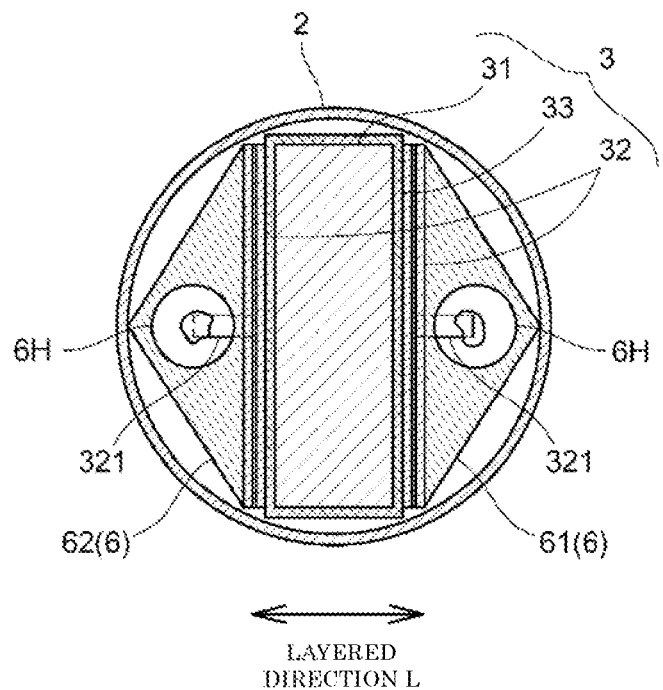
FIG. 4 depicts a transverse sectional view of an alkaline storage battery according to a modification example of the first embodiment.
Figure 5:
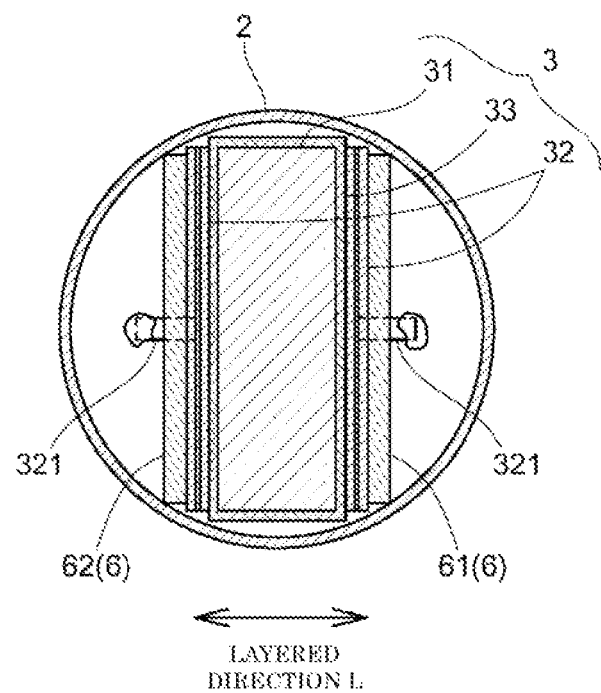
FIG. 5 depicts a transverse sectional view of an alkaline storage battery according to a modification example of the first embodiment.

The spacers 61 and 62 may have portions to be in contact with the battery case 2, the portions having circular arc shapes, so that the spacers 61 and 62 are made in contact in a predetermined peripheral range of the battery case 2 and press force applied to the battery case 2 is dispersed. If the battery case 2 keeps sufficient mechanical strength, the spacers 61 and 62 may alternatively have rectangular shapes and may be in contact with the battery case 2 at edges thereof, as shown in FIG. 4. The battery case 2 is preferably in contact with the spacers 61 and 62 on at least four edges. The configuration, in which the battery case 2 is in contact with the spacers 61 and 62 on the four edges as shown in FIG. 5, can have larger spaces between the spacers 61 and 62 and the battery case 2 and contributes to suppressing increase in amount of the electrolyte solution and increase in internal pressure. The battery case 2 is more preferably in contact with the spacers 61 and 62 on at least six edges. When the battery case 2 is in contact with the spacers 61 and 62 on the six edges, the battery case 2 can keep a substantially perfect circle. If the battery case 2 is deformed into an elliptic shape, error may occur when sealing the battery case 2. The edges herein are parallel to the center axis direction. Each of the spacers 61 and 62 shown in FIG. 4 has an isosceles triangle that has a bottom side in a cross section in contact with corresponding one of the negative electrode plates 32. When the spacers 61 and 62 are in contact with the battery case 2 on the sides, the spacers 61 and 62 and the battery case 2 can have larger spaces therebetween and contribute to suppressing increase in amount of the electrolyte solution and increase in internal pressure.

As shown in FIGS. 1 and 2, the spacers 61 and 62 form spaces S that are communicated from the top to the bottom (in the center axis direction C) and receive welding rods WR used for welding the current collecting terminals 321 of the negative electrode plates 32 in the electrode group 3 to the bottom surface 2B of the battery case 2, respectively. These spaces S are communicated from the bottom surface 2B of the battery case 2 to the upper opening of the battery case 2. More specifically, the spacers 61 and 62 each have an insertion hole 6H that is communicated from the top to the bottom and receive the welding rod WR. The insertion hole 6H is not limited in shape to a circular shape as long as the welding rod WR can be inserted thereinto to weld, and can have a polygonal shape or an elliptic shape.

In the present embodiment, the negative electrode plates 32 are welded to the bottom surface 2B of the battery case 2, and the spacers 61 and 62 in contact with the negative electrode plates 32 are formed with the insertion holes 6H, respectively. The insertion holes 6H are positioned such that the current collecting terminals 321 of the negative electrode plates 32 are located in the insertion holes 6H in the state where the spacers 61 and 62 fix the electrode group 3. The positions of the insertion holes 6H are thus determined in accordance with the positions of the current collecting terminals 321 of the negative electrode plates 32.

Briefly described next is a method of producing an alkaline storage battery 100 configured as described above.

Figure 6:
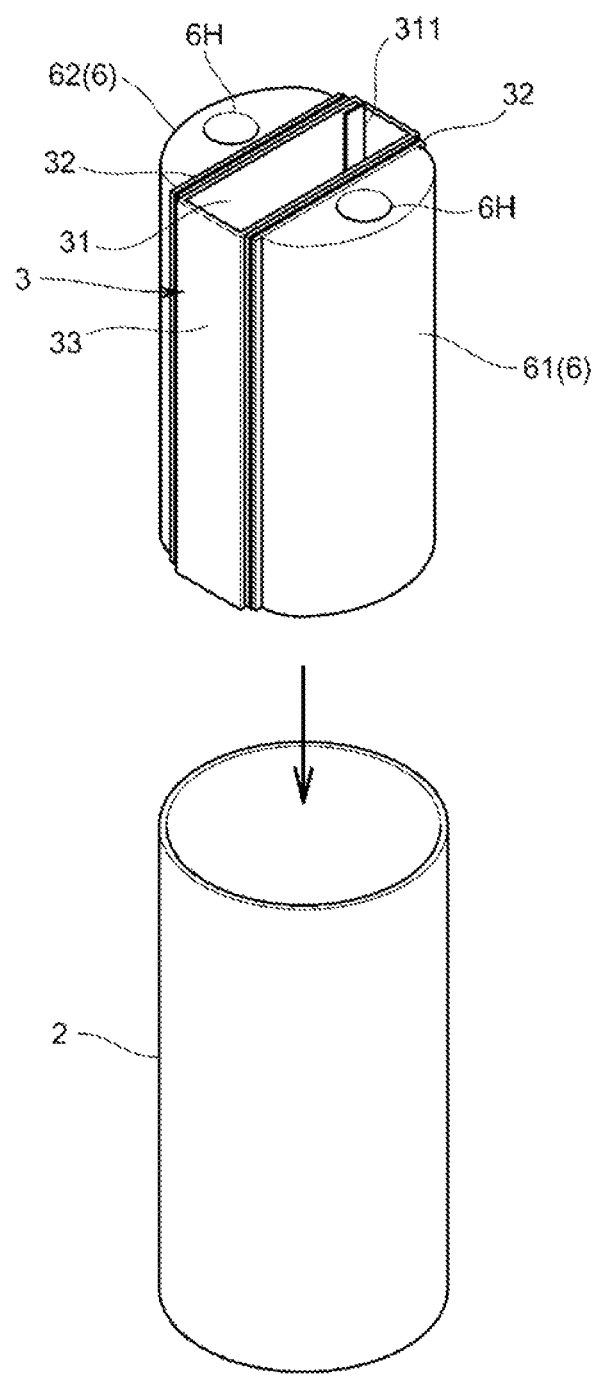
FIG. 6 depicts a view showing a method of producing a cylindrical battery according to the first embodiment.

The separator 33 is initially provided on the two opposite side surfaces 31a and 31b of the positive electrode plate 31. The separator 33 according to the present embodiment has a bag shape. The bag-shaped separator 33 accommodates the positive electrode plate 31, so that the separator 33 is provided on the four side surfaces of the positive electrode plate 31. The negative electrode plates 32 are then layered to sandwich the two side surfaces 31a and 31b of the positive electrode plate 31. The electrode group 3 thus layered is sandwiched between the paired spacers 61 and 62 in the layered direction L. An assembly thus obtained is located in the battery case 2 (see FIG. 6). In the state where the assembly is located, the current collecting terminals 321 of the negative electrode plates 32 are positioned in the insertion holes 6H of the spacers 61 and 62. Alternatively, the paired spacers 61 and 62 can be accommodated after the electrode group 3 is accommodated in the battery case 2, to sandwich the electrode group 3.

Figure 7:
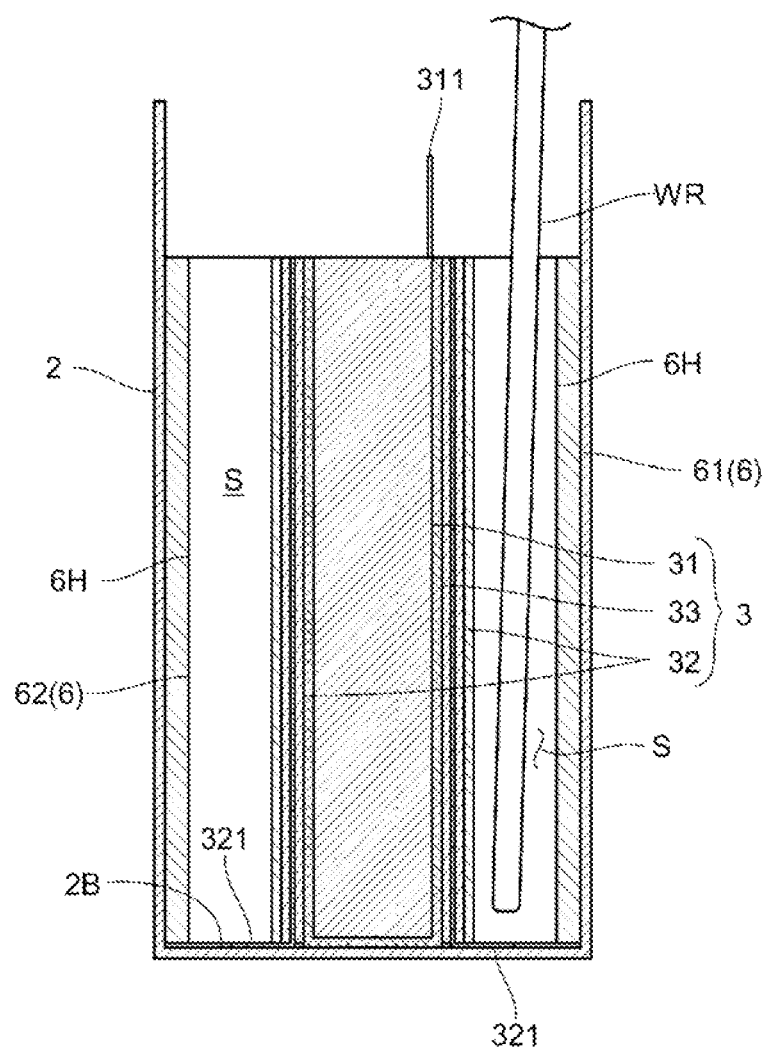
FIG. 7 depicts a view showing the method of producing the cylindrical battery according to the first embodiment.

In the state where the electrode group 3 is fixed in the battery case 2, the welding rods WR are inserted into the insertion holes 6H in the spacers 61 and 62, and the current collecting terminals 321 of the negative electrode plates 32 are connected by welding to the bottom surface 2B of the battery case 2 (see FIG. 7). The battery case 2 is then filled with the electrolyte solution. The current collecting terminal 311 of the positive electrode plate 31 is then connected to the rear surface of the sealing member 5 directly or by way of a current collecting plate (not shown). The sealing member 5 is fixed by swaging or the like to the upper opening of the battery case 2 with the insulating member 4 being interposed therebetween.

Effects of First Embodiment

In the alkaline storage battery 100 according to the first embodiment thus configured, the battery case 2 accommodates the electrode group 3 in which the positive electrode plate 31 and the negative electrode plates 32 are layered with the separator 33 being interposed therebetween. The battery thus provided does not cause winding displacement in the electrode group 3 and various problems related to the winding displacement. The cylindrical shape of the battery case 2 enhances strength against increase in internal pressure.

Furthermore, the spacers 61 and 62 press and fix the electrode group 3 in the battery case 2 to prevent movement of the electrode group 3 relative to the battery case 2. This configuration suppresses separation of the active materials in the positive electrode plate 31 and the negative electrode plates 32 to prevent deterioration in charge-discharge performance and rather improve the charge-discharge performance.

Furthermore, the spacers 61 and 62 are formed with the insertion holes 6H for the welding rods, so that the current collecting terminals 321 of the negative electrode plates 32 can be welded after the electrode group 3 and the spacers 61 and 62 are inserted into the battery case 2. If the spacers 61 and 62 are inserted after the current collecting terminals 321 of the negative electrode plates 32 are welded, the electrode group 3 can be possibly displaced while the spacers 61 and 62 are inserted thereby to tear or damage welded portions. This problem is not caused in the present embodiment because welding is conducted after the spacers 61 and 62 are inserted.

Modification Examples of First Embodiment

Figure 8:
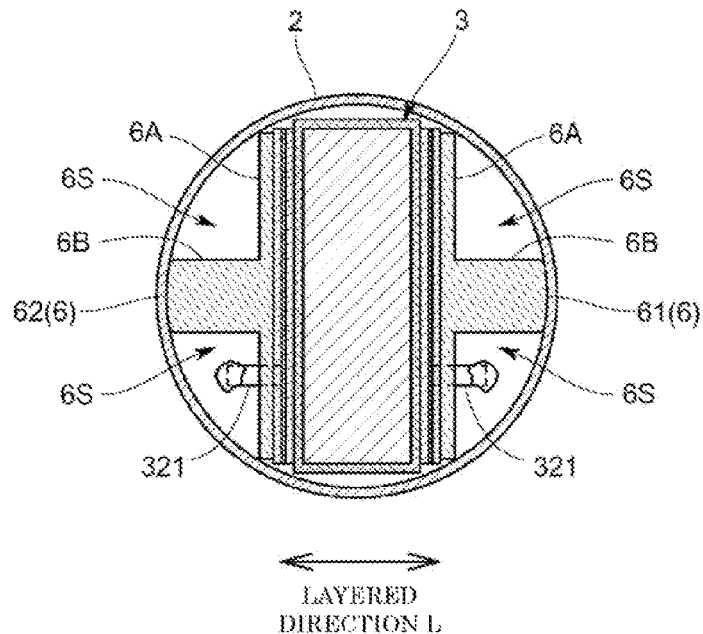
FIG. 8 depicts a transverse sectional view of an alkaline storage battery according to a modification example of the first embodiment.

It is noted that the present invention is not limited to the first embodiment. For example, the insertion holes 6H in the spacers 61 and 62 secure welding spaces in the embodiment described above. Alternatively, as shown in FIG. 8, the spacers 61 and 62 provided with no insertion holes 6H can secure welding spaces with outer shapes thereof. More specifically, each of the spacers 61 and 62 may have concave parts 6S on the side surface and have a uniform sectional shape in the center axis direction C. In FIG. 8, each of the spacers 61 and 62 has an electrode contact portion 6A in contact with the outermost surface of the electrode group 3 in the layered direction, one or a plurality of case contact portions 6B in contact with the inner peripheral surface of the battery case 2, and the concave parts 6S defined by them. Also in such a configuration, the current collecting terminals 321 of the negative electrode plates 32 can be welded to the bottom surface 2B of the battery case 2 with use of the welding spaces that are formed by the concave parts 6S of the spacers 61 and 62 after the spacers 61 and 62 are inserted.

Figure 9:
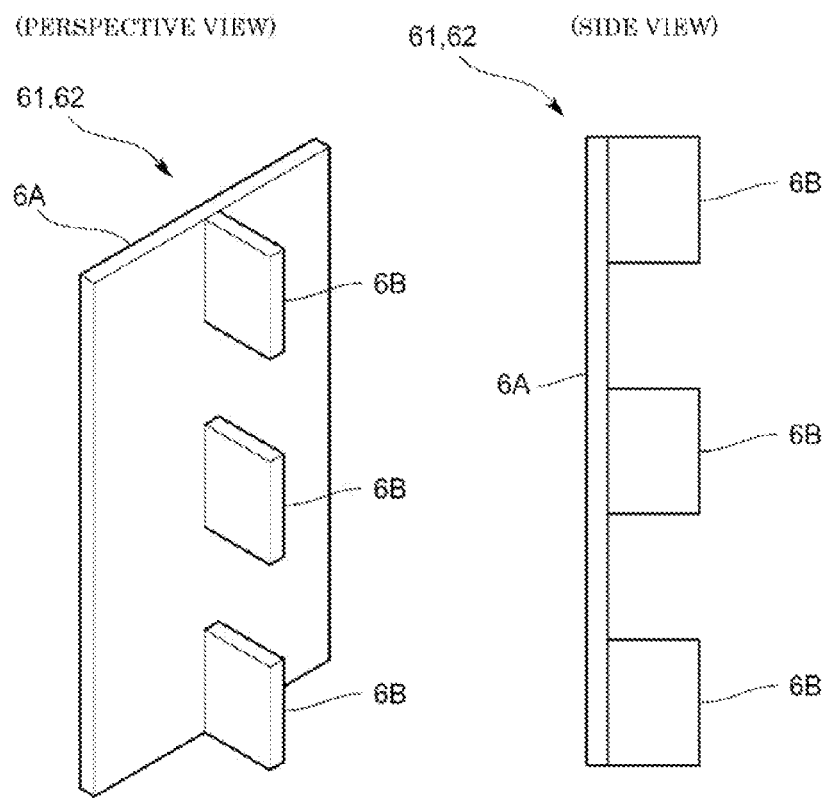
FIG. 9 depicts a perspective view and a side view of a spacer according to a modification example.

Instead of having the uniform sectional shape in the center axis direction C, each of the spacers 61 and 62 can be provided intermittently with the plurality of case contact portions 6B along the center axis direction C and have a substantially comb teeth shape in a side view as shown in FIG. 9. This configuration reduces the amount of the material for the spacers 61 and 62 and thus achieves reduction in cost. This configuration also facilitates the electrolyte solution filling.

Furthermore, as shown in FIG. 10, the spacers 61 and 62 shown in FIG. 8 (hereinafter, referred to as first spacers) or the spacers 61 and 62 shown in FIG. 9 (hereinafter, referred to as second spacers) are preferably provided with curved R-shaped portions R1 and R2 entirely or partially at corners serving as coupling portions between the electrode contact portion 6A and the case contact portions 6B. This configuration enhances mechanical strength of the coupling portions. The first spacers 61 and 62 are provided with the R-shaped portions R1 at the two corners that are formed by the electrode contact portion 6A and each of the case contact portions 6B and are along the longitudinal direction. The second spacers 61 and 62 are provided with the R-shaped portions R2 at the two corners R1 along the longitudinal direction and at one or more corners along the short-length direction, which are formed by the electrode contact portion 6A and each of the case contact portions 6B.

As shown in FIG. 11, ends of the paired spacers 61 and 62 can be provided continuously and a spacer member 6Z integrally formed can be bent to sandwich the electrode group 3. In the paired spacers 61 and 62, the ends in the center axis direction C of the battery case 2 are preferably provided continuously to each other. More specifically, each of the spacers 61 and 62 may have the electrode contact portion 6A in contact with the outermost surface of the electrode group 3 in the layered direction and one or a plurality of case contact portions 6B in contact with the inner peripheral surface of the battery case 2, and the ends of the electrode contact portions 6A in the center axis direction C of the battery case 2 are provided continuously to each other.

In the case where the paired spacers 61 and 62 are provided integrally with each other, the spacers 61 and 62 have only to be bent and sandwich the electrode group 3 to fix the electrode group 3 at the time of assembling the battery. This configuration suppresses layering displacement of the electrode group 3 and facilitates work of assembling the battery. Suppressed layering displacement of the electrode group 3 facilitates insertion of the electrode group 3 and the spacers 61 and 62 into the battery case 2. Furthermore, integration of spacers 61 and 62 leads to reduction in number of the components. When the spacers 61 and 62 bent to sandwich the electrode group 3 are inserted into the battery case 2, the bent portion between the spacers 61 and 62 is located at an end of the battery case 2 in the center axis direction C and is thus prevented from contacting with the inner peripheral surface of the battery case 2 and disturbing the insertion. If the spacers 61 and 62 are long along the center axis direction C of the battery case 2, the ends of the spacers in the center axis direction C of the battery case 2 are provided continuously with each other and are thus easily bent.

In each of the embodiments described above, the electrode group, the two opposite side surfaces of which are sandwiched between the paired spacers, is fixed in the battery case. Alternatively, the two opposite side surfaces of the electrode group can be sandwiched with three or more spacers. Still alternatively, there can be provided spacers between the four side surfaces of the electrode group and the inner peripheral surface of the battery case, respectively. The respective spacers can be coupled integrally by coupling portions.

Figure 12:
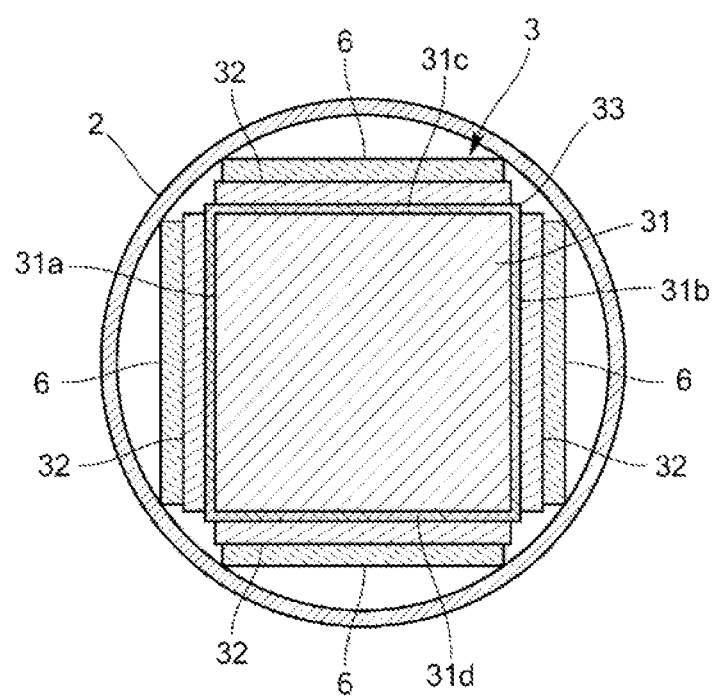
FIG. 12 depicts a transverse sectional view of an alkaline storage battery according to a modification example of the first embodiment.

Still alternatively, as shown in FIG. 12, the electrode group 3 can have a positive electrode 31 having a substantially quadrangular prism shape and flat negative electrodes 32 that are provided to face at least four outer side surfaces 31a to 31d of the positive electrode 31 with the separator 33 being interposed therebetween.

The positive electrode 31 can be made of a positive substrate as a single member having a substantially quadrangular prism shape and a positive active material filled therein, or can be made of flat positive substrates that are filled with the positive active material and are layered or bent into a substantially quadrangular prism shape. The positive electrode 31 preferably has a substantially square shape in a cross section perpendicular to the center axis direction C of the battery case 2. The current collecting terminal of the positive electrode 31 can be made of a compressed positive substrate or can be made of a nickel steel plate or the like and be welded to the positive substrate.

The negative electrodes 32 are made of two negative electrode plates each bent into a substantially U shape. One of the negative electrode plates is located to face first paired outer side surfaces 3a and 3b and the bottom surface of the positive electrode, whereas the other one of the negative electrode plates is located to face second paired outer side surfaces 3c and 3d and the bottom surface of the positive electrode. Alternatively, the battery assembling can be facilitated by surrounding the four outer side surfaces 31a to 31d of the positive electrode 31 with the negative electrode 32 with the separator 33 being interposed therebetween.

The positive electrode 31 having the substantially quadrangular prism shape achieves increase in capacity of the positive electrode relative to the cylindrical battery case 2. Especially the positive electrode 31 having the substantially square sectional shape achieves further increase in capacity of the positive electrode relative to the battery case 2. The flat negative electrodes 32 provided on the at least four outer side surfaces 31a to 31d of the positive electrode 31 achieves increase in capacity with no deterioration in discharge performance. Furthermore, this configuration has smaller areas where the positive electrode 31 and the negative electrodes 32 face each other and thus reduces the amount of the separator 33 being used. Moreover, the positive electrode 31 can be located to be sandwiched between the two negative electrode plates each bent into the substantially U shape. This configuration achieves reduction in number of the components and facilitates the battery assembling in comparison to a case where the negative electrodes 32 are provided on the four outer side surfaces 31a to 31d of the positive electrode 31.

The spacers according to the embodiment described above provide the welding spaces. In a case where the spacers are located after the current collecting terminal of the negative electrode plate in the electrode group is welded to the battery case, the spacers are not required to provide the welding spaces.

The positive electrode plate 31 can be sandwiched by two separate negative electrode plates 32, or can be located in one negative electrode plate 32 that is bent into a substantially U shape. When the single negative electrode plate is provided, only one current collecting terminal needs to be provided. In this case, only one of the paired spacers needs to be formed with the insertion hole for the welding rod. This configuration simplifies the welding work.

The positive electrode plate can be configured similarly to the negative electrode plate 32 by applying a positive active material to a flat positive current collector. In this case, a plurality of positive electrode plates and a plurality of negative electrode plates can be layered alternately with separators being interposed therebetween. Also in this case, the electrode group is accommodated in the battery case such that that the layered direction is perpendicular to the center axis direction of the battery case.

The electrode group according to the embodiment described above is located in the battery case such that the layered direction is perpendicular to the center axis direction of the battery case. Alternatively, the electrode group can be located such that the layered direction is parallel to the center axis direction of the battery case.

Second Embodiment

Described next with reference to the drawings is a cylindrical battery according to a second embodiment of the present invention. It is noted that members corresponding to those of the first embodiment are denoted by the same reference signs.

The cylindrical battery 100 according to the second embodiment is different from that according to the first embodiment in the configuration of the electrode group and the configurations of the paired spacers (the first spacer and the second spacer).

Figure 13:
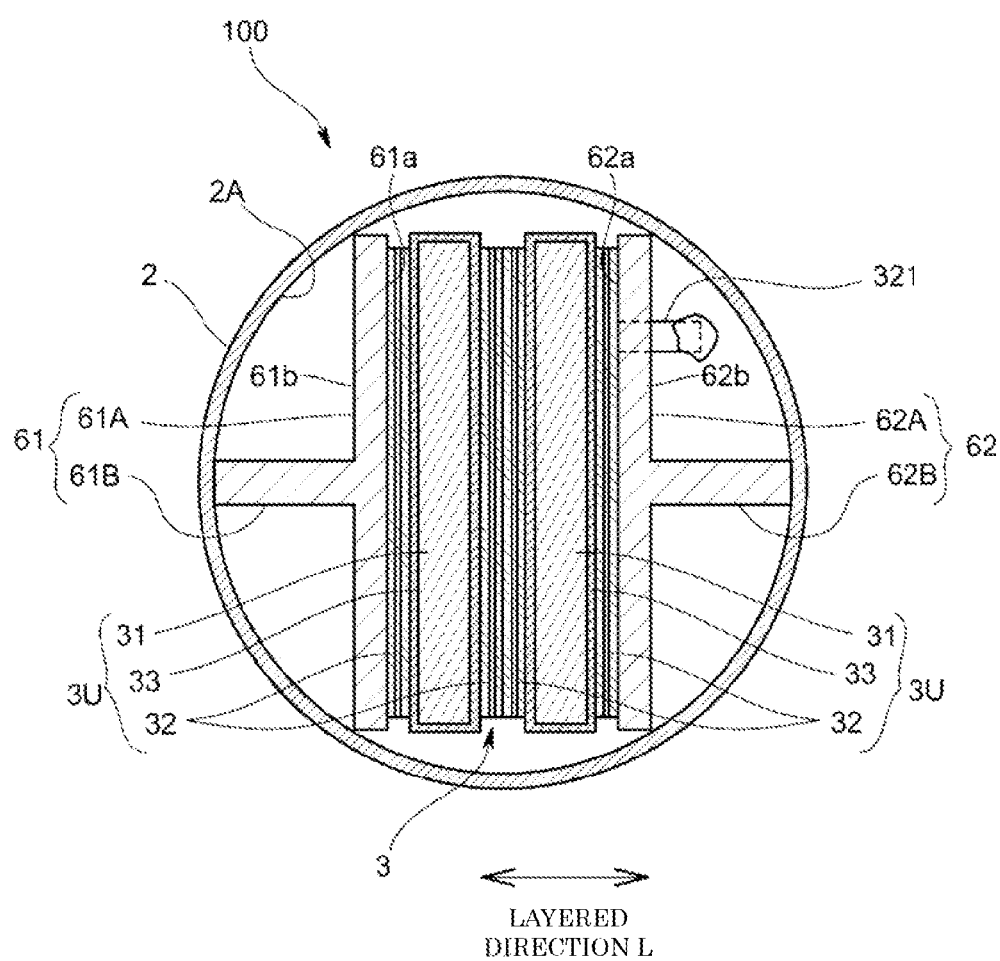
FIG. 13 depicts a transverse sectional view of a cylindrical battery according to a second embodiment.
Figure 14:
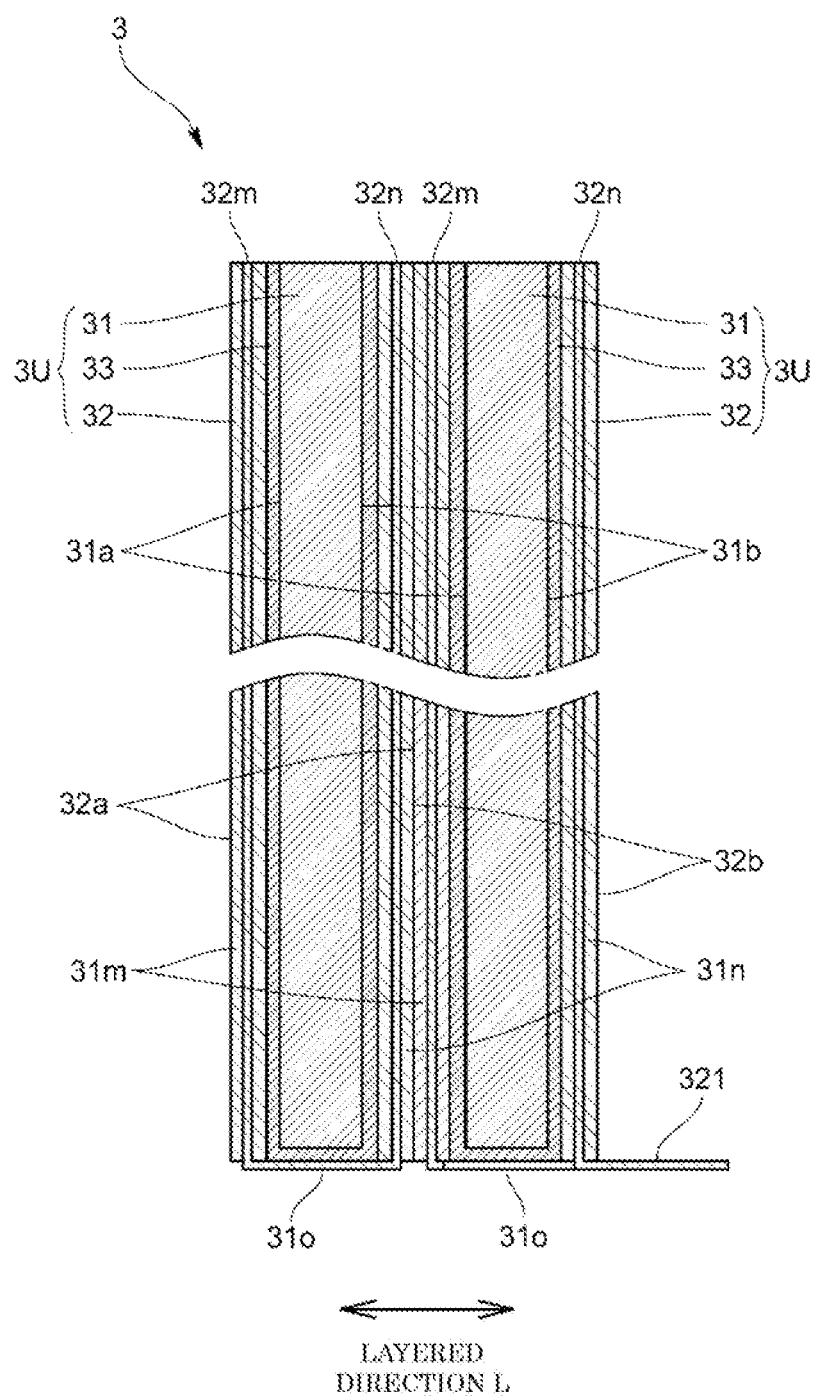
FIG. 14 depicts a longitudinal sectional view of plate units according to the second embodiment.

More specifically, as shown in FIGS. 13 and 14, the electrode group 3 includes one or a plurality of plate units 3U in each of which the single positive electrode plate 31, the negative electrode plate 32, and the separator 33 are layered such that the negative electrode plate 32 sandwiches the two opposite side surfaces 31a and 31b of the single positive electrode plate 31 with the separator 33 being interposed therebetween. More specifically, the negative electrode plate 32 is bent into a substantially U shape as a U-shaped plate. The negative electrode plate 32 is bent into the substantially U shape or the like so that flat plate parts 32m and 32n opposed to each other sandwich the positive electrode plate 31. In the electrode group 3 including the layered plate units 3U, the negative electrode plate 32 is located on each of the outermost surfaces in the layered direction L. The adjacent plate units 3U are electrically conducted with each other because the flat plate parts 32m and 32n of the negative electrode plates 32 are in surface contact with each other. In this configuration, by welding the current collecting terminal 321 led out of one of the plate units 3U, the negative electrode plate 32 of the other plate unit 3U is electrically connected to the bottom surface 2B of the battery case 2. The current collecting terminal 321 formed on the negative electrode plate 32 of the one of the plate units 3U extends outward in the layered direction from the center in the width direction of the negative electrode plate 32 (see FIG. 13), and is formed by partially bending outward a bottom surface part 32o (the coupling portion between the flat plate part 32m and the flat plate part 32n) of the negative electrode plate 32 having the substantially U shape. More specifically, the bottom surface part 32o is partially formed with a slit so as to form a desired shape of the current collecting terminal, and the current collecting terminal 321 is formed by bending outward the inner portion of the slit.

Figure 15:
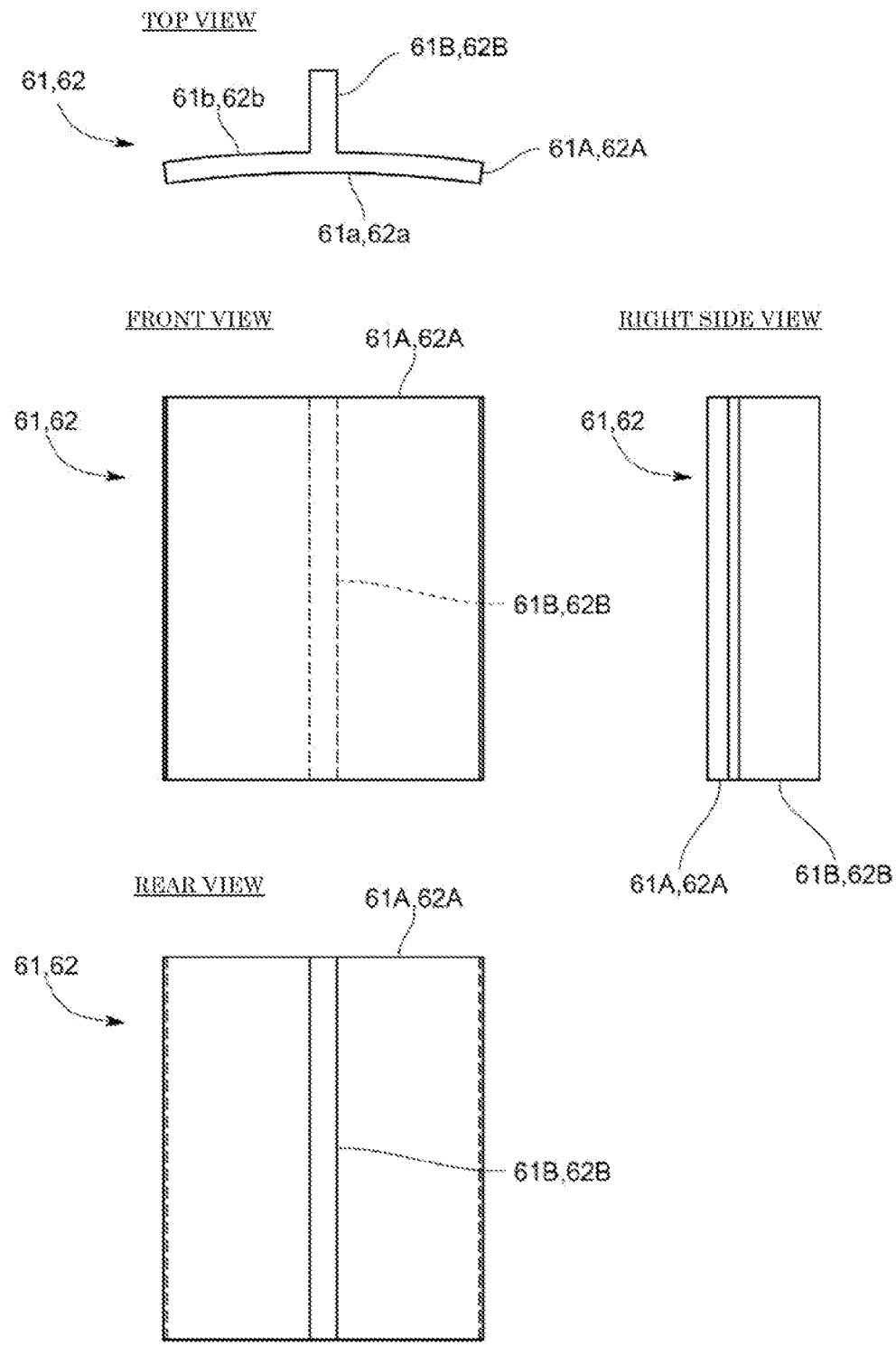
FIG. 15 depicts a top view, a front view, a right side view, and a rear view of each spacer according to the second embodiment.
Figure 16:
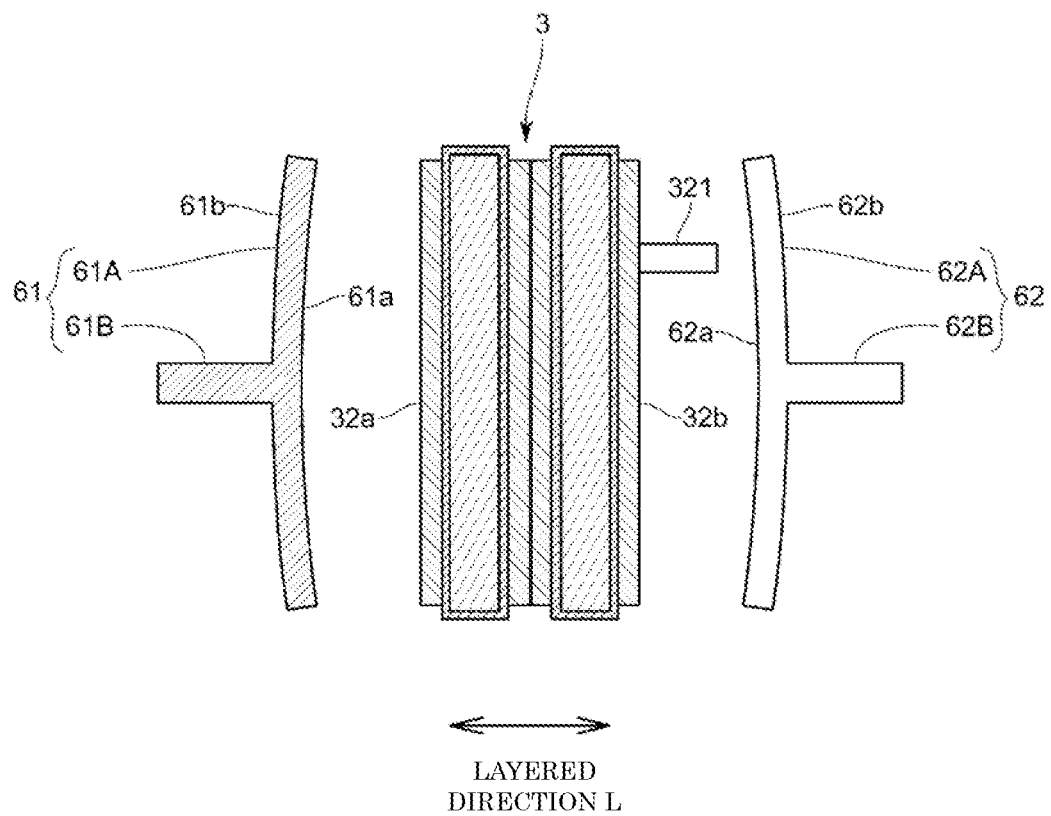
FIG. 16 depicts a transverse sectional view of a state where the respective spacers according to the second embodiment are not in contact with an electrode group.

As shown in FIGS. 15 and 16, the first spacer 61 has an electrode contact portion 61A and a case contact portion 61B. The electrode contact portion 61A has a rectangular flat plate shape and a first surface 61a serving as a contact surface in substantially entire contact with the outermost surface (more particularly, the outer side surface 32a of the negative electrode plate 32) of the electrode group 3 in the layered direction L. The case contact portion 61B extends from a second surface 61b of the electrode contact portion 61A and is in contact with the inner peripheral surface 2A of the battery case 2. The first spacer 61 thus has a substantially T uniform sectional shape when viewed in the center axis direction C. The electrode contact portion 61A is shaped to be along the outermost surface (the outer side surface 32a) of the electrode group 3 in the layered direction L. The case contact portion 61B is provided from the upper end to the lower end at the center in the width direction of the electrode contact portion 61A and has a substantially rectangular shape in a side view. The case contact portion 61B is in contact with the inner peripheral surface 2A of the battery case 2 from the top to the bottom.

As shown in FIGS. 15 and 16, the second spacer 62 has an electrode contact portion 62A and a case contact portion 62B. The electrode contact portion 62A has a rectangular flat plate shape and a first surface 62a serving as a contact surface in substantially entire contact with the outermost surface (more particularly, the outer side surface 32b of the negative electrode plate 32) of the electrode group 3 in the layered direction L. The case contact portion 62B extends from a second surface 62b of the electrode contact portion 62A and is in contact with the inner peripheral surface 2A of the battery case 2. The second spacer 62 thus has a substantially uniform sectional shape. The electrode contact portion 62A is shaped to be along the outermost surface (the outer side surface 32b) of the electrode group 3 in the layered direction L. The case contact portion 62B is provided from the upper end to the lower end at the center in the width direction of the electrode contact portion 62A and has a substantially rectangular shape in a side view. The case contact portion 62B is in contact with the inner peripheral surface 2A of the battery case 2 from the top to the bottom. The case contact portions 61B and 62B of the first and second spacers 61 and 62 are in contact with the inner peripheral surface 2A from the top to the bottom, so that the paired spacers 61 and 62 evenly press the entire electrode group 3. This configuration achieves improvement in charge-discharge efficiency.

As shown in FIGS. 15 and 16, in the first and second spacers 61 and 62, the contact surfaces 61a and 62a of the electrode contact portions 61A and 62A in the state of not being in contact with the electrode group 3 (a natural state with no application of external force) are curved into concave shapes such that the respective ends in the width direction of the contact surfaces 61a and 62a are located forward on the first surface sides with respect to the centers in the width direction in a transverse sectional view. The respective ends in the width direction of the contact surfaces 61a and 62a are in contact with the respective ends in the width direction of the outermost surfaces of the electrode group 3 in the layered direction L, whereas the centers in the width direction of the contact surfaces 61a and 62a are in contact with the centers in the width direction of the outermost surfaces of the electrode group 3 in the layered direction L. Each of the spacers 61 and 62 according to the present embodiment has the uniform sectional shape, so that the shape in a transverse sectional view is the same as the shape in a top view.

More specifically, the spacers 61 and 62 are warped such that the respective ends in the width direction of the electrode contact portions 61A and 62A are located forward on the first surface sides with respect to the centers in the width direction. The contact surfaces 61a and 62a are thus curved into the concave shapes. In the spacers 61 and 62, the electrode contact portions 61A and 62A are symmetrical with respect to the case contact portions 61B and 62B. The electrode contact portions 61A and 62A are warped to be away from the case contact portions 61B and 62B (toward the electrode group 3). When the spacers 61 and 62 are inserted into the battery case 2, the spacers 61 and 62 and the electrode group 3 sandwiched between the spacers 61 and 62 can be easily inserted into the battery case 2. This configuration thus suppresses defective insertion.

In the state where the spacers 61 and 62 are located in the battery case 2, the case contact portions 61B and 62B press the electrode contact portions 61A and 62A toward the electrode group 3 with repulsive force applied from the battery case 2 due to contact with the inner peripheral surface 2A of the battery case 2. The electrode contact portions 61A and 62A are pressed toward the electrode group 3 not only with press force applied from the case contact portions 61B and 62B but also with restoring force due to elastic deformation of the respective ends in the width direction of the electrode contact portions 61A and 62A. In this manner, the centers in the width direction of the electrode group 3 are reliably pressed with the press force applied from the case contact portions 61B and 62B, and the respective ends in the width direction of the electrode group 3 are reliably pressed with the press force applied from the case contact portions 61B and 62B, and with the elastic restoring force of the electrode contact portions 61A and 62A.

Effects of Second Embodiment

In the alkaline storage battery 100 according to the first embodiment thus configured, the contact surfaces 61a and 62a of the electrode contact portions 61A and 62A are curved into the concave shapes such that the respective ends in the width direction of the contact surfaces 61a and 62a are located forward on the first surface sides with respect to the centers in the width direction in a transverse sectional view. When the spacers 61 and 62 press the electrode group 3 in the layered direction L, the restoring force due to elastic deformation of the respective ends in the width direction is applied to the respective ends in the width direction of the electrode group. In this configuration, the respective ends in the width direction of the electrode group 3, which are tend to be insufficiently pressed, can be reliably pressed, and the charge-discharge efficiency can be thus improved.

Modification Examples of Second Embodiment

It is noted that the present invention is not limited to the second embodiment. For example, the contact surfaces 61a and 62a according to the second embodiment are curved into the concave shapes. Alternatively, the contact surfaces 61a and 62a can be bent into concave shapes as shown in FIG. 17(A). Also in this case, the centers in the width direction of the electrode group 3 can be reliably pressed with force applied from the case contact portions 61B and 62B, whereas the respective ends in the width direction of the electrode group 3 can be reliably pressed. It is noted that FIG. 17(A) illustrates the first spacer 61.

In the second embodiment, the electrode contact portions 61A and 62A are warped into the concave shapes so that the contact surfaces 61a and 62a are curved into the concave shapes. Alternatively, as shown in FIG. 17(B), the contact surfaces 61a and 62a can be curved into the concave shapes although the electrode contact portions 61A and 62A are not warped. This configuration also exerts the effects similar to those of the embodiment described above. It is noted that FIG. 17(B) illustrates the first spacer 61.

Third Embodiment

Described next with reference to the drawings is a cylindrical battery according to the third embodiment of the present invention. It is noted that members corresponding to those of the second embodiment are denoted by the same reference signs.

The cylindrical battery 100 according to the third embodiment is different from that according to the first embodiment in the configurations of the electrode contact portions 61A and 62A in the paired spacers 61 and 62.

Figure 18:
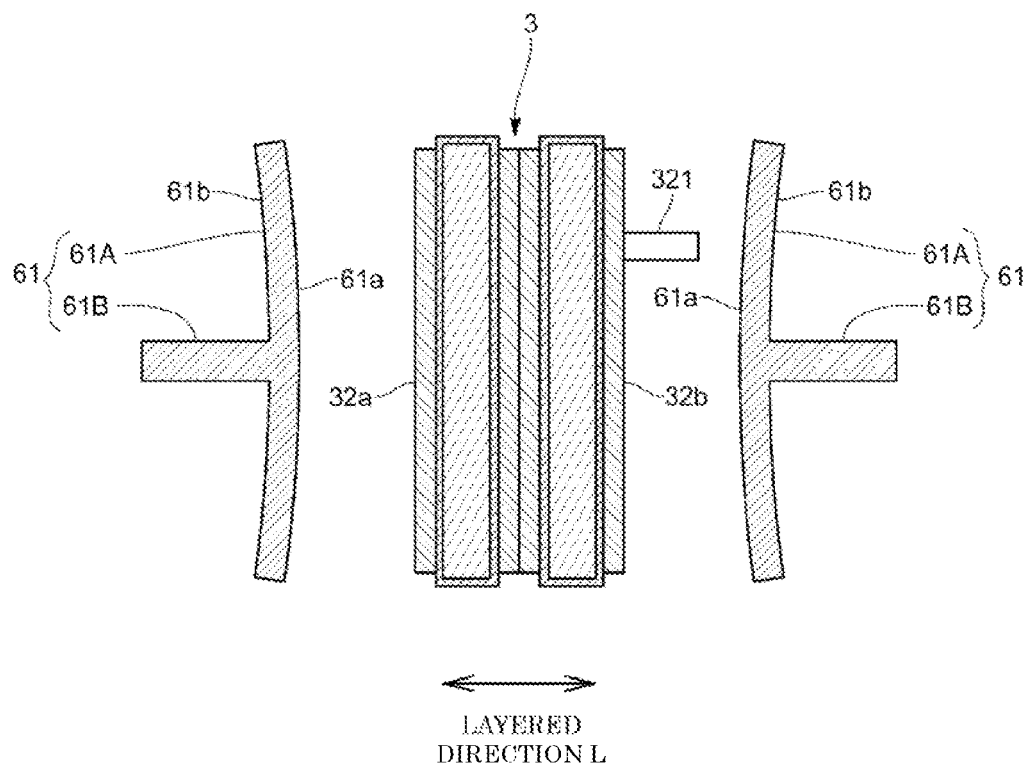
FIG. 18 depicts a transverse sectional view of a state where respective spacers according to a third embodiment are not in contact with an electrode group.

More specifically, as shown in FIG. 18, the first and second spacers 61 and 62 are warped such that the respective ends in the width direction of the electrode contact portions 61A and 62A are located closer to the second surfaces 61b and 62b with respect to the centers in the width direction in the state before being located in the battery case 2 (the natural state with no application of external force). In other words, the electrode contact portions 61A and 62A are warped toward the case contact portions 61B and 62B (away from the electrode group). The contact surfaces 61a and 62a of the electrode contact portions 61A and 62A are curved into the convex shapes such that the respective ends in the width direction of the contact surfaces 61a and 62a are located away from the first surfaces with respect to the centers in the width direction in a transverse sectional view. Each of the spacers 61 and 62 according to the present embodiment has the uniform sectional shape, so that the shape in a transverse sectional view is the same as the shape in a top view. In the state where the spacers 61 and 62 are located in the battery case 2, the respective ends in the width direction of the second surfaces 61b and 62b of the electrode contact portions 61A and 62A of the spacers 61 and 62 are in contact with the inner peripheral surface 2A of the battery case 2.

Effects of Third Embodiment

In the cylindrical battery 100 according to the third embodiment thus configured, in addition to the effects achieved by the provision of the paired spacers 61 and 62 as in the embodiment described above, the electrode contact portions 61A and 62A can reliably press the electrode group 3 because the respective ends in the width direction of the second surfaces 61b and 62b are in contact with the inner peripheral surface 2A of the battery case 2 even in a case where the electrode group 3 is thinned due to production variation or the like and the case contact portions 61B and 62B fail to sufficiently press the electrode contact portions 61A and 62A toward the electrode group 3. This configuration achieves improvement in charge-discharge efficiency. More specifically, the respective ends in the width direction of the second surfaces 61b and 62b are in contact with the inner peripheral surface 2A of the battery case 2 and the centers in the width direction of the first surfaces 61a and 62a are thus pressed toward the electrode group 3. Accordingly, the centers in the width direction of the first surfaces 61a and 62a can reliably press the electrode group.

Modification Examples of Third Embodiment

It is noted that the present invention is not limited to the third embodiment. For example, in the second embodiment, the electrode contact portions 61A and 62A are warped into the convex shapes so that the contact surfaces 61a and 62a are curved into the convex shapes (the second surfaces 61b and 62b are curved into the concave shapes). Alternatively, as shown in FIG. 19(A), the contact surfaces 61a and 62a can be made flat and the second surfaces 61b and 62b can be curved into the concave shapes although the electrode contact portions 61A and 62A are not warped. This configuration also exerts the effects similar to those of the second embodiment. It is noted that FIG. 19(A) illustrates the first spacer 61.

In the third embodiment, the electrode contact portions 61A and 62A are warped so that the respective ends in the width direction of the second surfaces 61b and 62b of the electrode contact portions 61A and 62A are in contact with the inner peripheral surface 2A of the battery case 2 and serve as pressing reinforcement structures of pressing the respective ends in the width direction of the contact surfaces 61a and 62a toward the side surfaces of the electrode group 3. As shown in FIG. 19(B), the pressing reinforcement structures can have ridges 8 formed from the top to the bottom at the respective ends in the width direction of the second surfaces 61b and 62b, or one or a plurality of projections formed partially at the respective ends in the width direction. It is noted that FIG. 19(B) illustrates the first spacer 61.

Fourth Embodiment

Described next with reference to the drawings is a cylindrical battery according to the fourth embodiment of the present invention. It is noted that members corresponding to those of the foregoing embodiments are denoted by the same reference signs.

The cylindrical battery 100 according to the fourth embodiment is different from those according to the first to third embodiments in the configurations of the paired spacers (the first spacer and the second spacer).

Figure 20:
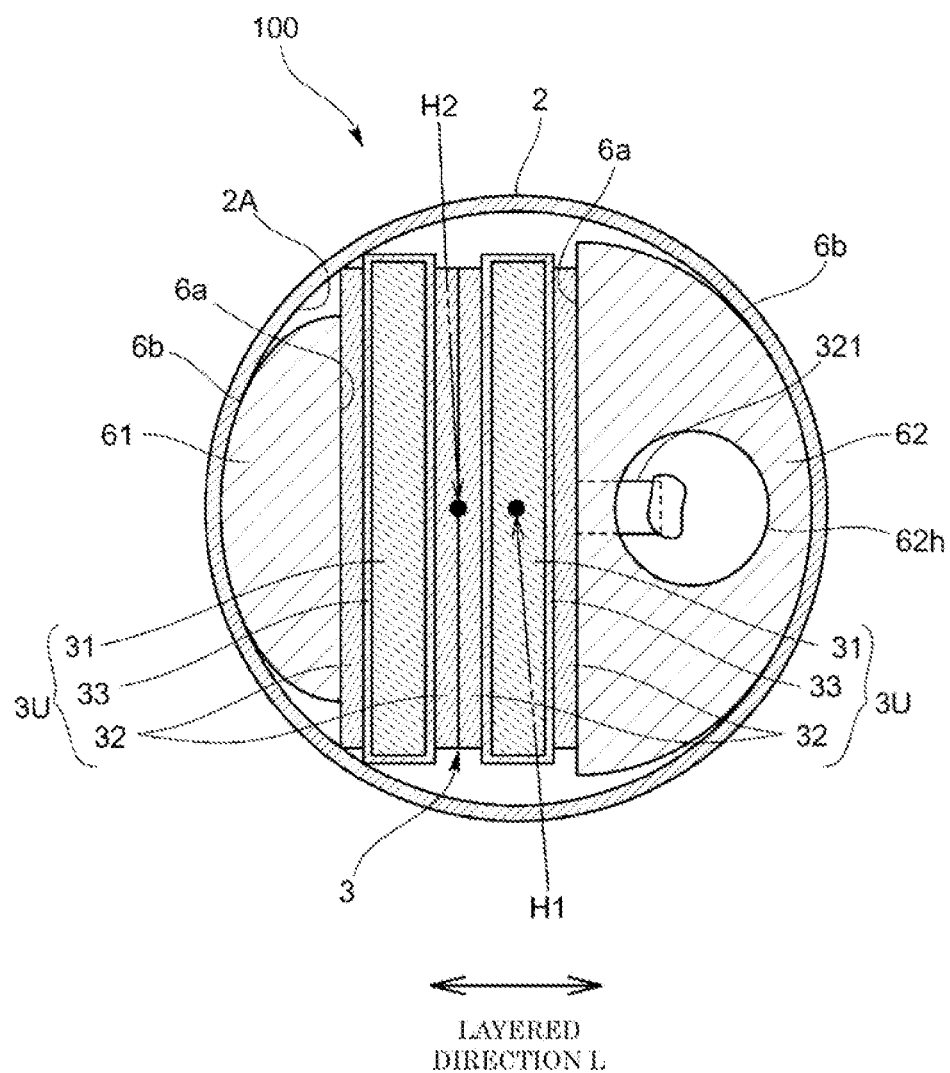
FIG. 20 depicts a transverse sectional view of a cylindrical battery according to a fourth embodiment.

More specifically, the paired spacers 61 and 62 fix the electrode group 3 at a position decentered from a center position H1 of the battery case 2. In other words, as shown in FIG. 20, a center position (center of gravity) H2 in a plan view (when viewed in the center axis direction C) of the electrode group 3 fixed in the battery case 2 is different from the center position H1 of the battery case 2. The center of gravity (not shown) of the entire cylindrical battery 100 is thus different from the center position H1 of the battery case 2.

The paired spacers 61 and 62 are asymmetrical with respect to the electrode group 3 when viewed in the center axis direction C of the battery case 2. Each of the spacers 61 and 62 includes a flat electrode contact surface 6x in contact with the outermost surface of the electrode group 3 in the layered direction L and a substantially circular arc case contact surface 6y that is provided continuously from the respective ends in the width direction of the electrode contact surface 6x and is in contact with the inner peripheral surface 2A of the battery case 2, to have a substantially semicircular uniform sectional shape. The case contact surface 6y is in contact with the inner peripheral surface 2A of the battery case 2 from the top to the bottom. The case contact surfaces 6y of the first and second spacers 61 and 62 are in contact with the inner peripheral surface 2A from the top to the bottom, so that the paired spacers 61 and 62 evenly press the entire electrode group 3. This configuration achieves improvement in charge-discharge efficiency.

The first and second spacers 61 and 62 are asymmetrical with each other, so that the first and second spacers 61 and 62 have different sectional areas within an outline surrounded with the electrode contact surface 6x and the case contact surface 6y in a cross section perpendicular to the center axis direction C. In the present embodiment, the second spacer 62 has a larger outlined sectional area. The center position H2 of the electrode group 3 is thus decentered from the center position H1 of the battery case 2 toward the first spacer 61.

Furthermore, in the present embodiment, the second spacer 62 having the larger outlined sectional area is formed with a welding hole 62h into which a welding rod for welding the current collecting terminal 321 of the negative electrode plate 32 to the bottom surface 2B of the battery case 2 is inserted. The welding hole 62h is not particularly limited as long as it has a shape and a size enough to receive the welding rod, and can have a circular shape as shown in FIG. 20, an elliptic shape, a rectangular shape, or the like.

Figure 21:
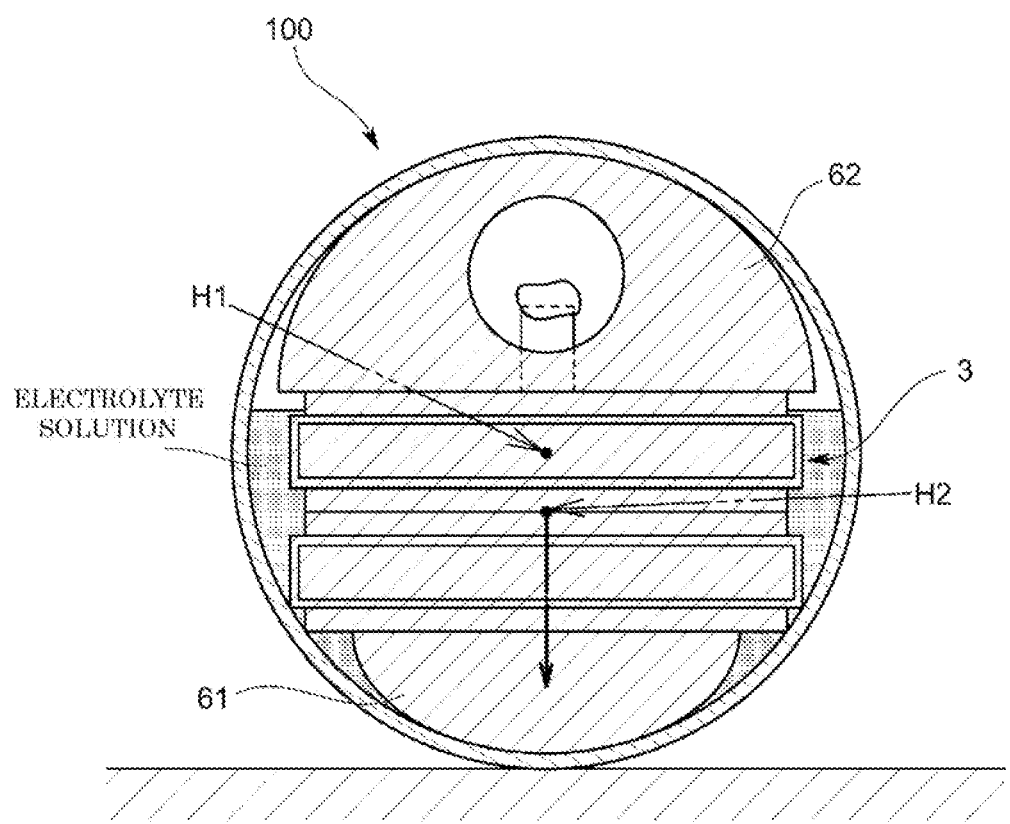
FIG. 21 depicts a schematic view of a state where the cylindrical battery according to the fourth embodiment is laid sideways on a plane.

As shown in FIG. 21, the cylindrical battery 100 is laid sideways at the time of container formation of the cylindrical battery 100. The cylindrical battery 100 laid sideways rotates because its center of gravity is decentered from the center position H1 of the battery case 2, and stops in a state where the center position H2 having larger specific gravity of the electrode group 3 is located vertically below the center position H1. This configuration increases the contact area between the electrode group 3 and the electrolyte solution and stimulates permeation of the electrolyte solution into the electrode group 3.

Effects of Fourth Embodiment

In the alkaline storage battery 100 according to the fourth embodiment thus configured, the paired spacers 61 and 62 fix the electrode group 3 at the position decentered from the center position H1 of the battery case 2. In the state where the cylindrical battery 100 is laid sideways, the center position H2 having the larger specific gravity of the electrode group 3 is located vertically below the center position H1 of the battery case 2, to increase the contact area between the electrolyte solution and the electrode group 3. This configuration facilitates permeation of the electrolyte solution into the electrode group 3 at the time of container formation.

Modification Examples of Fourth Embodiment

Figure 22:
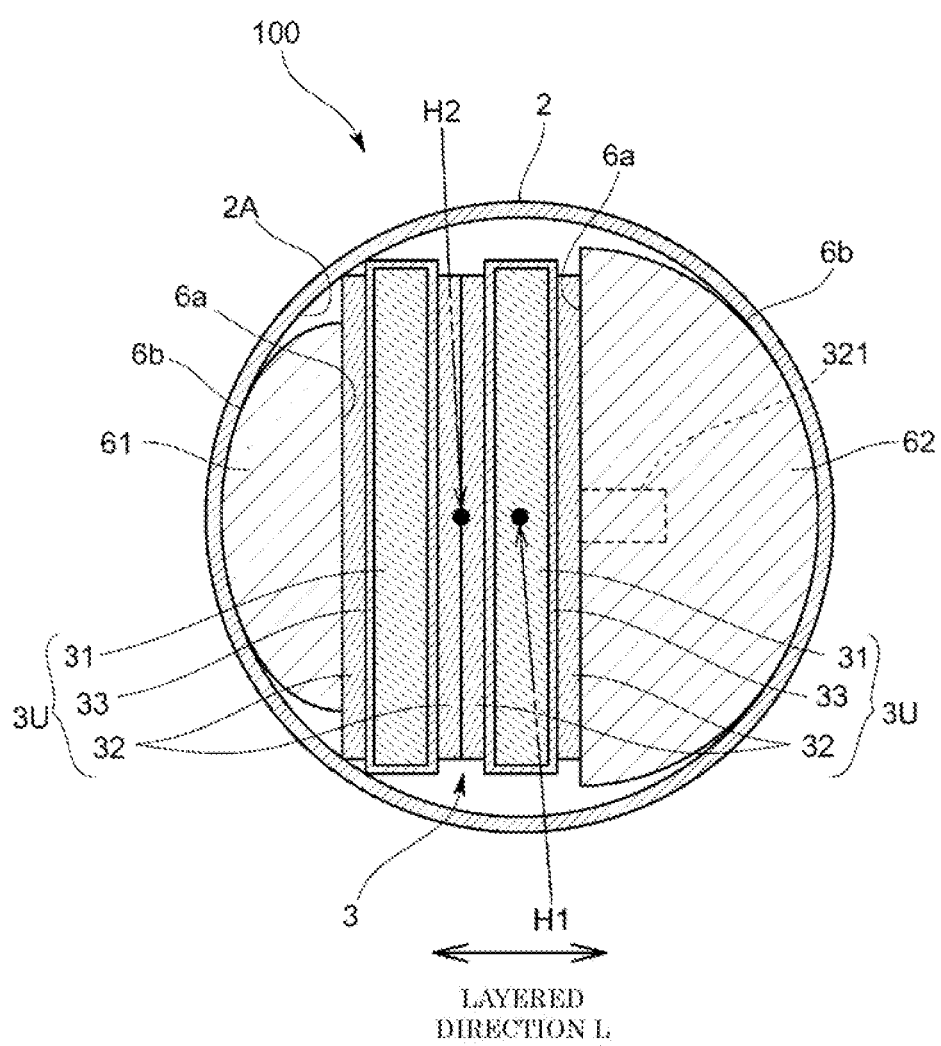
FIG. 22 depicts a transverse sectional view of an alkaline storage battery according to a modification example of the fourth embodiment.

The spacers are not limited in shape to those according to the fourth embodiment. As shown in FIG. 22, the second spacer 62 can be provided with no welding hole 62h. In this case, the current collecting terminal 321 of the negative electrode plate 32 may be welded before the spacers 61 and 62 are located in the battery case 2, or may not be welded but be pressed by the lower surface of the second spacer 62 to be in contact with the bottom surface 2B of the battery case 2.

Each of the spacers 61 and 62 according to the fourth embodiment includes the flat electrode contact surface 6x and the circular arc case contact surface 6y to have the substantially semicircular sectional shape. Each of the spacers 61 and 62 can have any other shape as long as it includes the electrode contact surface 6x and the case contact surface 6y and fixes the electrode group 3 at the position decentered from the center position H1 of the battery case 2.

Figure 23:
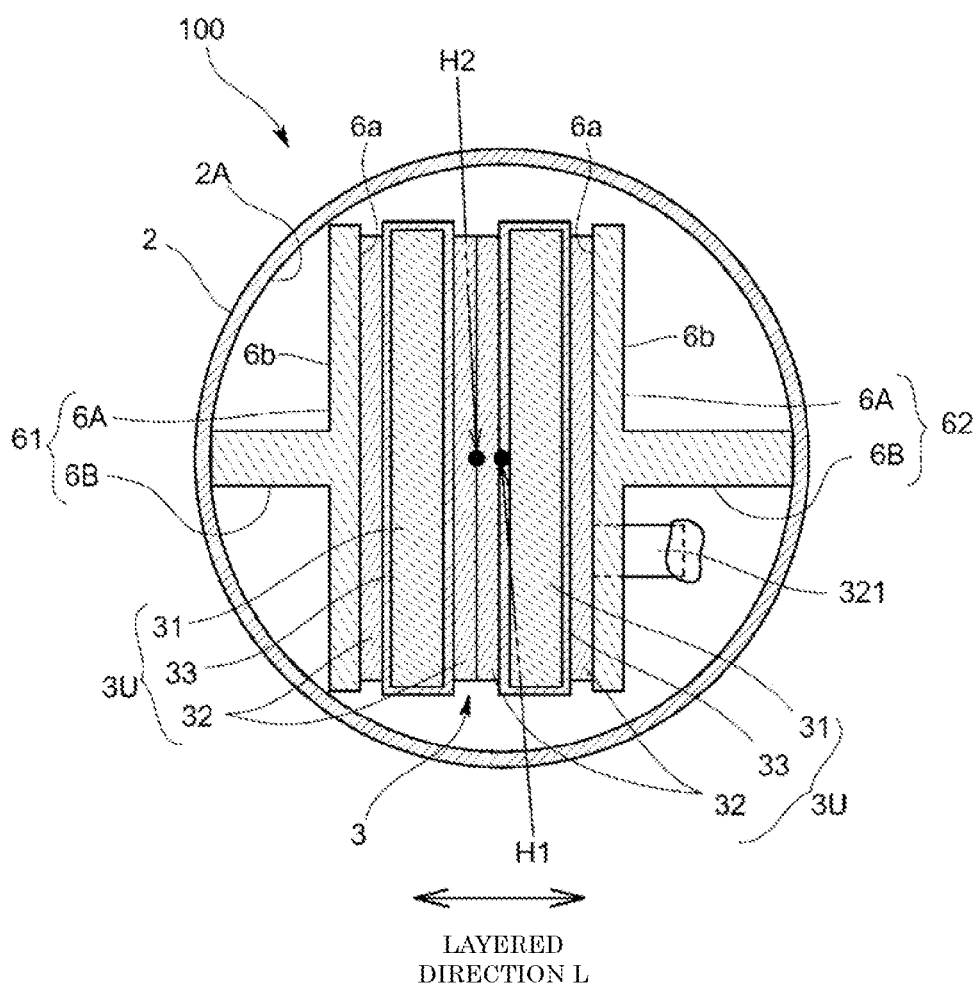
FIG. 23 depicts a transverse sectional view of an alkaline storage battery according to a modification example of the fourth embodiment.

As shown in FIG. 23, each of the spacers 61 and 62 can have the flat electrode contact portion 6A and the case contact portion 6B. The electrode contact portion 6A has a first surface 6a serving as a contact surface in substantially entire contact with the outermost surface (more particularly, the outer side surface 32a of corresponding one of the negative electrode plates 32) of the electrode group 3 in the layered direction L. The case contact portion GB extends from a second surface 6b of the electrode contact portion 6A and is in contact with the inner peripheral surface 2A of the battery case 2. In order to fix the electrode group 3 at the position decentered from the center position H1 of the battery case 2, the case contact portions 6B of the spacers 61 and 62 may be different in length from each other. In each of the spacers 61 and 62 thus configured, the electrode contact portion 6A and the case contact portion 6B form a concave part therebetween serving as a welding space, which enables the current collecting terminal 321 of the negative electrode plate 32 to be welded to the bottom surface 2B of the battery case 2. The case contact portions 6B of the spacers 61 and 62 are different in length from each other in this configuration. If the current collecting terminal 321 is extended toward the spacer 62 having the longer case contact portion 6B, positioning of the current collecting terminal 321 can be easily determined at a glance and productivity is thus enhanced.

In the fourth embodiment, the current collecting terminal is provided to the negative electrode in only one of the plurality of (particularly, two) plate units. Alternatively, the negative electrode plate in each of the respective plate units can have a current collecting terminal.

Fifth Embodiment

Described next with reference to the drawings is a cylindrical battery according to the fifth embodiment of the present invention. It is noted that members corresponding to those of the foregoing embodiments are denoted by the same reference signs.

The cylindrical battery 100 according to the fifth embodiment is different from those according to the first to fourth embodiments in the configuration of the electrode group and the configurations of the paired spacers (the first spacer and the second spacer).

Figure 24:
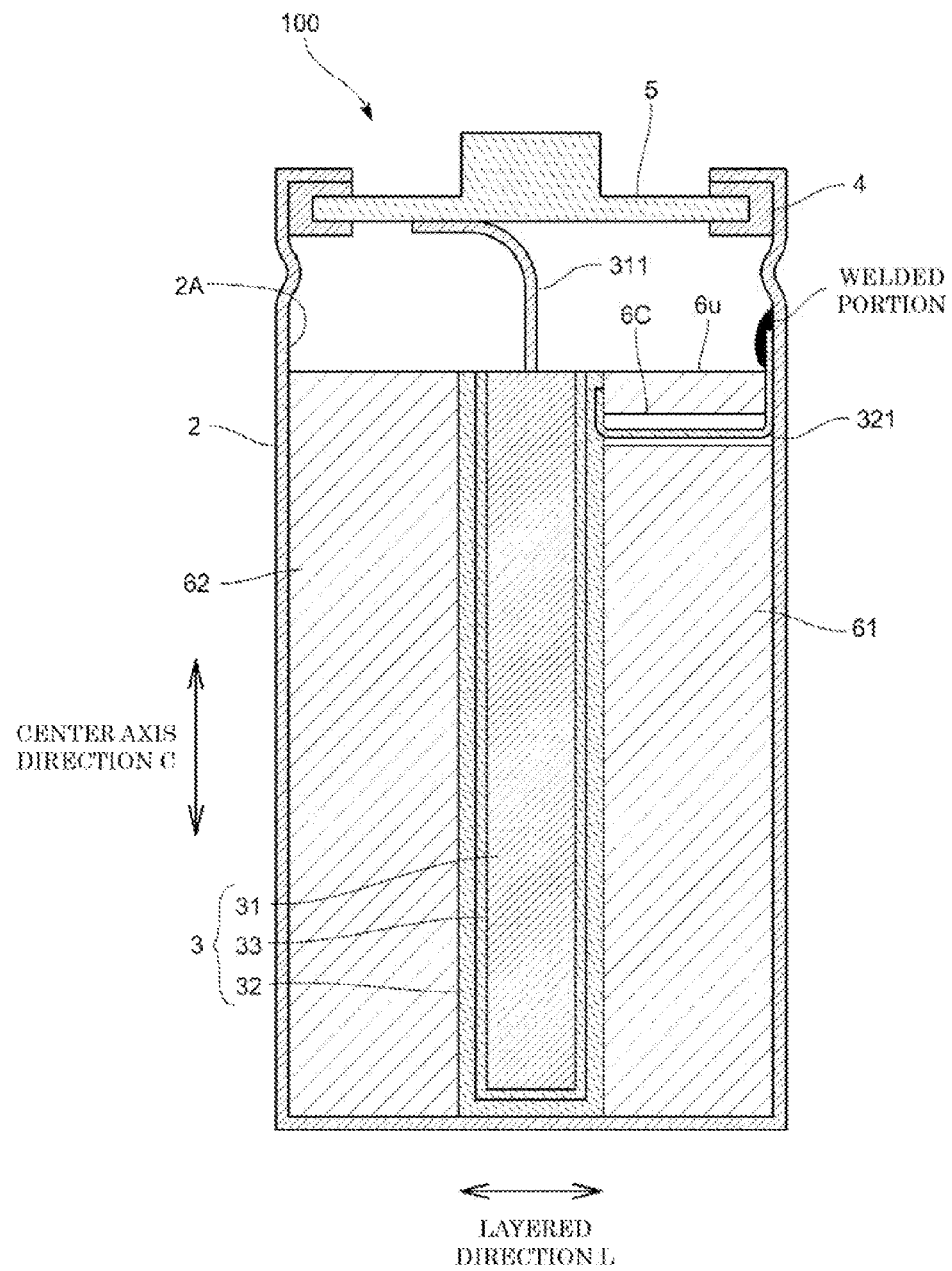
FIG. 24 depicts a longitudinal sectional view of a cylindrical battery according to a fifth embodiment.
Figure 25:
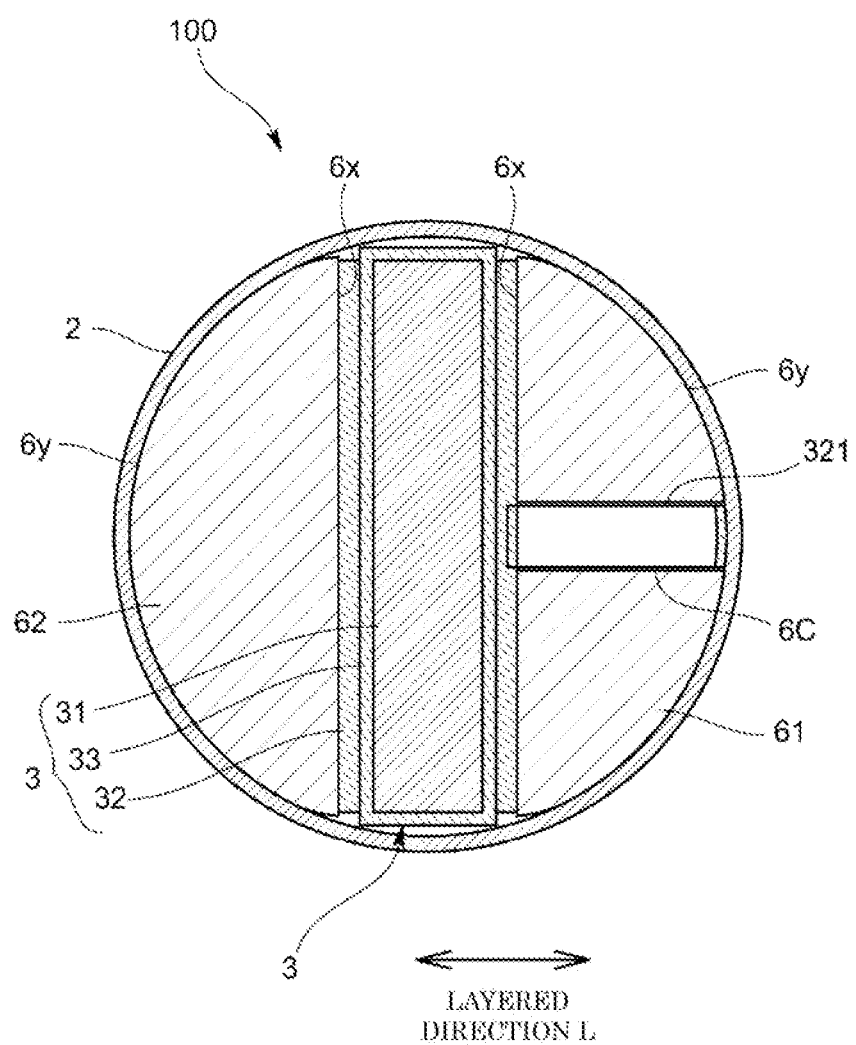
FIG. 25 depicts a transverse sectional view of the cylindrical battery according to the fifth embodiment.
Figure 26:
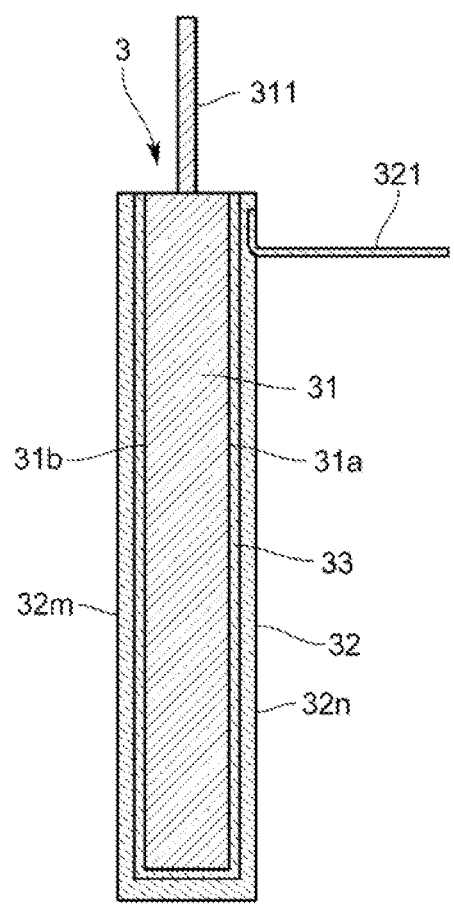
FIG. 26 depicts a longitudinal sectional view of a plate unit according to the fifth embodiment.

More specifically, as shown in FIGS. 24 to 26, the electrode group includes one or a plurality of plate units in each of which the single positive electrode plate 31, the negative electrode plate 32, and the separator 33 are layered such that the negative electrode plate 32 sandwiches the two opposite side surfaces 31a and 31b of the positive electrode plate 31 with the separator 33 being interposed therebetween. More specifically, the negative electrode plate 32 is bent into a substantially U shape as a U-shaped plate. The negative electrode plate 32 is bent into the substantially U shape or the like so that flat plate parts 32m and 32n opposed to each other sandwich the positive electrode plate 31. In the electrode group 3 including the single or a plurality of plate units being layered, the negative electrode plate 32 is located on each of the outermost surfaces in the layered direction L. The current collecting terminal 321 is connected by welding or the like to the top of the outermost single negative electrode plate 32 (the top opposite to the bottom surface 2B of the battery case 2).

As shown in FIG. 25, each of the spacers 61 and 62 includes the flat electrode contact surface 6x in contact with the outermost surface of the electrode group 3 in the layered direction L and a substantially circular arc case contact surface 6y that is provided continuously from the respective ends in the width direction of the electrode contact surface 6x and is in contact with the inner peripheral surface 2A of the battery case 2, to have a substantially semicircular uniform sectional shape. The case contact surface 6y is in contact with the inner peripheral surface 2A of the battery case 2 from the top to the bottom. The case contact surfaces 6y of the first and second spacers 61 and 62 are in contact with the inner peripheral surface 2A from the top to the bottom, so that the paired spacers 61 and 62 evenly press the entire electrode group 3. This configuration achieves improvement in charge-discharge efficiency.

As shown in FIG. 24, in the cylindrical battery 100 according to the fifth embodiment, the current collecting terminal 321 of the negative electrode plate 32 is located at the top of one of the spacers (the spacer 61 in the present embodiment) and extends along the direction (the layered direction L in the present embodiment) perpendicular to the center axis direction C of the battery case 2 to reach the inner peripheral surface 2A of the battery case 2. The top of the spacer 61 is opposite to the bottom surface 2B of the battery case 2, in other words, the end close to the upper opening of the battery case 2.

More specifically, the top of the spacer 61 is formed with a through hole 6C that has a first end opened to a side surface of the electrode group 3 and a second end opened to the inner peripheral surface 2A of the battery case 2. This through hole 6C is formed in the spacer 61 at the portion corresponding to the current collecting terminal 321 of the negative electrode plate 32. The first end is opened to the electrode contact surface 6x in contact with the side surface of the electrode group 3 and the second end is opened to the case contact surface 6y in contact with the inner peripheral surface 2A of the battery case 2. The through hole 6C according to the present embodiment extends along the layered direction L and has a substantially uniform sectional shape. The through hole 6C has a substantially rectangular sectional shape, width slightly larger than the width of the current collecting terminal 321, and height slightly larger than the thickness of the current collecting terminal 321. The current collecting terminal 321 of the negative electrode plate 32 extends through the through hole GC in the spacer 61 thus configured to reach the inner peripheral surface 2A of the battery case 2.

The current collecting terminal 321 inserted into the through hole 6C extends from the outer side surface of the spacer 61 to pass between the case contact surface 6y serving as the outer side surface of the spacer 61 and the inner peripheral surface 2A of the battery case 2 and extend upward from a top surface 6u of the spacer 61. The current collecting terminal 321 has a free end that extends upward from the top surface 6u of the spacer 61 and is welded to the inner peripheral surface 2A of the battery case 2.

Briefly described next is assembling of the cylindrical battery 100 thus configured.

Figure 27:
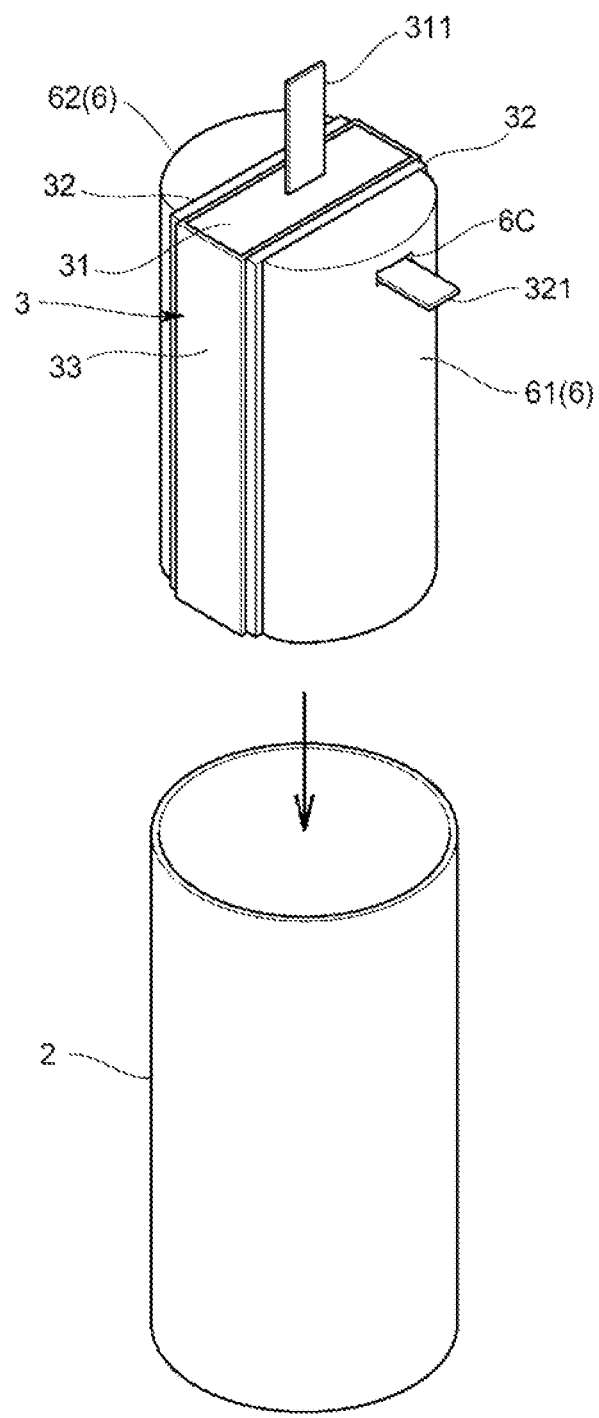
FIG. 27 depicts an exploded perspective view of a battery case, an electrode group, and spacers according to the fifth embodiment.

The electrode group 3 including the plate unit is sandwiched between the paired spacers 61 and 62 in the layered direction L. At this stage, the current collecting terminal 321 of the negative electrode plate 32 is inserted through the through hole 6C in the spacer 61. An assembly thus obtained is located in the battery case 2 (see FIG. 27). At this location, the current collecting terminal 321 of the negative electrode plate 32 is extended upward from the top surface 6u of the spacer 61.

In the state where the electrode group 3 is fixed in the battery case 2, the current collecting terminal 321 of the negative electrode plate 32 is connected by welding to the inner peripheral surface 2A of the battery case 2. The battery case 2 is then filled with the electrolyte solution. The current collecting terminal 311 of the positive electrode plate 31 is then connected to the rear surface of the sealing member 5 directly or by way of a current collecting plate (not shown). The sealing member 5 is fixed by swaging or the like to the upper opening of the battery case 2 with the insulating member 4 being interposed therebetween. The welding work is facilitated because both the current collecting terminal 321 of the negative electrode plate 32 and the current collecting terminal 311 of the positive electrode plate 31 are located close to the upper opening of the battery case 2.

Effects of Fifth Embodiment

In the alkaline storage battery 100 according to the fifth embodiment thus configured, the current collecting terminal 321 of the negative electrode plate 32 extends at the top of the spacer 61 or 62 to reach the inner peripheral surface 2A of the battery case 2. This configuration enhances workability of connection of the current collecting terminal 321 to the inner peripheral surface 2A of the battery case 2 by welding or the like, and thus improves productivity of the battery. The current collecting terminal 311, which is not connected to the inner peripheral surface 2A of the battery case 2, is connected to the opening sealing member 5 sealing the upper opening of the battery case 2. It is unnecessary to connect the current collecting terminal 311 of the positive electrode plate 31 and the current collecting terminal 321 of the negative electrode plate 32 to the bottom surface 2B of the battery case 2. This configuration improves productivity of the battery.

Modification Examples of Fifth Embodiment

Figure 28:
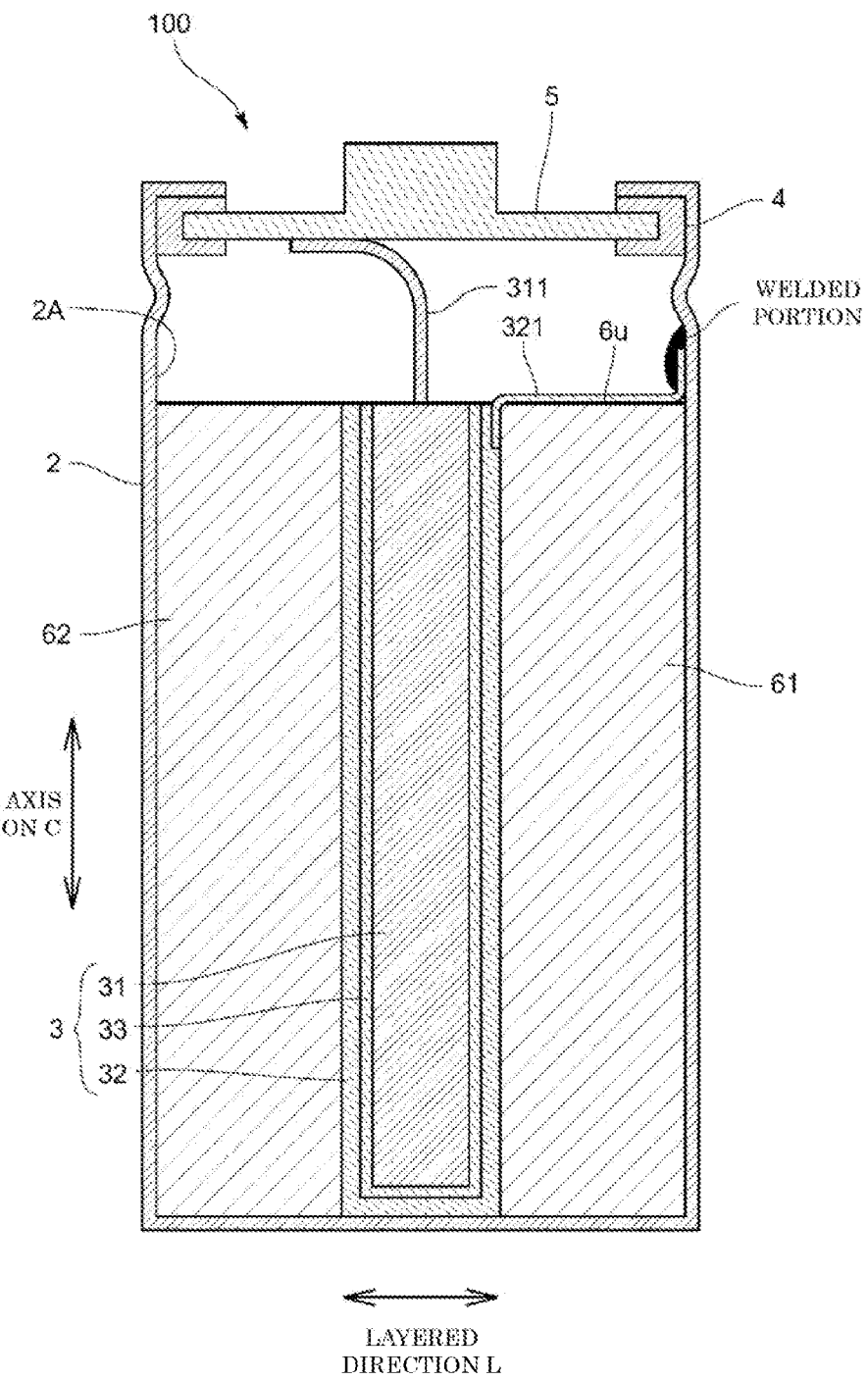
FIG. 28 depicts a longitudinal sectional view of an alkaline storage battery according to the fifth embodiment.

It is noted that the present invention is not limited to the fifth embodiment. Alternatively, as shown in FIG. 28, the current collecting terminal 321 of the negative electrode plate 32 can extend along the top surface 6u of one of the spacers 61 and 62 to reach the inner peripheral surface 2A of the battery case 2.

Figure 29:
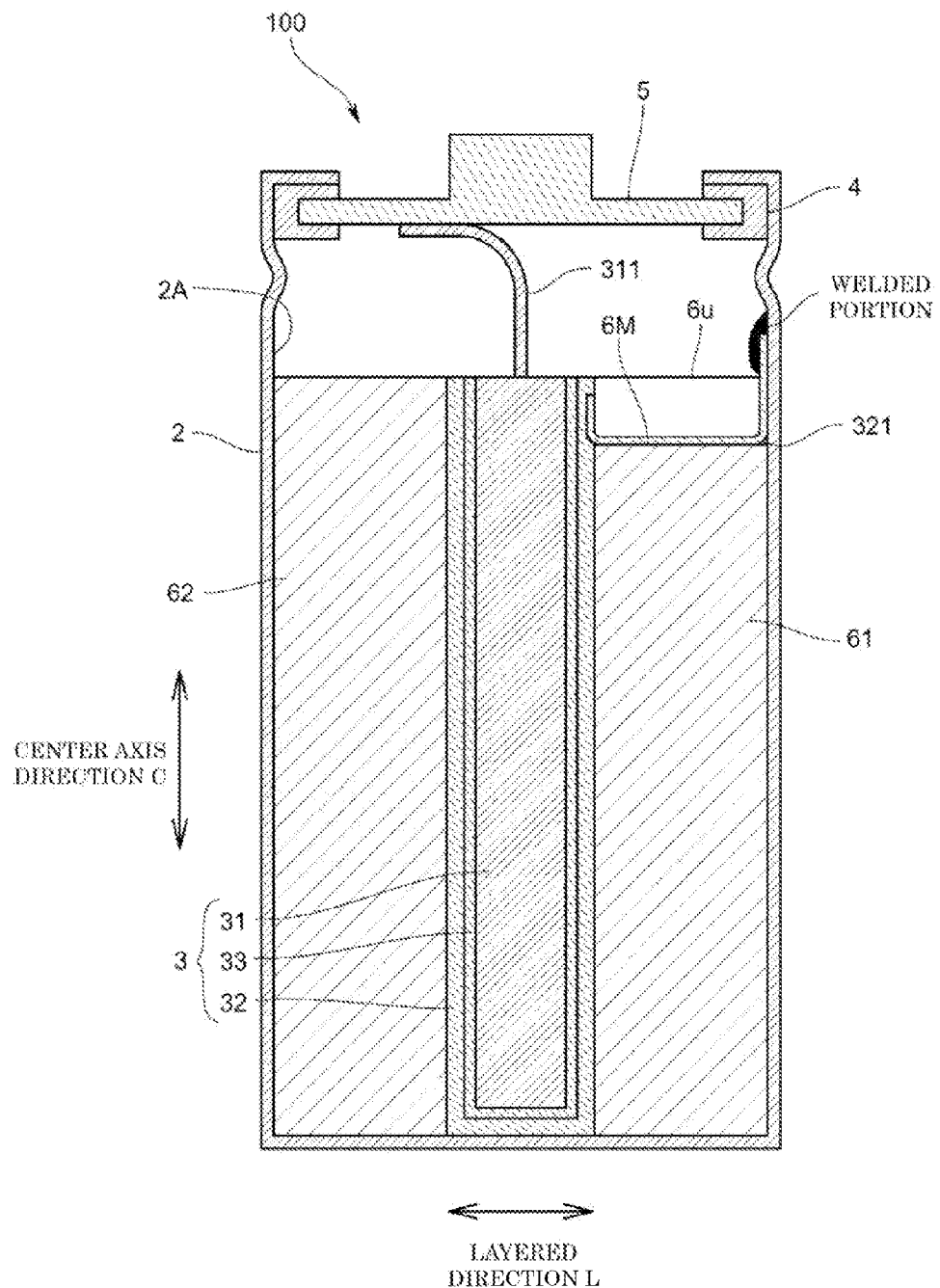
FIG. 29 depicts a longitudinal sectional view of an alkaline storage battery according to the fifth embodiment.
Figure 30:
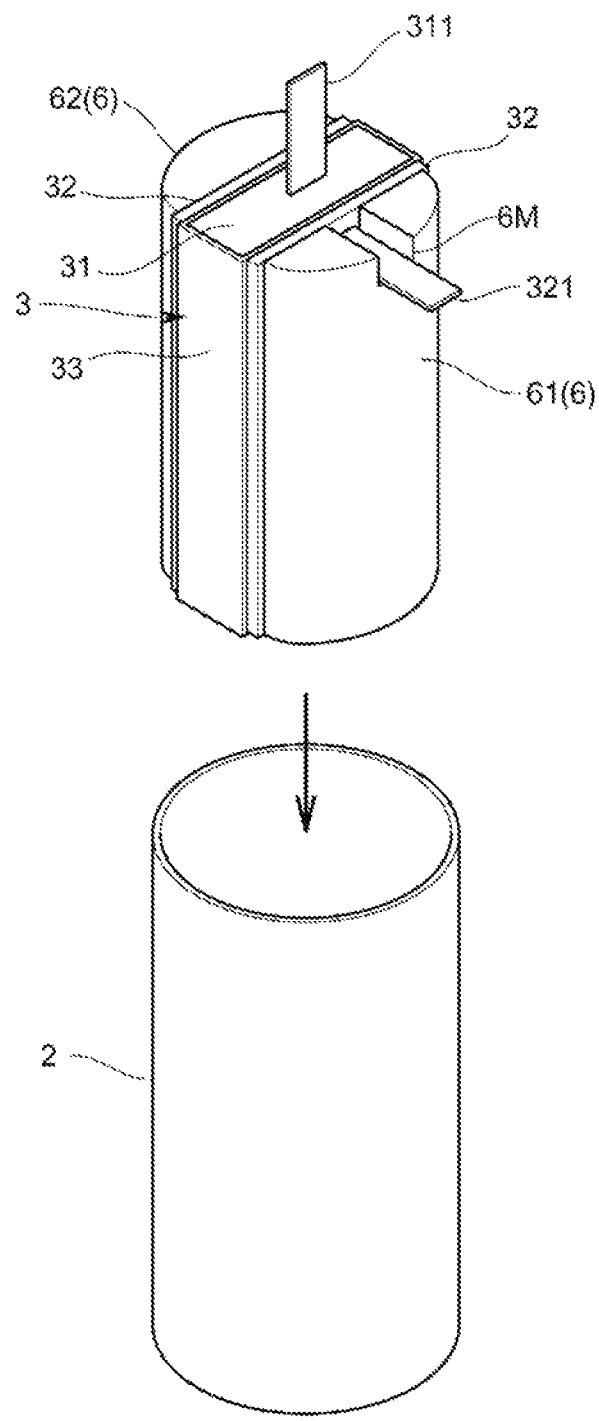
FIG. 30 depicts an exploded perspective view of a battery case, an electrode group, and spacers according to the fifth embodiment.

As shown in FIGS. 29 and 30, in the case where the current collecting terminal 321 is provided along the top surface 6u of the spacer 61, it is preferred to provide a guide groove 6M for guiding the current collecting terminal 321 of the negative electrode plate 32 to the inner peripheral surface 2A of the battery case 2. The guide groove 6M is formed from the surface (the electrode contact surface 6x) in contact with the electrode group 3 to the surface (the case contact surface 6y) in contact with the inner peripheral surface 2A of the battery case 2 along the extending direction of the current collecting terminal 321 (the layered direction L in FIG. 29). The guide groove 6M has width slightly larger than the width of the current collecting terminal 321. The guide groove 6M can have depth enough to position the current collecting terminal 321. The current collecting terminal 321 is in contact with at least the bottom surface of the guide groove 6M and is guided to the inner peripheral surface 2A of the battery case 2.

Figure 31:
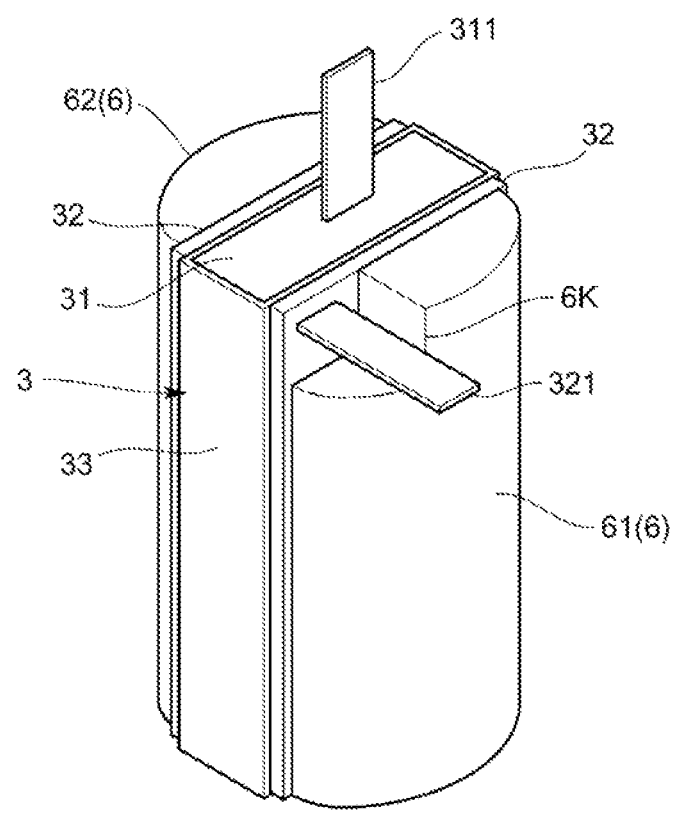
FIG. 31 depicts a perspective view of an electrode group and spacers according to the fifth embodiment.

Instead of forming the through hole 6C or the guide groove 6M, as shown in FIG. 31, there can be formed a cutout 6K to secure a space allowing the current collecting terminal 321 to extend to the inner peripheral surface 2A of the battery case 2. In FIG. 31, the current collecting terminal 321 is connected to a first end in the width direction of the negative electrode plate 32. The cutout 6K is also formed at the first end in the width direction of the spacer 61 or 62 to correspond to the position of the current collecting terminal 321. In the embodiment described above and the like, similarly, when the current collecting terminal 321 is connected to the first end in the width direction of the negative electrode plate 32, the through hole 6C or the guide groove 6M is formed in the spacer 61 or 62 at the corresponding position.

Each of the spacers 61 and 62 according to the embodiment described above includes the flat electrode contact surface 6x and the circular arc case contact surface 6y to have the substantially semicircular sectional shape. Each of the spacers 61 and 62 can have any other shape as long as it includes the electrode contact surface 6x and the case contact surface 6y and fixes the electrode group 3 to the battery case 2.

In the embodiment described above, the current collecting terminal of the negative electrode plate is connected by welding to the inner peripheral surface of the battery case. Alternatively, the current collecting terminal can be electrically connected without welding by being sandwiched between the outer side surface of the spacer and the inner peripheral surface of the battery case.

In the embodiment described above, the current collecting terminal of the negative electrode plate is connected by welding or the like to the negative electrode plate. Alternatively, the current collecting terminal can be formed integrally with the negative current collector of the negative electrode plate.

Sixth Embodiment

Described next with reference to the drawings is a cylindrical battery according to the sixth embodiment of the present invention. It is noted that members corresponding to those of the foregoing embodiments are denoted by the same reference signs.

The cylindrical battery 100 according to the sixth embodiment is different from those according to the first embodiment and the like in the configuration of the negative electrode plate 32 and the method of electrically connecting the current collecting terminal 321 of the negative electrode plate 32 with the battery case 2.

Figure 32:
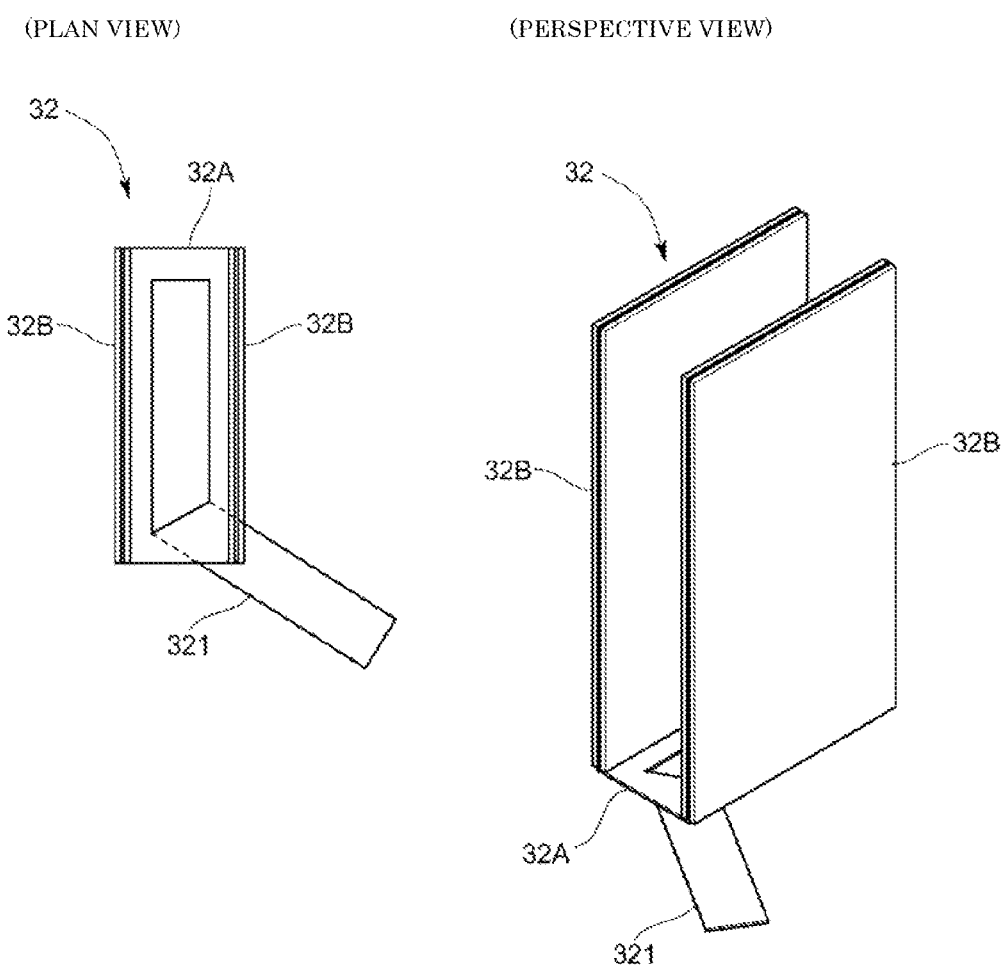
FIG. 32 depicts a plan view and a perspective view of a negative electrode plate according to a sixth embodiment.
Figure 33:
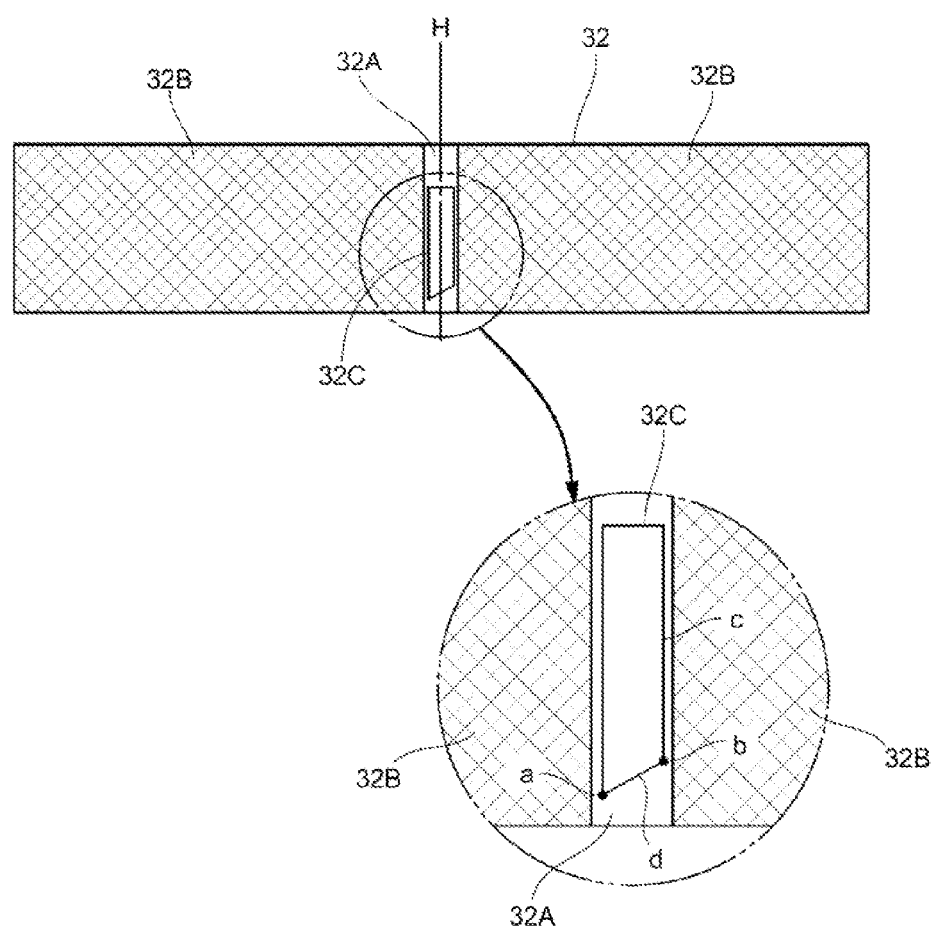
FIG. 33 depicts a developed plan view of the negative electrode plate according to the sixth embodiment.

More specifically, as shown in FIGS. 32 and 33, the negative electrode plate 32 includes an active material non-inclusive portion (unapplied portion) 32A, which is linearly formed and includes no negative active material, and active material inclusive portions (applied portions) 32B, which are formed along the both sides of the active material non-inclusive portion 32A and include the negative active material. The active material non-inclusive portion 32A is formed symmetrical to include a center line H of the negative current collector. The active material inclusive portions 32B are symmetrical with respect to the active material non-inclusive portion 32A (see FIG. 33).

As shown in FIG. 32, the negative current collector of the negative electrode plate 32 is bent in a substantially U shape at the active material non-inclusive portion 32A such that the active material inclusive portions 32B on the both sides face each other. More specifically, the negative current collector is bent on the boundaries or line slightly inside the boundaries between the active material non-inclusive portion 32A and the active material inclusive portions 32B, so that the active material non-inclusive portion 32A and the active material inclusive portions 32B are perpendicular to each other.

Furthermore, the negative electrode plate 32 is formed with the current collecting terminal 321 that is formed by bending outward part of the active material non-inclusive portion 32A and is in contact with the inner surface of the battery case 2. More specifically, as shown in FIG. 33, the active material non-inclusive portion 32A is partially provided with a slit 32C to configure a desired shape of the current collecting terminal, and the current collecting terminal 321 is formed by bending outward the inner portion of the slit 32C.

The slit 32C has a slit start point a and a slit end point b that are located close to a lateral side of the active material non-inclusive portion 32A, and a slit line c that connects the slit start point a and the slit end point b and is formed in the active material non-inclusive portion 32A. The current collecting terminal according to the present embodiment preferably has a rectangular shape, so that the slit line c has a substantially U shape in a plan view.

The current collecting terminal 321 formed inside the slit 32C is bent along the slit 32C and is then bent outward to be slanted from the lateral side of the active material non-inclusive portion 32A. In the bent state, the planar direction of the active material non-inclusive portion 32A and the planar direction of the current collecting terminal 321 are substantially parallel to each other, and the active material non-inclusive portion 32A and the current collecting terminal 321 are located substantially within an identical plane. In the state where the battery case 2 accommodates the negative electrode plate 32, the active material non-inclusive portion 32A can be made in contact with the bottom surface 2B of the battery case 2 and the current collecting terminal 321 can be made in contact with the bottom surface 2B of the battery case 2. Furthermore, the planar active material non-inclusive portion 32A can be located to be in contact with the bottom surface 2B of the battery case 2, so that the space in the battery case 2 can be utilize effectively.

In the configuration according to the present embodiment in which the current collecting terminal 321 extends slantingly from the lateral side of the active material non-inclusive portion 32A, the distance from the lateral side to the slit start point a is different from the distance from the lateral side to the slit end point b. In FIG. 33, the distance from the lateral side to the slit start point a is made shorter than the distance from the lateral side to the slit end point b. In this configuration, a bent line d connecting the slit start point a and the slit end point b is slanted from the lateral side. When the inside of the slit 32C is bent outward at the slit start point a and the slit end point b, the current collecting terminal 321 extends outward slantingly from the lateral side of the active material non-inclusive portion 32A.

Figure 34:
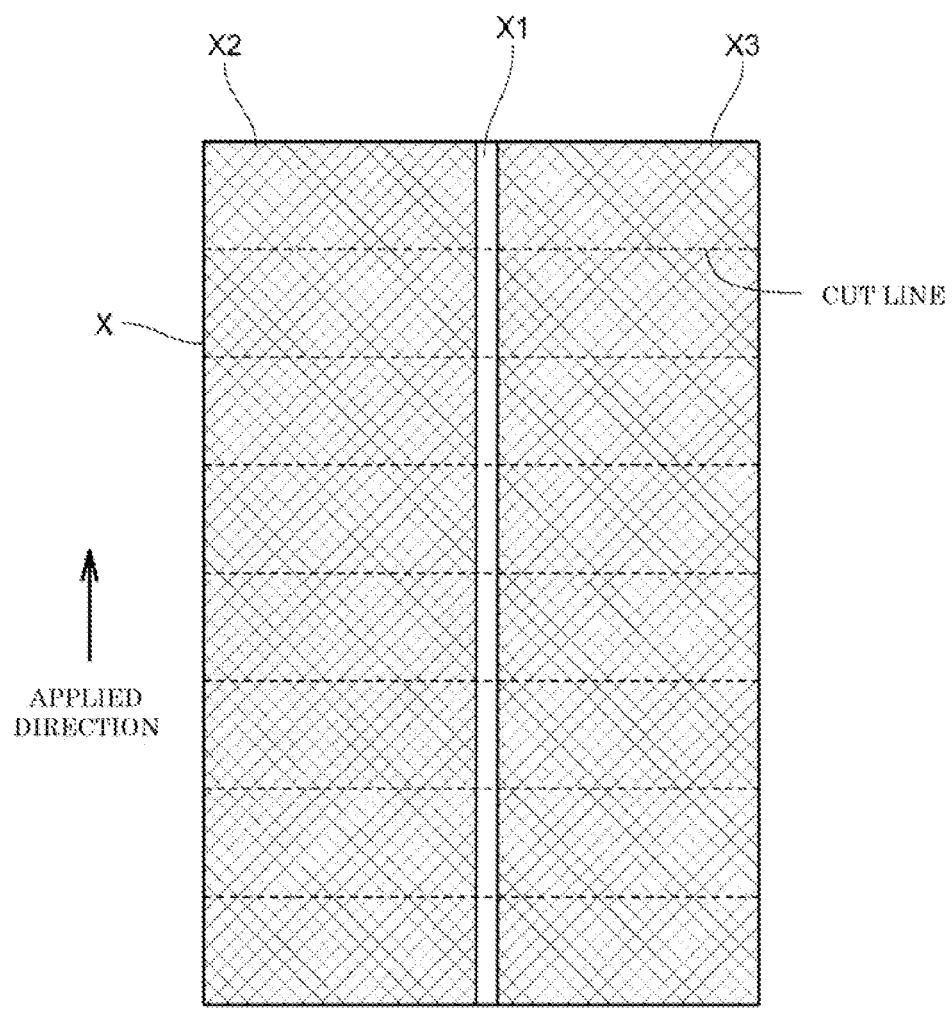
FIG. 34 depicts a view showing the step of producing the negative electrode plates according to the sixth embodiment.

The negative electrode plate 32 thus configured is produced in the following manner. As shown in FIG. 34, a negative active material is initially applied to applied regions X2 and X3 in a long base material X. The applied regions X2 and X3 are located at the respective ends of a linear unapplied region X1 that is located at the center along the longitudinal direction of the base material X. The base material X is then cut so as to have shapes the same as those of the developed negative electrode plates 32. Dotted lines in FIG. 7 indicate cut lines. The unapplied portion 32A of the cut negative electrode plate 32 is then formed with the slit 32C. The negative electrode plate 32 is bent into a substantially U shape and the current collecting terminal 321 is bent outward. Alternatively, the slit 32C can be formed before the negative electrode plate 32 is cut.

Figure 35:
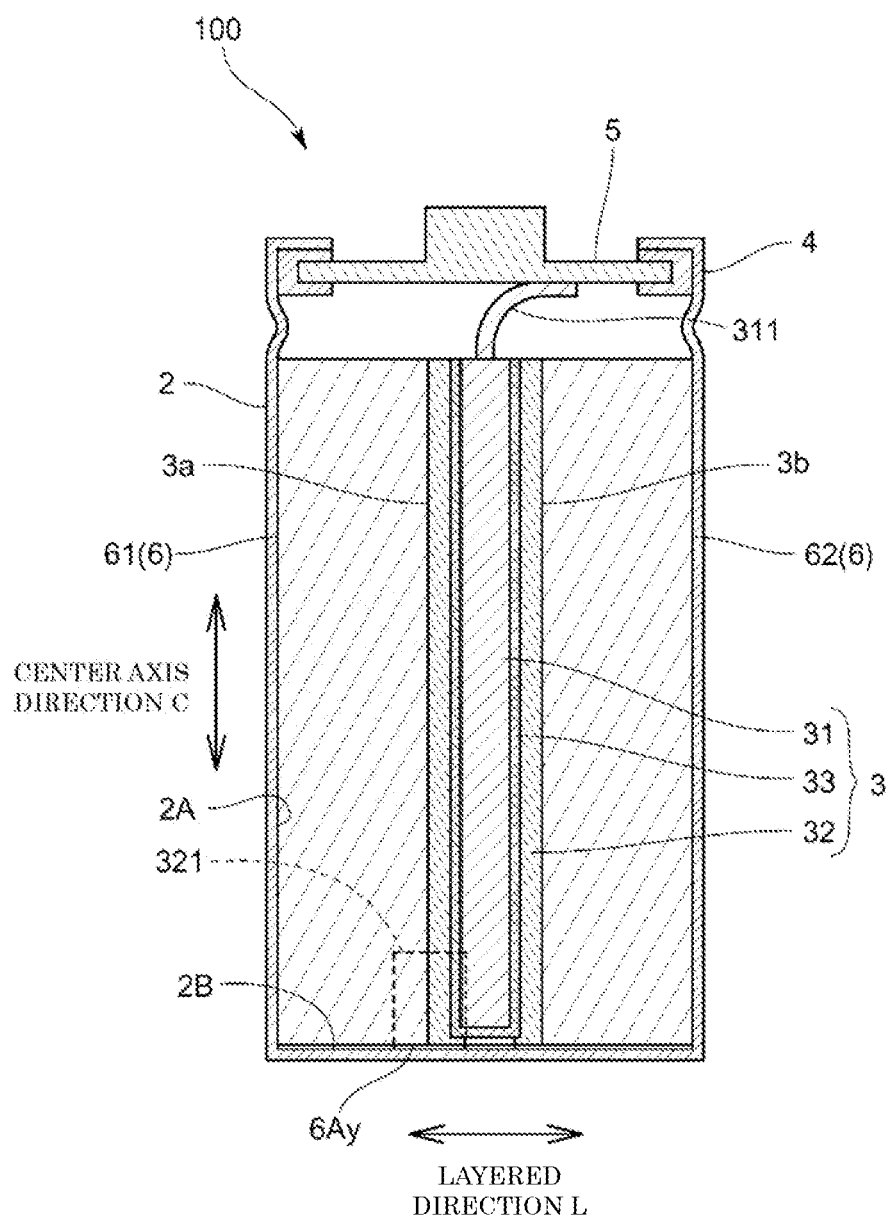
FIG. 35 depicts a longitudinal sectional view of a cylindrical battery according to the sixth embodiment.
Figure 36:
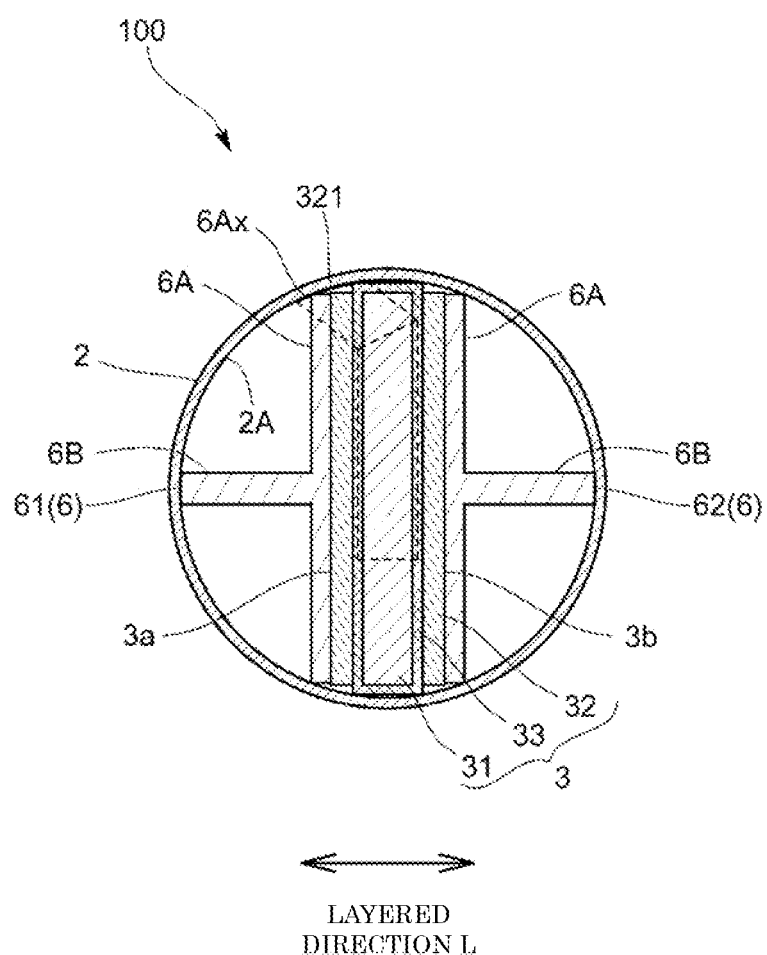
FIG. 36 depicts a transverse sectional view of the cylindrical battery according to the sixth embodiment.
Figure 37:
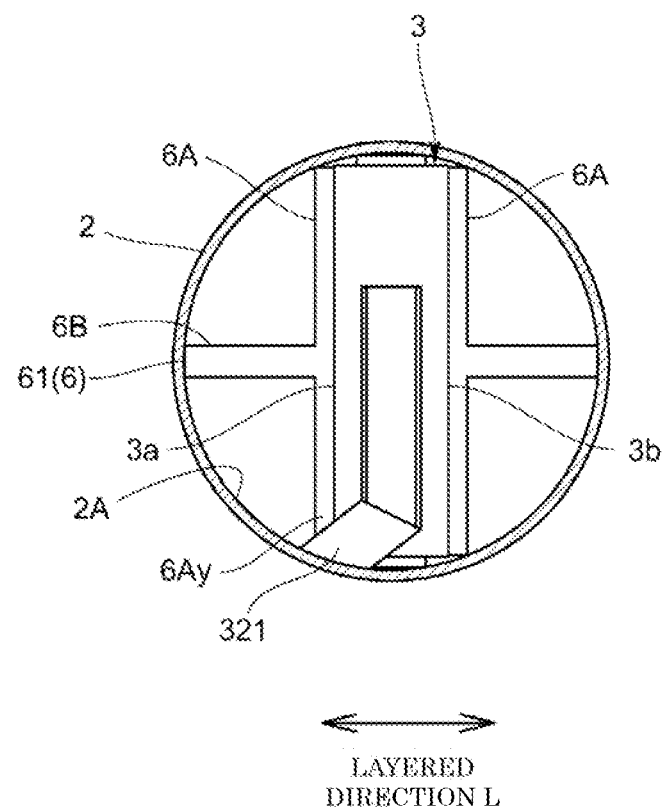
FIG. 37 depicts a bottom view of a state where a bottom wall according to the sixth embodiment is removed.

As shown in FIGS. 35 to 37, in the cylindrical battery 100 according to the present embodiment, the spacers 6 press the current collecting terminal 321 of the negative electrode plate 32 to bring it into contact with both the bottom surface 2B and the inner peripheral surface 2A of the battery case 2.

More specifically, the current collecting terminal 321, which extends slantingly from the lateral side of the active material non-inclusive portion 32A in the negative electrode plate 32, is pressed by the outer side surface of the spacer 61 (in FIG. 36, an outer corner part 6Ax of the electrode contact portion 6A) toward the inner peripheral surface 2A of the battery case 2 to be in contact therewith. The current collecting terminal 321 is also pressed by the lower surface of the spacer 61 (a lower surface 6Ay of the electrode contact portion 6A in FIGS. 35 and 37) toward the bottom surface 2B of the battery case 2 to be in contact therewith.

Effects of Sixth Embodiment

In the alkaline storage battery 100 according to the sixth embodiment thus configured, the current collecting terminal 321 of the negative electrode plate 32 is not welded but in contact with the bottom surface 2B and the inner peripheral surface 2A of the battery case 2, and is pressed by the spacer 61 toward the bottom surface 2B and the inner peripheral surface 2A. This configuration does not require work of welding the current collecting terminal 321 to the battery case 2, and the current collecting terminal 321 and the battery case 2 can be made in contact with each other by simply inserting the spacers 61 and 62 into the battery case 2, thereby reducing the number of the production steps. The spacer 61 presses the current collecting terminal 321 toward the battery case 2, so that electrical connection between the current collecting terminal 321 and the battery case 2 can be kept well and resistance between the current collecting terminal 321 and the battery case 2 can be reduced as much as possible.

Modification Examples of Sixth Embodiment

It is noted that the present invention is not limited to the sixth embodiment. In the sixth embodiment, the current collecting terminal 321 and the negative electrode plate 32 are formed integrally with each other. Alternatively, the current collecting terminal prepared as a separate component can be welded to the negative electrode plate 32 to be integrated.

Seventh Embodiment

The current collecting terminal according to the sixth embodiment extends outward from the bent portion. Alternatively, the current collecting terminal can extend outward from the active material inclusive portion 32B (a flat plate part).

Figure 38:
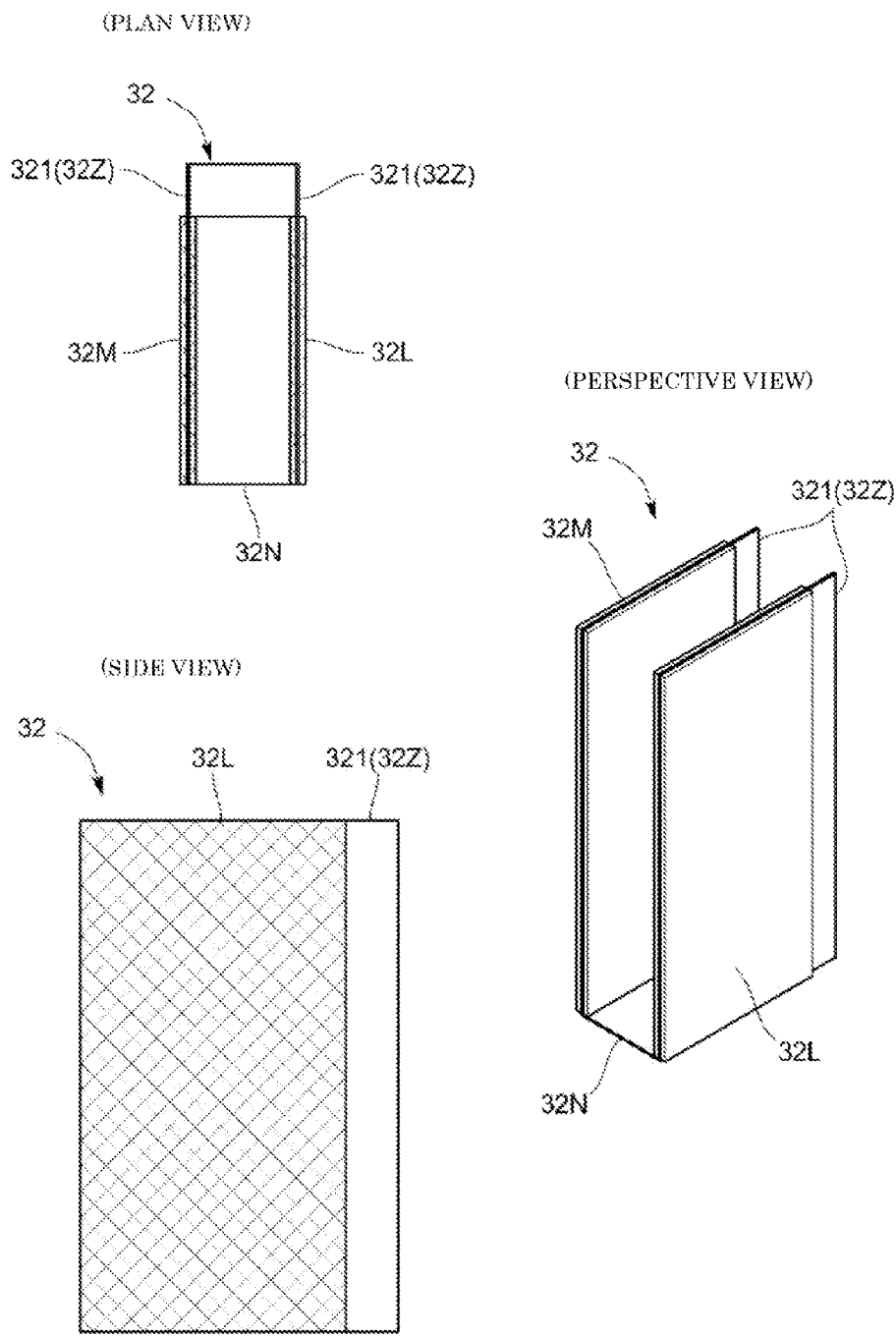
FIG. 38 depicts a plan view, a front view, and a perspective view of a negative electrode plate according to a seventh embodiment.

More specifically, as shown in FIG. 38, the negative electrode plate 32 is formed by applying a negative active material to a negative current collector, and includes two opposite flat plate parts 32L and 32M and a bent portion 32N connecting the flat plate parts 32L and 32M to have a substantially U shape. The positive electrode plate 31 is sandwiched between the two flat plate parts 32L and 32M with the separator 33 being interposed therebetween.

Figure 39:
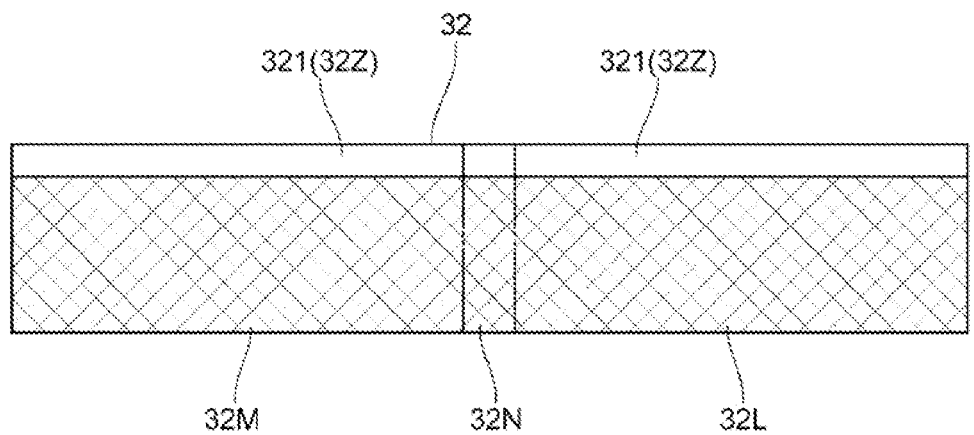
FIG. 39 depicts a developed plan view of the negative electrode plate according to the seventh embodiment.
Figure 40:
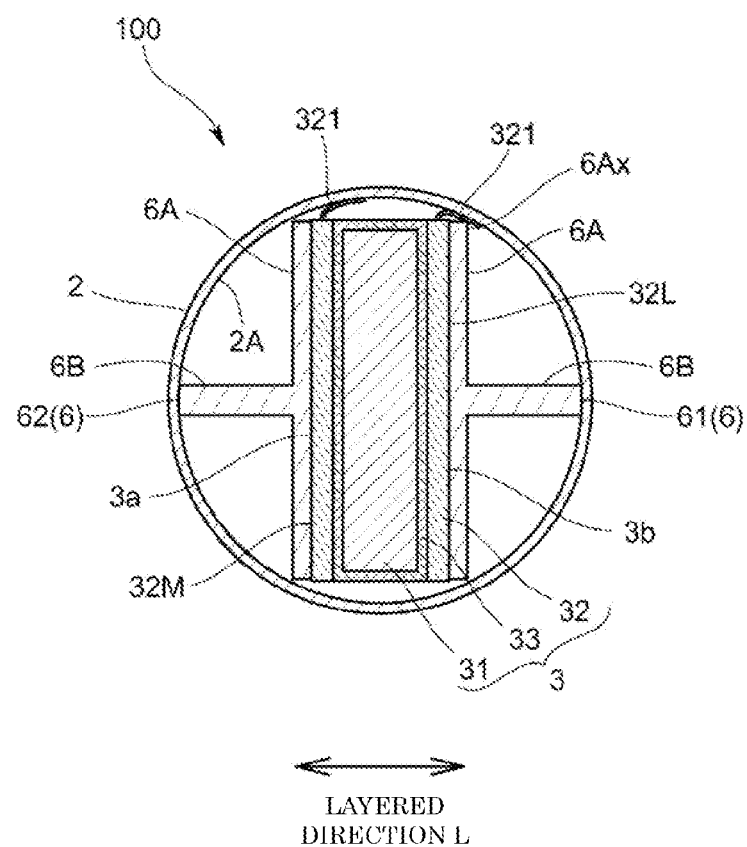
FIG. 40 depicts a transverse sectional view of a cylindrical battery according to the seventh embodiment.
Figure 41:
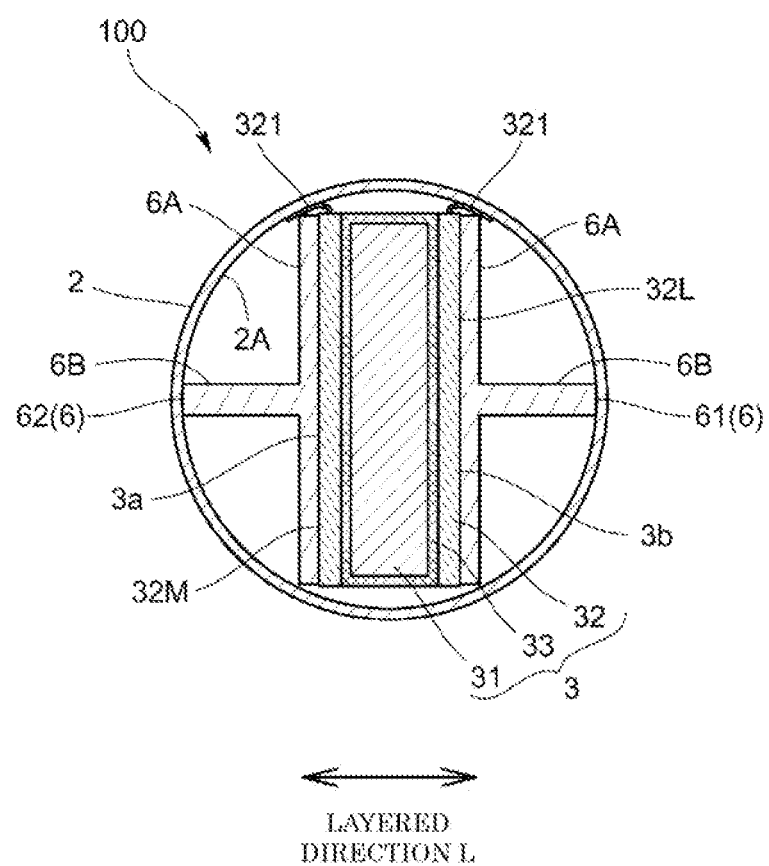
FIG. 41 depicts a transverse sectional view of a cylindrical battery according to a modification example of the seventh embodiment.

As shown in FIGS. 38 and 39, each of the two flat plate parts 32L and 32M has an active material non-inclusive portion (unapplied portion) 32Z that is located at a lateral side (longitudinal lateral side) along the center axis direction C and to which the negative active material is not applied. The active material non-inclusive portion 32Z serves as the current collecting terminal 321. In other words, the current collecting terminal 321 is provided at the entire longitudinal lateral side of each of the two flat plate parts 32L and 32M. The entire longitudinal lateral side of each of the two flat plate parts 32L and 32M is in contact with the inner peripheral surface of the battery case 2 along the center axis direction C. In FIG. 40, the current collecting terminal 321 formed on the flat plate part 32L is pressed by the spacer 61 in contact with the flat plate part 32L to be in contact with the inner peripheral surface 2A of the battery case 2, whereas the current collecting terminal 321 formed on the flat plate part 32M is not pressed by the spacer 62 but is in contact with the inner peripheral surface 2A of the battery case 2. More specifically, the spacer 61 presses, entirely in the center axis direction C, the longitudinal lateral side of the current collecting terminal 321 of the negative electrode plate 32 toward the inner peripheral surface 2A of the battery case 2 along the center axis direction C. As shown in FIG. 41, the current collecting terminal 321 formed on the flat plate part 32M can be pressed by the spacer 62 in contact with the flat plate part 32M toward the inner peripheral surface 2A of the battery case 2 to be in contact therewith.

Figure 42:
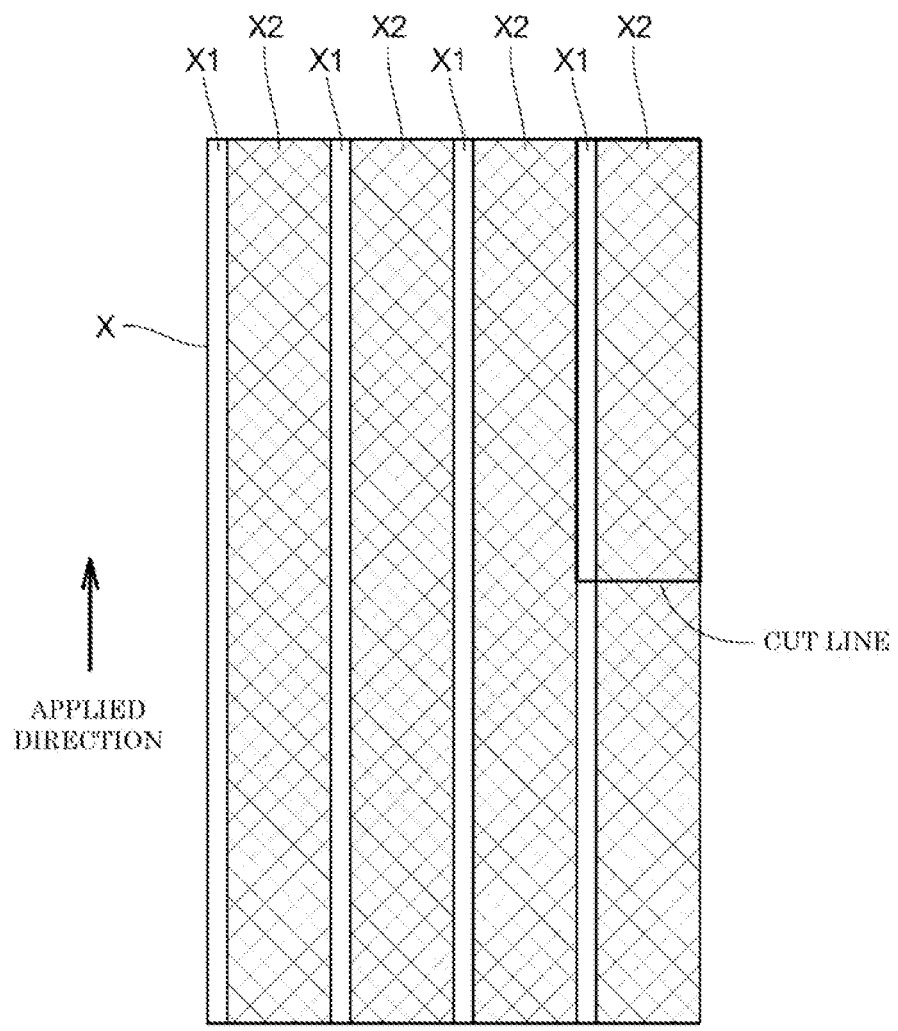
FIG. 42 depicts a view showing the step of producing the negative electrode plates according to the seventh embodiment.

The negative electrode plate 32 thus configured is produced in the following manner. As shown in FIG. 42, a long base material X is initially formed with unapplied regions X1 and applied regions X2 that are striped along the longitudinal direction. The base material X is then cut so as to have shapes the same as those of the developed negative electrode plates 32. Bold lines in FIG. 42 indicate cut lines. The negative electrode plate 32 is then bent into a substantially U shape. The negative electrode plate 32 thus produced is formed with the active material non-inclusive portion 32Z also at the lateral side of the bent portion 32N. The boundary between the active material non-inclusive portion 32Z of each of the flat plate parts 32L and 32M and the active material non-inclusive portion 32Z of the bent portion 32N is preferably formed with a slit to easily deform the active material non-inclusive portion 32Z of each of the flat plate parts 32L and 32M.

Effects of Seventh Embodiment

In the alkaline storage battery 100 according to the seventh embodiment thus configured, the negative electrode plate 32 is in contact with the inner peripheral surface 2A of the battery case 2. This configuration keeps contact between the electrode group 3 and the battery case 2 even when the electrode group 3 is displaced in the center axis direction C with respect to the battery case 2, and is thus capable of keeping good electrical connection therebetween.

Alternatively, as shown in FIG. 43(A), the current collecting terminal 321 can be provided to only one of the flat plate parts 32L and 32M. This configuration reduces the amount of the substrate used. Still alternatively, as shown in FIG. 43(B), the current collecting terminal 321 can be formed at the opposite lateral sides of the two flat plate parts.

Eighth Embodiment

Figure 44:
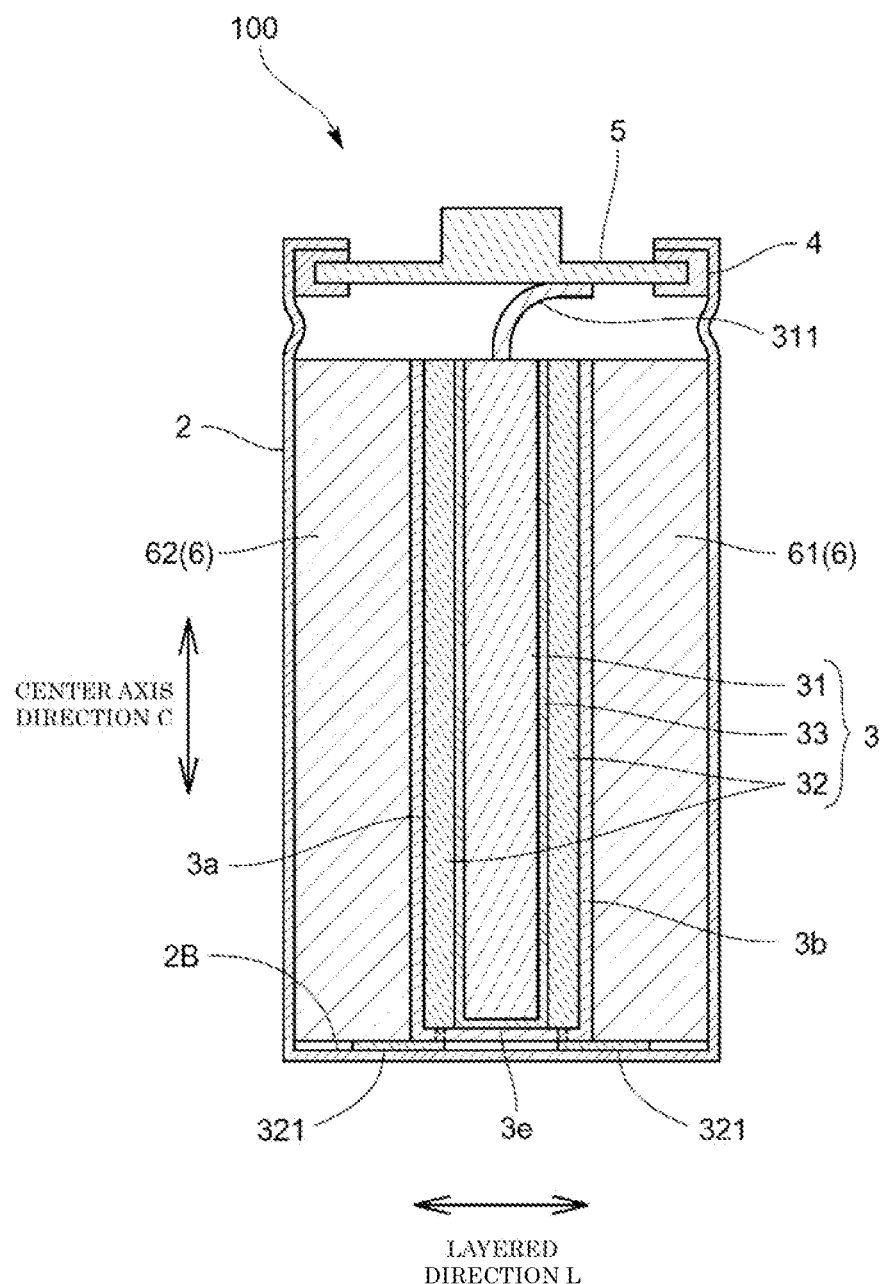
FIG. 44 depicts a longitudinal sectional view of a cylindrical battery according to an eighth embodiment.
Figure 45:
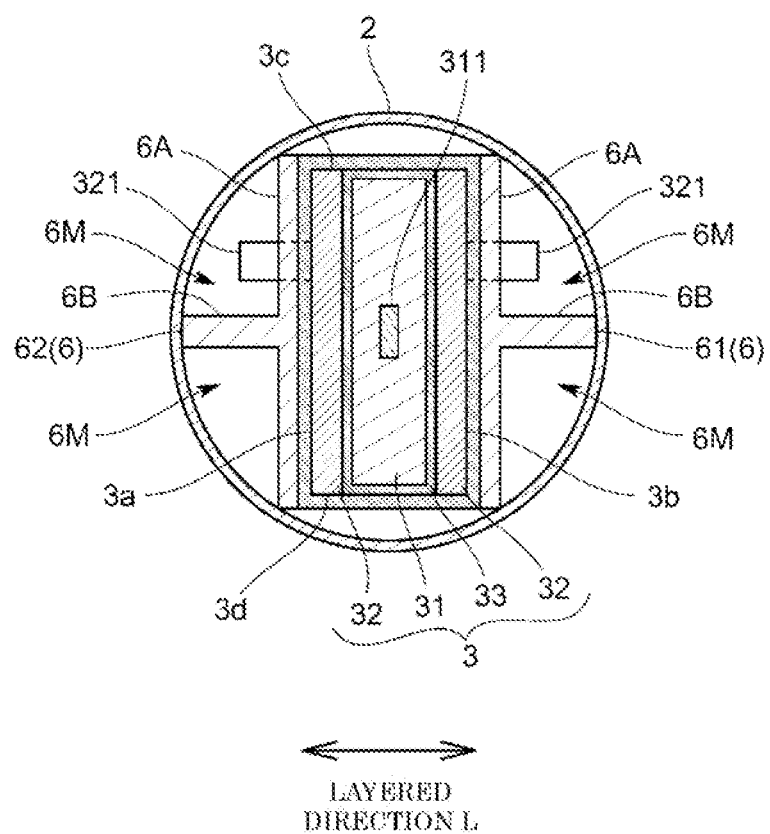
FIG. 45 depicts a transverse sectional view of the cylindrical battery according to the eighth embodiment.

As shown in FIGS. 44 and 45, the cylindrical battery according to any one of the embodiments described above has a solution retaining member 7 that retains an electrolyte solution to supply the separator 33 in the electrode group 3 with the electrolyte solution.

The solution retaining member 7 is located in the battery case 2 and between the battery case 2 and the electrode group 3. The solution retaining member 7 is made of the material the same as that of the separator 33 (nonwoven fabric made of polyolefin or the like).

Figure 46:
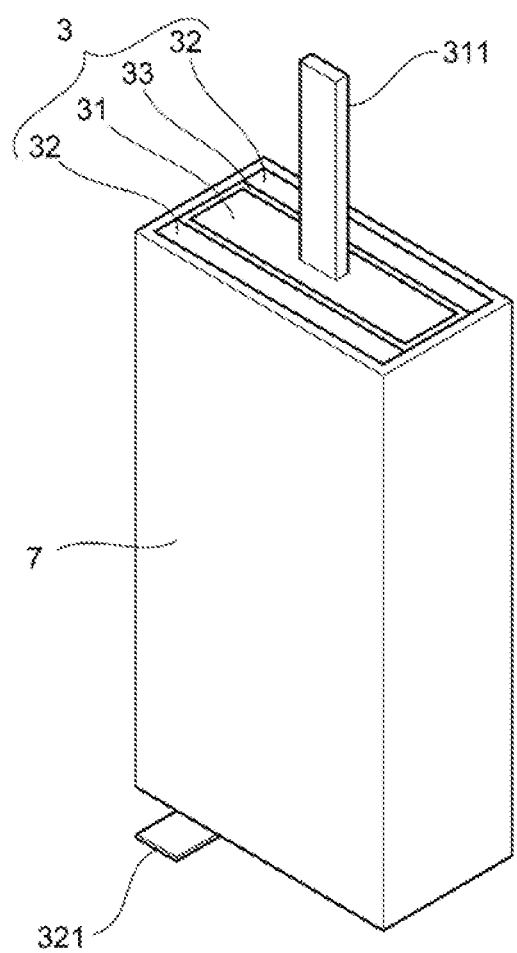
FIG. 46 depicts a perspective view of an electrode group accommodated in a solution retaining member according to the eighth embodiment.

More specifically, as shown in FIG. 46, the solution retaining member 7 entirely covers the four side surfaces 3a to 3d of the electrode group 3. The side surfaces 3a to 3d extend in the center axis direction C of the battery case 2. More particularly, the solution retaining member 7 has a bag shape and covers the four side surfaces 3a to 3d (see FIG. 45) and a lower surface 3e (see FIG. 44) of the electrode group 3.

The separator 33 according to the present embodiment accommodates the positive electrode plate 31, and is located to configure the outer surface and cover the short-length side surfaces of the positive electrode plate 31 along the side surfaces 3c and 3d extending in the layered direction L of the electrode group 3 (see FIG. 45). The bag-shaped solution retaining member 7 accommodates the electrode group 3 thus configured, so that the separator 33 and the solution retaining member 7 are in contact with each other at the short-length side surfaces of the positive electrode plate 31. Such contact achieves efficient supply of the electrolyte solution in the solution retaining member 7 to the separator 33.

The electrode group 3 according to the present embodiment is accommodated in the solution retaining member 7. The spacers 61 and 62 are thus in substantially entire contact with portions of the solution retaining member 7 in contact with the outer side surfaces 3a and 3b of the electrode group 3 to press the outer side surfaces 3a and 3b of the electrode group 3. The solution retaining member 7 is accordingly sandwiched and fixed between the electrode group 3 and the spacers 61 and 62. The electrode group 3 and the solution retaining member 7 can be fixed with use of the common spacers 61 and 62. The inside of the battery case 2 is thus simplified.

Effects of Eighth Embodiment

In the alkaline storage battery 100 according to the eighth embodiment thus configured, the solution retaining member 7 is provided to be in contact with the separator 33 in the electrode group 3. The solution retaining member 7 is thus capable of supplying the electrolyte solution to the separator 33 in the electrode group 3 and the electrolyte solution can be sufficiently included in the separator 33. This configuration suppresses increase in internal resistance of the electrode group 3. There is no need to thicken the separator 33 in the electrode group 3, and the electrode group 3 is not deteriorated in discharge performance. The solution retaining member 7 has the bag shape to accommodate the electrode group 3, thereby also preventing separation of the negative active material from the negative electrode plate 32. It is particularly possible to prevent separation of the negative active material from the side surfaces (short-length side surfaces) extending in the layered direction L in the negative electrode plate 32.

Furthermore, the spacers 61 and 62 fix the electrode group 3 and the solution retaining member 7. It is thus possible to prevent movement of the electrode group 3 and the solution retaining member 7 with respect to the battery case 2 and suppress separation of the active materials in the positive electrode plate 31 and the negative electrode plate 32 to prevent deterioration in charge-discharge performance and rather improve the charge-discharge performance. Moreover, the electrode group 3 and the solution retaining member 7 can be reliably made in contact with each other.

Modification Examples of Eighth Embodiment

It is noted that the present invention is not limited to the eighth embodiment. For example, in the eighth embodiment, the solution retaining member 7 has the bag shape to accommodate the electrode group 3. However, the solution retaining member 7 is not limited to this shape. Alternatively, the solution retaining member 7 can have a substantially cylindrical shape to cover the four side surfaces 3a to 3d of the electrode group 3.

Figure 47:
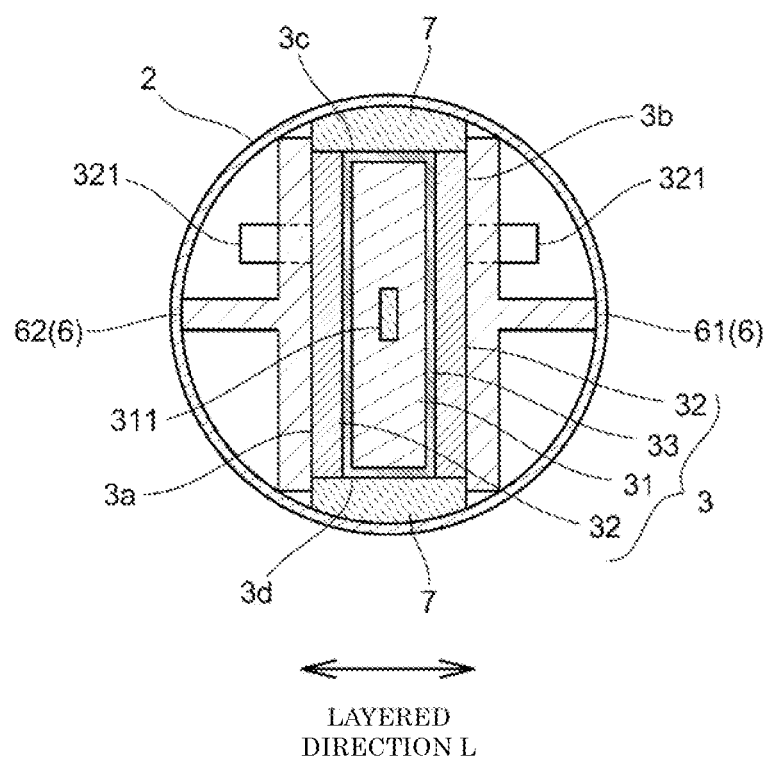
FIG. 47 depicts a transverse sectional view of a solution retaining member according to a modification example of the eighth embodiment.

As shown in FIG. 47, instead of being interposed between the spacers 61 and 62 and the electrode group 3, the solution retaining member 7 can be provided while being not in contact with the outer side surfaces 3a and 3b in the layered direction L of the electrode group 3 but in contact with the side surfaces 3c and 3d extending in the layered direction L. In this case, the solution retaining member 7 can be provided to fill a space defined by the battery case 2, the electrode group 3, and the spacers 61 and 62.

In the eighth embodiment, the separator 33 and the solution retaining member 7 are made of the same material. Alternatively, these components can be made of materials different from each other.

Ninth Embodiment

Described next with reference to the drawings is a cylindrical battery according to the ninth embodiment of the present invention. It is noted that members corresponding to those of the foregoing embodiments are denoted by the same reference signs.

The cylindrical battery 100 according to the ninth embodiment is different from those according to the embodiments described above in the configuration of the positive electrode plate or the negative electrode plate. Described below is the case where the configuration of the positive electrode plate is different.

Figure 48:
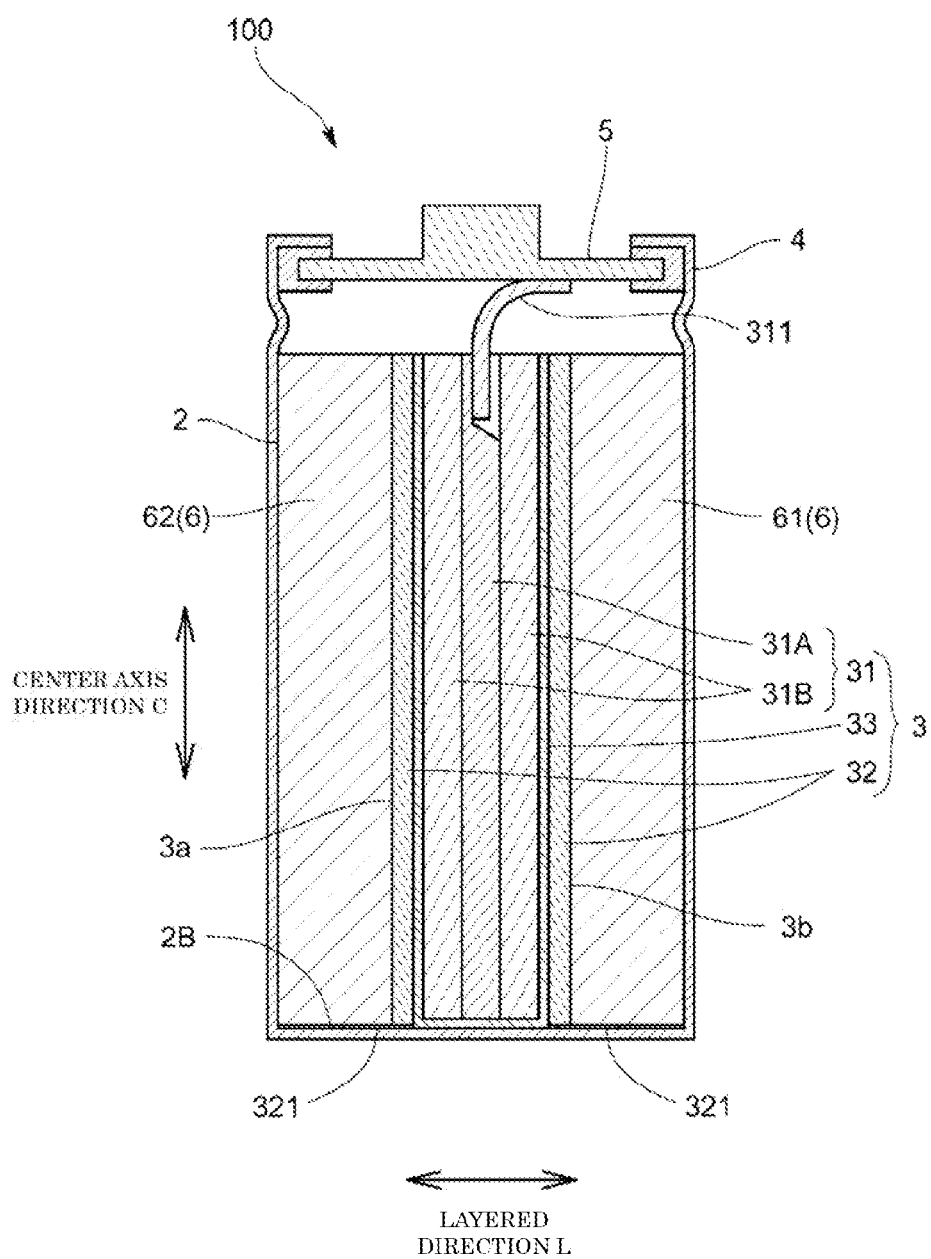
FIG. 48 depicts a longitudinal sectional view of a cylindrical battery according to a ninth embodiment.
Figure 49:
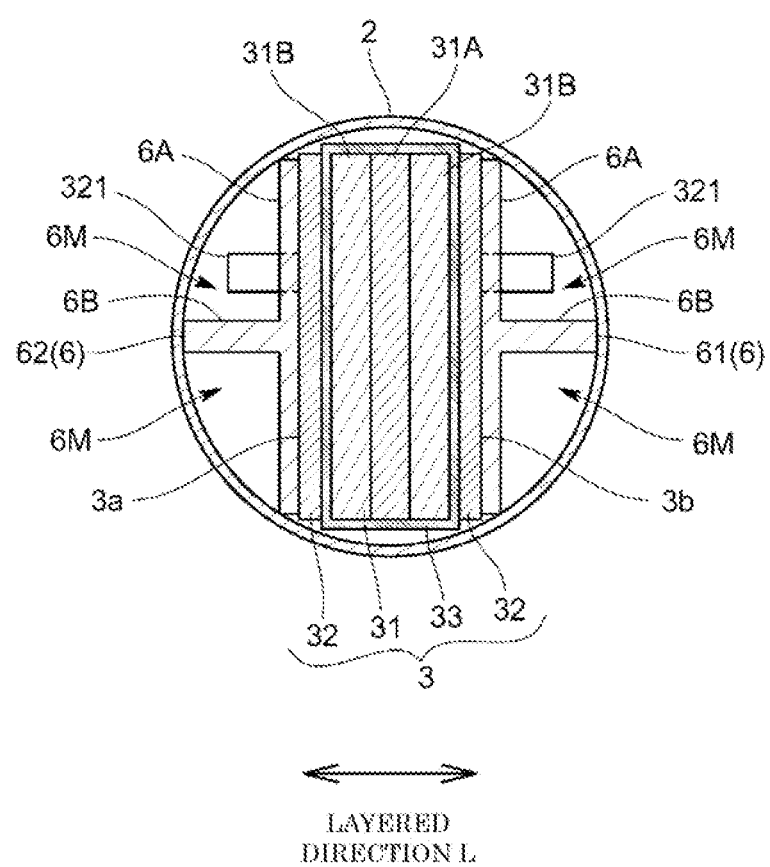
FIG. 49 depicts a transverse sectional view of the cylindrical battery according to the ninth embodiment.
Figure 50:
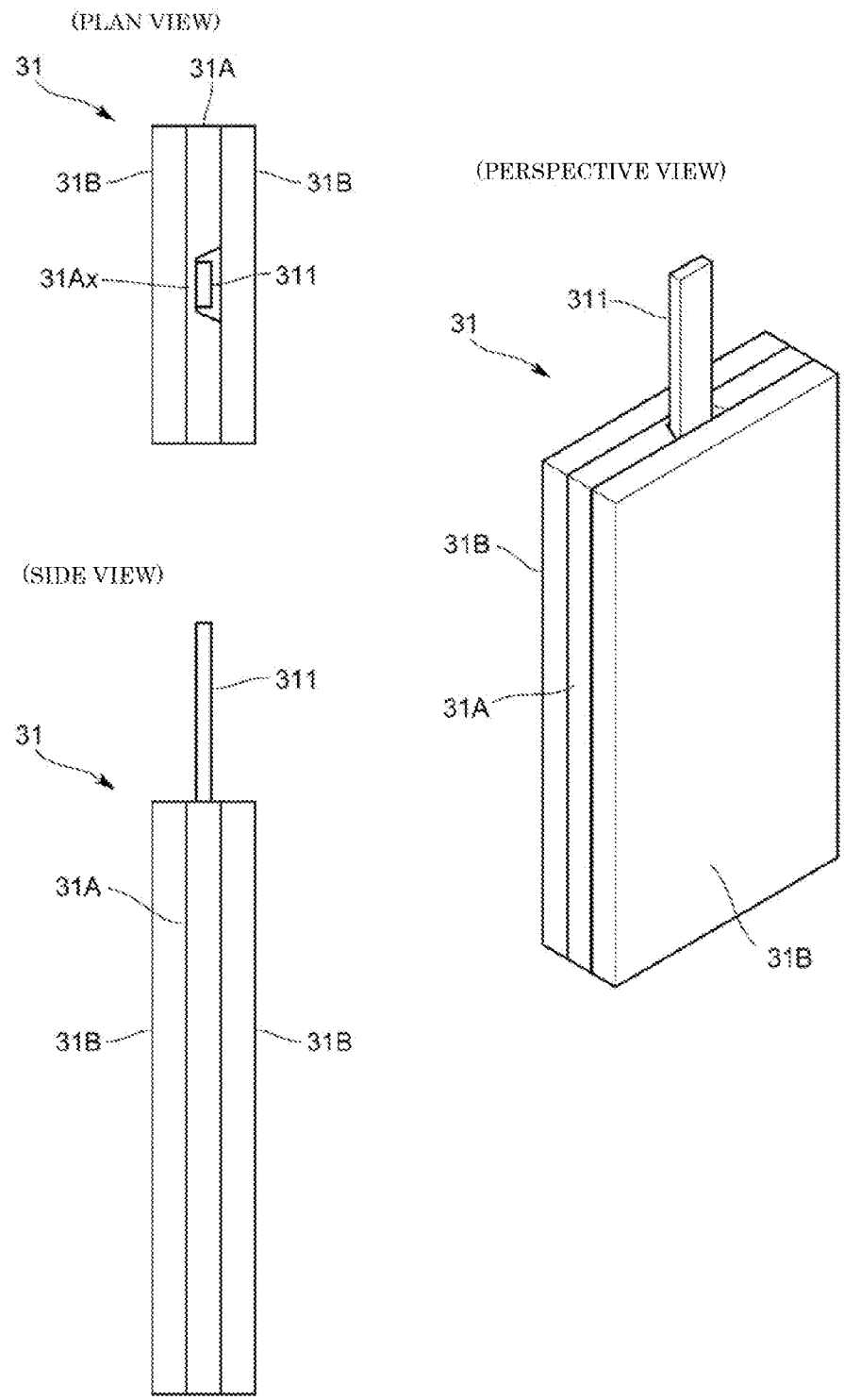
FIG. 50 depicts perspective views of a positive electrode plate according to the ninth embodiment.

More specifically, as shown in FIGS. 48 to 50, the positive electrode plate 31 includes one first plate element 31A having the current collecting terminal 311 and at least one second plate element 31B having no current collecting terminal 311. The positive electrode plate 31 has a substantially linear shape in which the plate elements 31A and 31B are made in contact with each other and layered.

Each of the first plate element 31A and the second plate element 31B includes a foamed metal porous body (positive substrate) made of foamed nickel or the like and a positive active material filled in the porous body. The positive substrates in the first plate element 31A and the second plate element 31B have substantially the same shapes in a plan view and are substantially the same in thickness.

As shown particularly in FIG. 50, the positive electrode plate 31 according to the present embodiment includes one first plate element 31A and two second plate elements 31B, and the second plate elements 31B are located at surfaces of the first plate element 31A, respectively, to be layered. In other words, the first plate element 31A is provided at the respective surfaces with the same number of second plate elements 31B. These elements are layered such that the first plate element 31A is located at the center of the positive electrode plate 31. When the first plate element 31A is located at the center of the positive electrode plate 31, each of the second plate elements 31B is improved in current collection efficiency.

Figure 51:
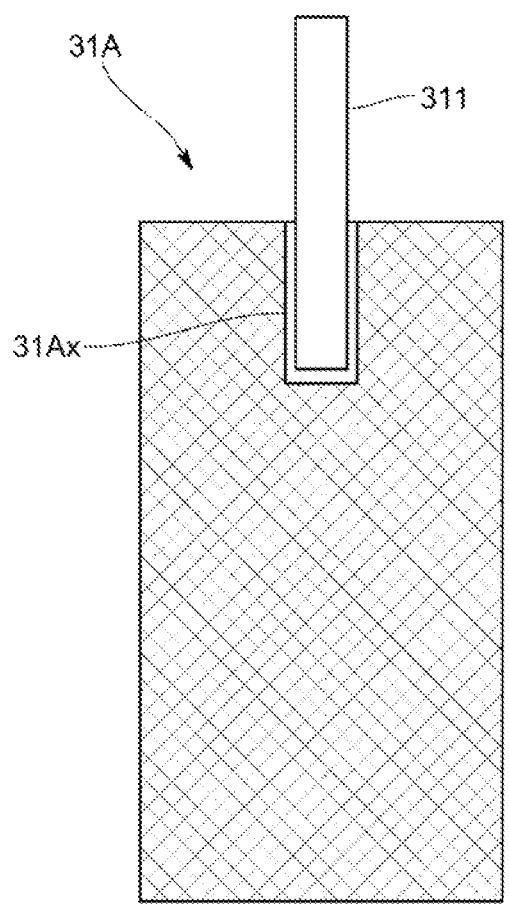
FIG. 51 depicts a plan view of the positive electrode plate according to the ninth embodiment.

As shown in FIGS. 50 and 51, the first plate element 31A is formed, at the center of the upper end, with an active material removed portion 31Ax that has a substantially rectangular shape and allows the current collecting terminal 311 to be welded thereto. The active material removed portion 31Ax is slightly larger than the welded portion of the current collecting terminal 311, and is formed by removing the positive active material filled in the positive substrate. The active material removed portion 31Ax is partially compressed to correspond to the shape of the current collecting terminal 311, and the current collecting terminal 311 is welded to the compressed portion.

The spacers 61 and 62 press the electrode group 3, so that the positive substrate or the positive active material of the first plate element 31A and the positive substrate or the positive active material of the second plate element 31B in the positive electrode plate 31 press each other to be in contact with each other. This configuration improves conductivity between the first plate element 31A and the second plate element 31B. When the first plate element 31A and the second plate element 31B press to be in contact with each other, the current collecting terminal 311 of the first plate element 31A improves current collection efficiency of the second plate element 31B.

Effects of Ninth Embodiment

In the alkaline storage battery 100 according to the ninth embodiment thus configured, the positive electrode plate 31 is divided into the first plate element 31A and the second plate element 31B, so that the first plate element 31A provided with the current collecting terminal 311 can be reduced in thickness as much as possible and the positive active material removed from the first plate element 31A can be reduced in amount. Meanwhile, there is no need to remove the positive active material from the second plate element 31B. Such division into the first plate element 31A and the second plate element 31B reduces loss of the positive active material and improves filling efficiency of the positive active material in the entire positive electrode plate. Furthermore, the current collecting terminal 311 has only to be welded to the first plate element 31A and there is no need to weld any excessive current collecting terminal. This enhances productivity. Moreover, the spacers 61 and 62 sandwich the electrode group 3 in the layered direction L and the electrode group 3 is thus pressed. In this configuration, the first plate element 31A and the second plate element 31B are sufficiently pressed to be in contact with each other, and sufficient conductivity is achieved.

The positive electrode plate 31 made of foamed nickel is divided into the first plate element 31A and the second plate element 31B. This configuration reduces the thickness of the first plate element 31A from which the positive active material is removed, and also reduces the volume of the active material removed portion 31Ax. It is thus possible to suppress shearing strain between the compressed portion and the uncompressed portion, while the loss of the positive active material is reduced.

Modification Examples of Ninth Embodiment

Figure 52:
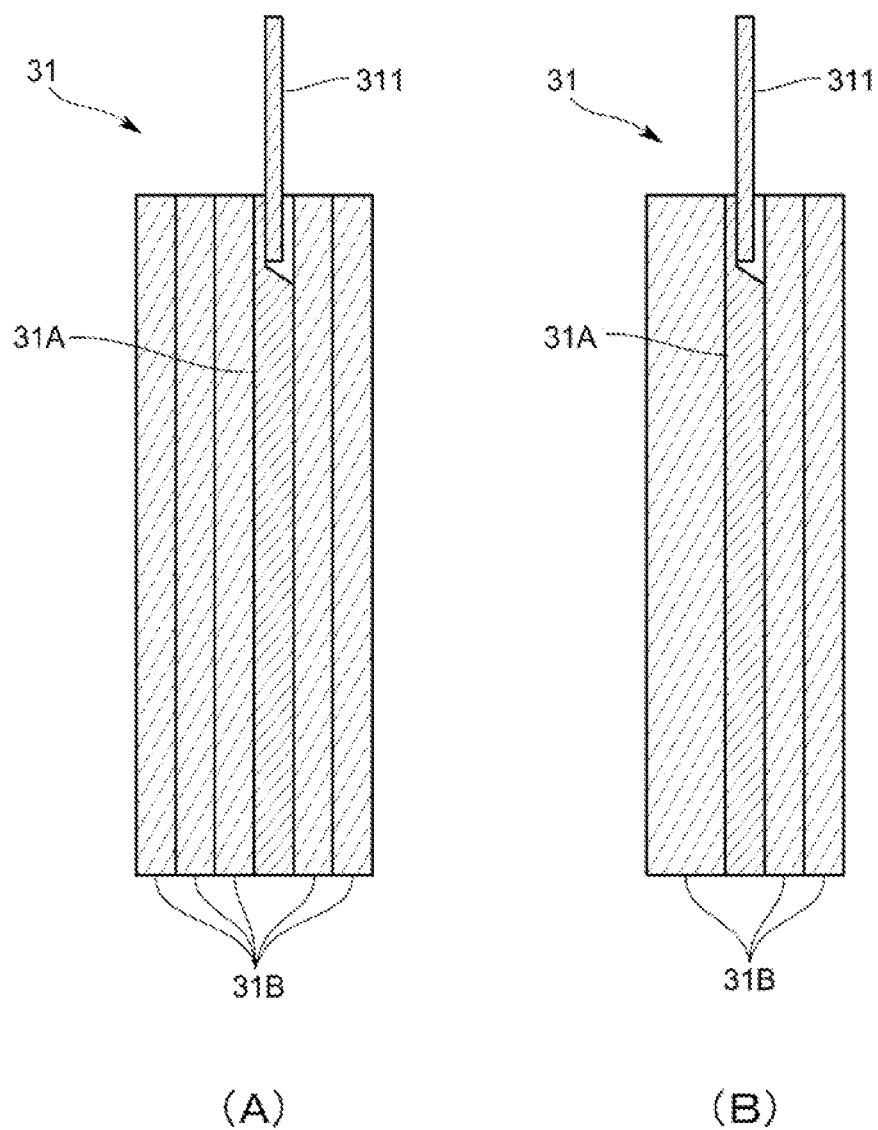
FIGS. 52(A) and 52(B) depict sectional views of positive electrode plates according to modification examples of the ninth embodiment.

The ninth embodiment exemplifies the case where the single first plate element 31A and the two second plate element 31B are layered. Alternatively, as shown in FIG. 52(A), two or more second plate element 31B can be layered on each surface of the single first plate element 31A for example.

In the ninth embodiment, the first plate element 31A and the second plate elements 31B are equal in thickness. Alternatively, as shown in FIG. 52(B), the first plate element 31A and the second plate elements 31B can be unequal in thickness, or each of the second plate elements 31B can be unequal in thickness.

Figure 53:
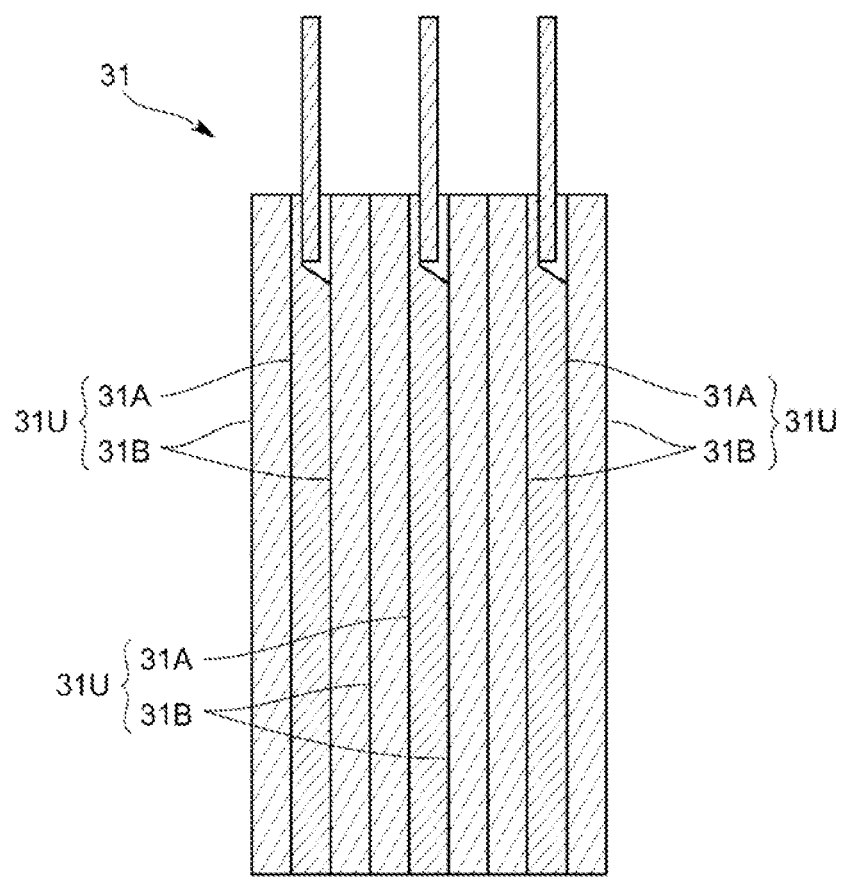
FIG. 53 depicts a sectional view of a positive electrode plate according to a modification example of the ninth embodiment.

Furthermore, as shown in FIG. 53, a plurality of positive electrode plate units 31U can be layered, in each of which a first plate element 31A and two or more second plate elements 31B are layered. This configuration reduces loss of the positive active material as much as possible in each of the units 31U, and also improves current collection efficiency in the entire positive electrode plate 31.

The ninth embodiment exemplifies the case where the positive electrode plate is divided into the first plate element and the second plate element. Alternatively, the negative electrode plate can be divided into a first plate element and a second plate element.

Tenth Embodiment

Described next with reference to the drawings is a cylindrical battery according to the tenth embodiment of the present invention. It is noted that members corresponding to those of the foregoing embodiments are denoted by the same reference signs.

The cylindrical battery 100 according to the tenth embodiment is different from those according to the embodiments described above in the configuration of the positive electrode 31 and the configurations of the spacers 6.

Figure 54:
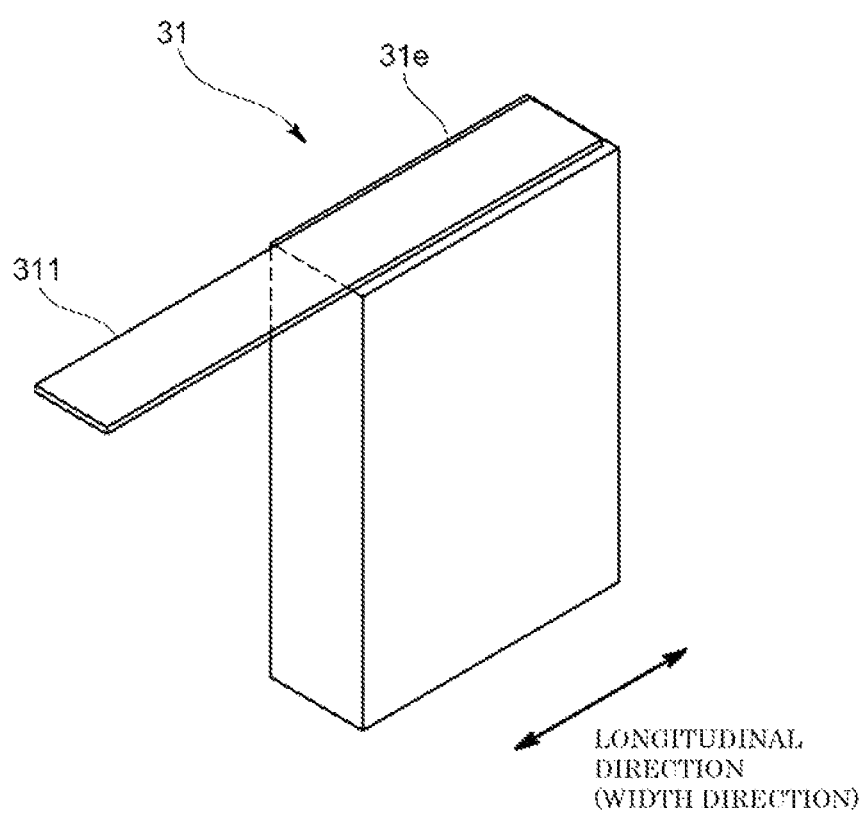
FIG. 54 depicts a perspective view of a positive electrode according to a tenth embodiment.

More specifically, as shown in FIG. 54, the positive electrode 31 is provided on the top surface with the current collecting terminal 311 made of a nickel steel plate or the like by welding. The current collecting terminal 311 extends outward in a direction along the longitudinal side (width) of a top surface 31e of the positive electrode 31. The current collecting terminal 311 is provided to cover the substantially entire top surface 31e of the positive electrode 31, in order to improve efficiency of current collection from a positive substrate.

The positive electrode 31 can include a positive substrate having a substantially rectangular parallelepiped shape filled with a positive active material, or can include layered flat positive substrates filled with a positive active material or a bent flat positive substrate filled with a positive active material.

Figure 55:
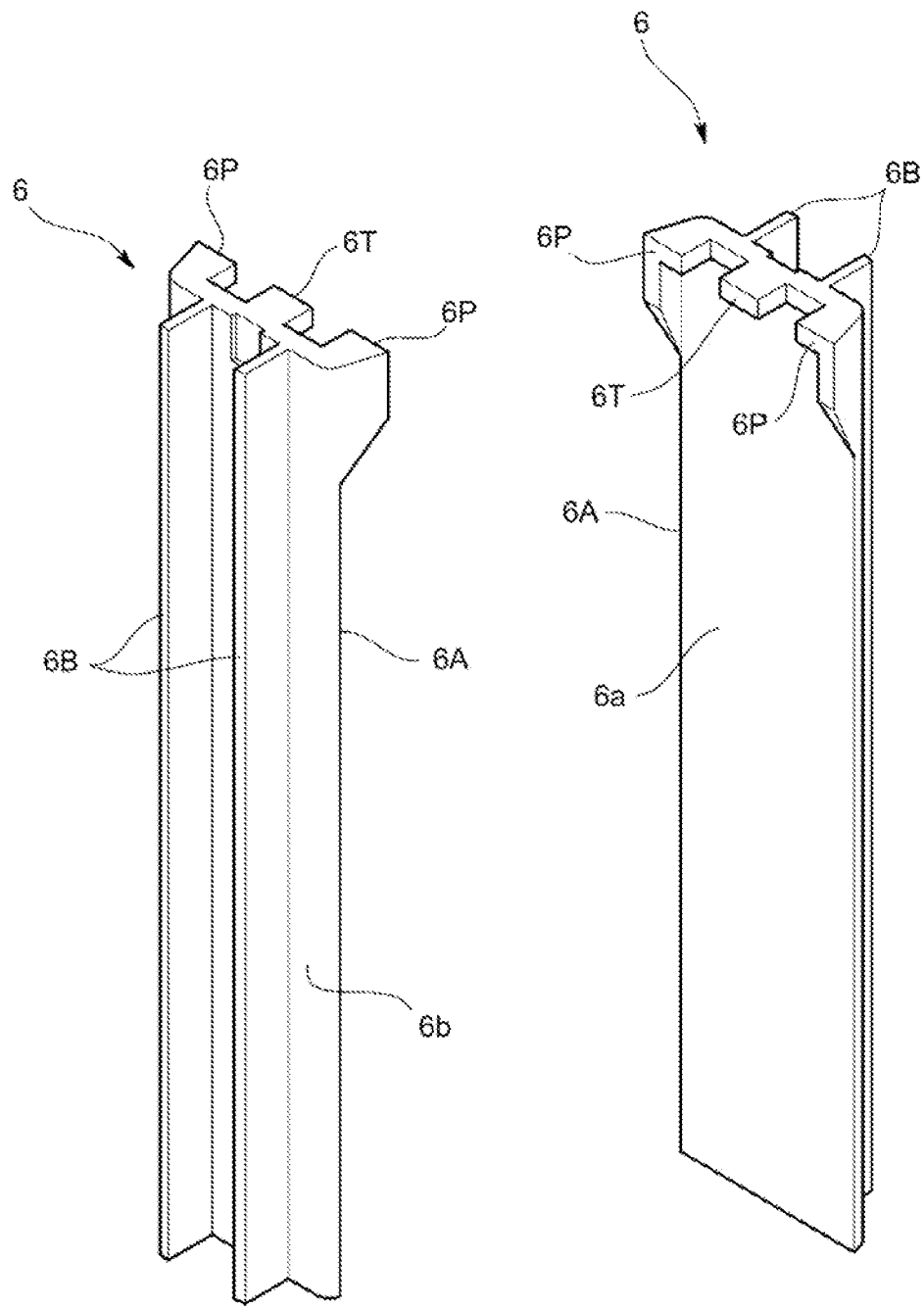
FIG. 55 depicts perspective views of spacers according to the tenth embodiment.
Figure 56:
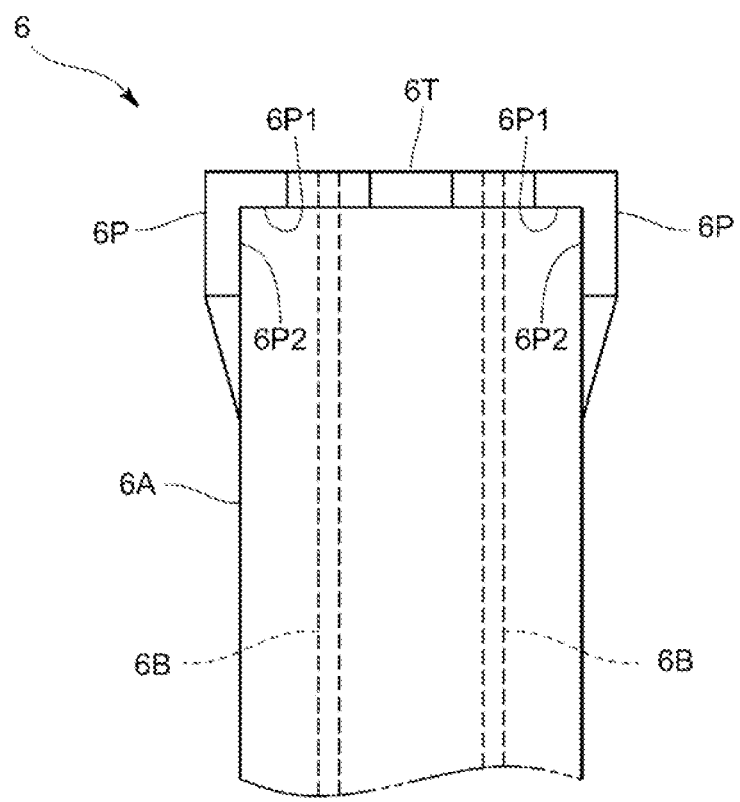
FIG. 56 depicts a view of a state where a battery case accommodates an electrode group and the spacer according to the tenth embodiment.

As shown in FIGS. 55 and 56, each of the spacers 6 has an electrode contact portion 6A and two case contact portions 6B. The electrode contact portion GA has a rectangular flat plate shape and includes a first surface 6a serving as a contact surface in substantially entire contact with the outermost surface (more particularly, the negative electrode plate 32) of the electrode group 3 in the layered direction L. The case contact portions 6B have uniform sectional shapes, extend from a second surface 6b of the electrode contact portion 6A and are in contact with the inner peripheral surface 2A of the battery case 2.

The electrode contact portion 6A is shaped to be along the outermost surface of the electrode group 3 in the layered direction L. The electrode contact portion 6A is formed, at the top, with a projection 6T that faces the top surface of the electrode group 3. The projection 6T extends substantially perpendicularly from the center at the upper end of the electrode contact portion 6A (see FIG. 56). The electrode contact portion 6A is formed, at upper corners, with surrounding walls 6P that respectively surround the upper corners of the electrode group 3. The surrounding walls 6P each have an upper wall 6P1 facing the top surface of the electrode group 3 and a side wall 6P2 facing corresponding one of right and left side surfaces of the electrode group 3 (see FIG. 56).

The two case contact portions 6B are formed on the second surface 6b of the electrode contact portion 6A and are parallel to each other along the center axis direction C. More specifically, the case contact portions 6B are formed symmetrically with respect to the center axis of the battery case 2 in the state of being accommodated in the battery case 2. The case contact portions 6B each have a contact portion with the inner peripheral surface 2A of the battery case 2. The contact portion has a curved surface substantially the same as the curved inner peripheral surface 2A of the battery case 2. The case contact portions 6B and the battery case 2 are accordingly in surface contact with each other (see FIG. 57).

Figure 57:
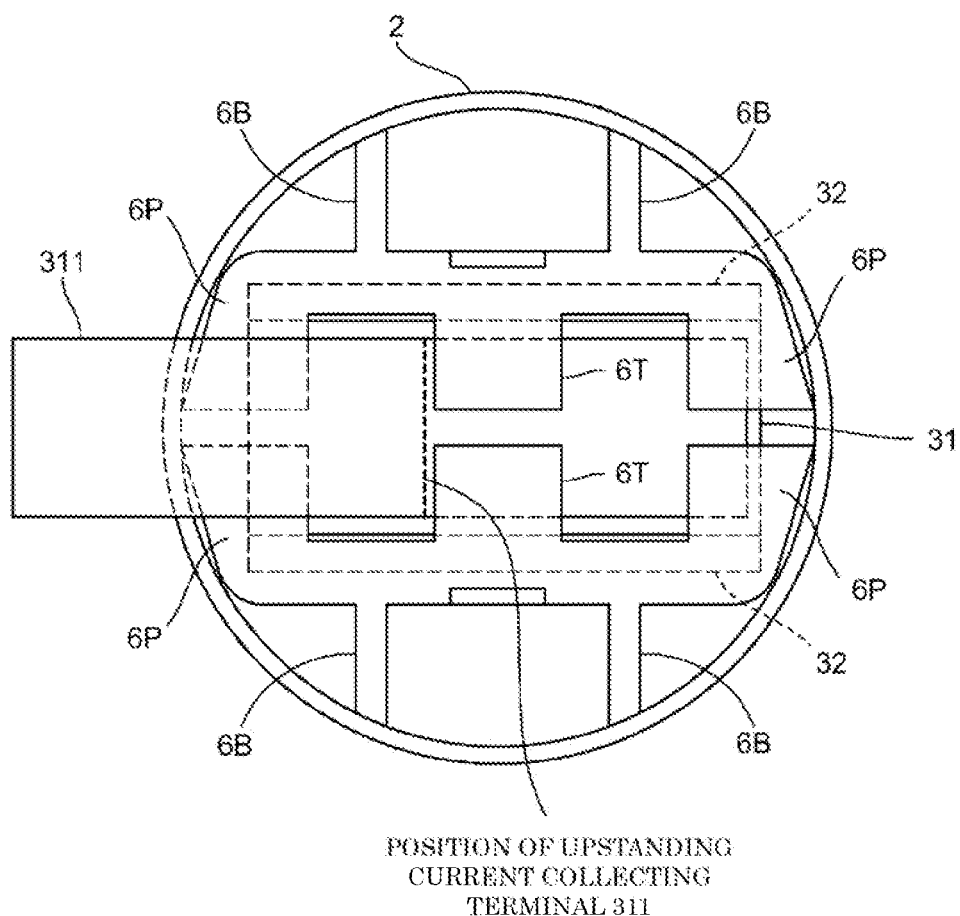
FIG. 57 depicts a partially enlarged front view of the spacers according to the tenth embodiment.

As shown in FIG. 57, when the two spacers 6 are located to sandwich the electrode group 3 in the battery case 2, the projections 6T of the spacers 6 are in contact with or press the current collecting terminal 311 of the positive electrode plate 31. The current collecting terminal 311, has a free end that is not in contact with the projections 6T and is bent to be welded to the sealing member 5. The position where the current collecting terminal 311 upstands is in the vicinity of the projections 6T. Furthermore, the surrounding walls 6P of the two spacers 6 accommodate the upper corners of the positive electrode plate 31 and the negative electrode plate 32.

Effects of Tenth Embodiment

In the alkaline storage battery 100 according to the tenth embodiment thus configured, the projections 6T are provided to face the top surface of the electrode group 3, so that the current collecting terminal 311 welded to the top surface of the positive electrode 31 is in contact with the projections 6T. This configuration can prevent displacement of the current collecting terminal 311 and prevent damage and peeling off at the welded portion of the current collecting terminal 311. Furthermore, each of the spacers 6 is provided, at the top, with the surrounding walls 6P surrounding the upper corners of the electrode group 3, to prevent contact between the battery case 2 and the positive electrode 31. This configuration also prevents contact between the current collecting terminal 311 of the positive electrode 31 and the negative electrode 32. It is also possible to prevent displacement of the positive electrode 31 and the negative electrode 32 in the electrode group 3. The surrounding walls 6P thus provided eliminate necessity for provision of an upper insulating plate, which has been conventionally required. This leads to simplification of the production steps and reduction in material cost.

Modification Examples of Tenth Embodiment

Figure 58:
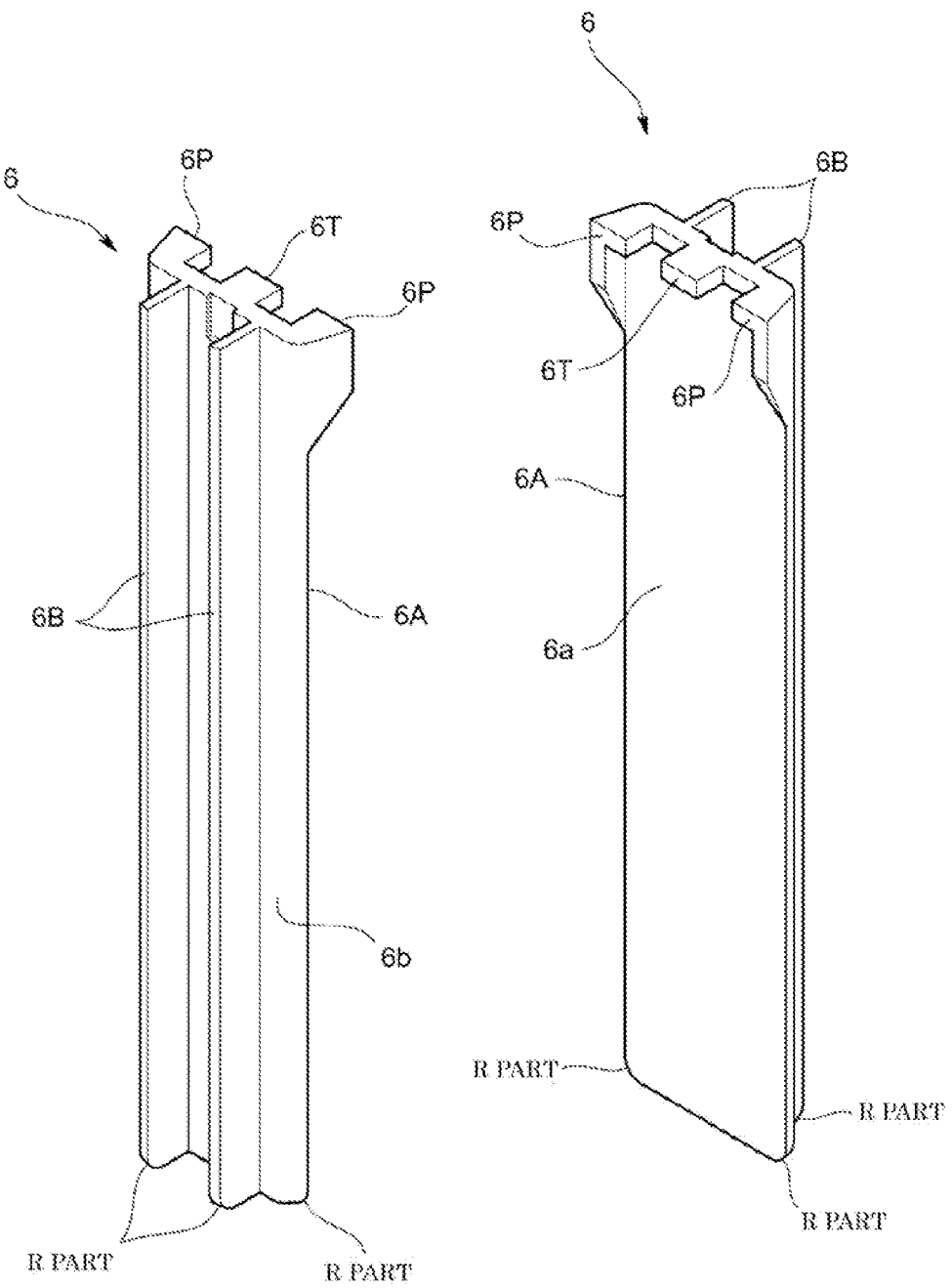
FIG. 58 depicts side views of spacers according to a modification example of the tenth embodiment.

It is noted that the present invention is not limited to the tenth embodiment. For example, there can be provided a gap between the spacers 6 and the inner peripheral surface of the battery case 2. More specifically, the gap is preferably provided at the bottom of the battery case 2. As shown in FIG. 58, each of the spacers 6 is formed with an R part by rounding at each lower corner of the electrode contact portion 6A, and an R part by rounding at a lower corner of each of the case contact portions. The gap thus provided between the spacers 6 and the inner peripheral surface of the battery case 2 facilitates shift of the electrolyte solution into the electrode group 3. Alternatively, the case contact portions 6B may be reduced in height toward the bottom surface of the battery case 2.

In order for the smooth shift of the electrolyte solution into the electrode group 3 and discharge of gas from the electrode group 3, the spacers can be formed with one or a plurality of holes penetrating the spacers in the thickness direction. The spacers according to the tenth embodiment may be each provided with the hole in the electrode contact portion 6A.

In order for the smooth shift of the electrolyte solution into the electrode group 3 and discharge of gas from the electrode group 3, each of the spacers 6 may be formed, in the first surface 6a of the electrode contact portion GA, with one or a plurality of grooves opened from the top to the bottom, or embossing may be applied to the electrode contact portion 6a of each of the spacers.

Furthermore, the spacers 6 may have conductivity to serve as terminals electrically connecting the outermost electrode in the electrode group with the battery case.

The present invention is applicable not only to an alkaline storage battery but also to a secondary battery such as a lithium ion secondary battery and a primary battery.

Furthermore, the present invention is not limited to the embodiments described above, but can be obviously modified in various manners within the scope of the object thereof. The configurations according to any of the embodiments described above can be optionally combined. There can be provided any member in addition to the battery case, the spacers, and the electrode group.

INDUSTRIAL APPLICABILITY

The present invention achieves the battery that has strength against increase in internal pressure of the battery and does not require consideration of winding displacement in the electrode group. The present invention also prevents movement of the electrode group relative to the battery case, and suppresses separation of the active materials in the plates to prevent deterioration in charge-discharge performance.

The invention claimed is:
1. A cylindrical battery, comprising:
a battery case having a cylindrical shape;
an electrode group disposed in the battery case, the electrode group comprising a positive electrode, a negative electrode, and a separator, the electrode group having a pair of flat outer side surfaces opposed to each other, the electrode group having a parallelepiped shape or a quadrangular prism shape; and
a spacer disposed between an inner peripheral surface of the battery case and each of the flat outer side surfaces of the electrode group, wherein the electrode group is formed by layering the positive electrode plate and the negative electrode plate with the separator being interposed therebetween;

the battery case accommodates the electrode group such that a layered direction of the electrode group is perpendicular to a center axis direction of the battery case;

the spacer presses the electrode group in the layered direction; and the spacer is made of resin.

2. The cylindrical battery according to claim 1, wherein the spacer comprises at least two spacers sandwiching the electrode group in the layered direction.

3. The cylindrical battery according to claim 1, wherein the spacer has a contact portion with the inner peripheral surface of the battery case, and the contact portion has a curved surface along the curved inner peripheral surface of the battery case.

4. The cylindrical battery according to claim 1, wherein the spacer has a space communicated from a top to a bottom, and a welding rod used for welding the electrode group to the battery case is inserted into the space.

5. The cylindrical battery according to claim 1, wherein spacers are disposed between the inner peripheral surface of the battery case and paired outer side surfaces, respectively, and each of the spacers includes a flat electrode contact portion having a first surface serving as a contact surface with the electrode group and at least one case contact portion extending from a second surface of the electrode contact portion and being in contact with the inner peripheral surface of the battery case.

6. The cylindrical battery according to claim 5, wherein the at least one case contact portion includes at least two case contact portions that are formed on the second surface of the electrode contact portion and are parallel to each other along a center axis direction.

7. The cylindrical battery according to claim 1, wherein spacers fix the electrode group at a position decentered from a center position of the battery case.

8. The cylindrical battery according to claim 1, wherein each of the positive electrode and the negative electrode includes a current collecting terminal, and at least one current collecting terminal extends from a top of the spacer opposite to a bottom surface of the battery case to the inner peripheral surface of the battery case.

9. The cylindrical battery according to claim 1, wherein spacers are paired and disposed between the inner peripheral surface of the battery case and paired outer side surfaces, respectively, and the paired spacers have ends provided continuously to each other and are bent to sandwich the electrode group.

10. The cylindrical battery according to claim 1, wherein there is a gap between the spacer and the inner peripheral surface of the battery case at a bottom of the battery case.

11. The cylindrical battery according to claim 1, wherein the spacer is provided, at an upper part, with a projection facing a top surface of the electrode group.

12. The cylindrical battery according to claim 1, wherein the spacer is provided, at an upper part, with a surrounding wall surrounding an upper corner of the electrode group.

13. The cylindrical battery according to claim 1, wherein the electrode group includes the positive electrode having a substantially quadrangular prism shape and the negative electrode that is flat and located to face each of at least four side peripheral surfaces of the positive electrode with the separator being interposed therebetween.

14. The cylindrical battery according to claim 1, wherein each of the positive electrode and the negative electrode includes a current collecting terminal, and the current collecting terminal of the positive electrode or the negative electrode is not welded to but in contact with an inner surface of the battery case and is pressed by the spacer toward the inner surface.

15. The cylindrical battery according to claim 1, further comprising a solution retaining member disposed in the battery case to be in contact with the electrode group, for retaining an electrolyte solution, wherein spacers fix the electrode group and the solution retaining member in the battery case.

16. The cylindrical battery according to claim 1, wherein spacers are located to sandwich the electrode group in a layered direction, and the positive electrode or the negative electrode includes a first plate element having a current collecting terminal and at least one second plate element having no current collecting terminal, and the plate elements are contacted and layered.

17. The cylindrical battery according to claim 1, wherein the spacer comprises a pressing surface that presses the electrode group in the layered direction and the pressing surface is a flat surface.

18. The cylindrical battery according to claim 1, wherein the cylindrical battery comprises only two spacers and the two spacers are provided on opposite sides of the electrode group such that the two spacers press the electrode group in the layered direction.

* * * * *